(12) United States Patent
Du et al.

(10) Patent No.: US 12,272,809 B1
(45) Date of Patent: *Apr. 8, 2025

(54) BATTERY CELL, BATTERY MODULE, BATTERY PACK, ELECTRIC VEHICLE, AND METHOD OF HEATING

(71) Applicant: Ampcera Inc., Milpitas, CA (US)

(72) Inventors: Hui Du, Tucson, AZ (US); James Emery Brown, Tucson, AZ (US); Chen Chen, Tucson, AZ (US); Sumin Zhu, San Francisco, CA (US)

(73) Assignee: Ampcera Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,244

(22) Filed: Nov. 16, 2020

Related U.S. Application Data

(60) Provisional application No. 62/936,406, filed on Nov. 16, 2019.

(51) Int. Cl.
| | |
|---|---|
| *H01M 10/657* | (2014.01) |
| *H01M 10/0562* | (2010.01) |
| *H01M 10/615* | (2014.01) |
| *H01M 10/625* | (2014.01) |
| *H01M 10/654* | (2014.01) |
| *H01M 50/409* | (2021.01) |

(52) U.S. Cl.
CPC ..... *H01M 10/657* (2015.04); *H01M 10/0562* (2013.01); *H01M 10/615* (2015.04); *H01M 10/625* (2015.04); *H01M 10/654* (2015.04); *H01M 50/409* (2021.01); *H01M 2220/20* (2013.01); *H01M 2300/0071* (2013.01)

(58) Field of Classification Search
CPC ............ H01M 6/5038; H01M 10/615; H01M 8/04037; H01M 10/657
See application file for complete search history.

(56) References Cited

U.S. PATENT DOCUMENTS

| | | | |
|---|---|---|---|
| 732,616 | A | 6/1903 | Burgess et al. |
| 1,687,196 | A | 10/1928 | Daellenbach |
| 2,418,792 | A | 4/1947 | Coleman |
| 2,442,380 | A | 6/1948 | Schrodt et al. |
| 2,516,048 | A | 7/1950 | Endress |
| 2,615,933 | A | 10/1952 | Carlson et al. |

(Continued)

FOREIGN PATENT DOCUMENTS

| | | |
|---|---|---|
| CN | 104916848 B | 9/2017 |
| DE | 102007052147 A1 | 5/2009 |

(Continued)

OTHER PUBLICATIONS

Machine translation of DE-102012210032-A1, Kanters (Year: 2013).*

(Continued)

*Primary Examiner* — Brian R Ohara
*Assistant Examiner* — Brent C Thomas
(74) *Attorney, Agent, or Firm* — Walters & Wasylyna LLC

(57) ABSTRACT

A battery cell, including an anode, a cathode, an electrolyte, and at least one inductively heatable material embedded or suspended in the electrolyte. A battery module, battery pack, and electric vehicle include the battery cell. A method of heating an electrolyte includes passing an alternating current generating eddy currents within embedded or suspended inductively heatable materials.

20 Claims, 33 Drawing Sheets

(56) References Cited

U.S. PATENT DOCUMENTS

| | | | |
|---|---|---|---|
| 2,626,971 A | 1/1953 | Percival | |
| 2,700,064 A | 1/1955 | Akerman | |
| 2,710,937 A | 6/1955 | Godshalk et al. | |
| 2,761,006 A | 8/1956 | Kramer | |
| 2,938,066 A | 5/1960 | Helmut | |
| 3,623,471 A | 11/1971 | Bogue et al. | |
| 3,723,187 A | 3/1973 | Toydoka et al. | |
| 3,774,589 A | 11/1973 | Kober | |
| 4,025,861 A | 5/1977 | Godard et al. | |
| 4,095,938 A | 6/1978 | Mikaila | |
| 5,039,927 A | 8/1991 | Centafanti | |
| 5,281,792 A | 1/1994 | Lee et al. | |
| 5,362,942 A | 11/1994 | Vanderslice, Jr. et al. | |
| 5,378,879 A | 1/1995 | Monovoukas | |
| 5,599,636 A | 2/1997 | Braun | |
| 5,948,298 A | 9/1999 | Ijaz | |
| 6,002,240 A | 12/1999 | McMahan et al. | |
| 6,096,456 A * | 8/2000 | Takeuchi | C08J 5/24 |
| | | | 429/252 |
| 6,392,388 B1 | 5/2002 | Young | |
| 6,575,156 B2 | 6/2003 | MacFarlane et al. | |
| 6,882,061 B1 | 4/2005 | Ashtiani et al. | |
| 7,264,902 B2 | 9/2007 | Horie et al. | |
| 7,947,925 B2 | 5/2011 | Suzuki et al. | |
| 8,574,738 B2 | 11/2013 | Fattig | |
| 8,791,397 B2 | 7/2014 | Kim et al. | |
| 8,852,772 B2 | 10/2014 | McDonald | |
| 9,083,065 B2 | 7/2015 | Carkner | |
| 9,214,703 B2 | 12/2015 | Ikeda | |
| 9,337,671 B2 | 5/2016 | Komori et al. | |
| 10,084,201 B2 | 9/2018 | Hatta et al. | |
| 10,147,950 B2 | 12/2018 | Sakshaug et al. | |
| 10,181,599 B2 | 1/2019 | Allison et al. | |
| 10,340,504 B2 | 7/2019 | Englert | |
| 2004/0241520 A1 | 12/2004 | Ha et al. | |
| 2008/0292964 A1 | 11/2008 | Takeuchi et al. | |
| 2009/0087723 A1 | 4/2009 | Inda | |
| 2011/0059343 A1* | 3/2011 | McKinney | H01M 50/411 |
| | | | 429/94 |
| 2011/0305941 A1 | 12/2011 | Park et al. | |
| 2012/0107665 A1 | 5/2012 | Abe et al. | |
| 2013/0224632 A1* | 8/2013 | Roumi | H01M 4/133 |
| | | | 29/623.1 |
| 2014/0076876 A1 | 3/2014 | Papajewski | |
| 2014/0113166 A1 | 4/2014 | Schneider et al. | |
| 2015/0037698 A1 | 2/2015 | Buzon et al. | |
| 2015/0064534 A1* | 3/2015 | Lohmann | H01M 10/613 |
| | | | 429/120 |
| 2016/0059733 A1 | 3/2016 | Hettrich et al. | |
| 2016/0200011 A1* | 7/2016 | Rothfuss | C04B 35/64 |
| | | | 264/494 |
| 2016/0204408 A1 | 7/2016 | Herle | |
| 2017/0085107 A1* | 3/2017 | Rastegar | H01G 11/54 |
| 2018/0108956 A1 | 4/2018 | Fortenbacher | |
| 2019/0074559 A1 | 3/2019 | Demund et al. | |
| 2019/0081371 A1 | 3/2019 | Bauer et al. | |
| 2019/0386357 A1* | 12/2019 | McHugh | H01M 10/657 |
| 2020/0176835 A1* | 6/2020 | Rastegar | H01G 9/155 |
| 2020/0212401 A1 | 7/2020 | Huang et al. | |
| 2020/0303729 A1* | 9/2020 | Kim | H01M 10/056 |
| 2021/0175537 A1* | 6/2021 | Shin | H01M 10/052 |

FOREIGN PATENT DOCUMENTS

| | | | | |
|---|---|---|---|---|
| DE | 102008015621 A1 | 10/2009 | | |
| DE | 102011002729 A1 | 7/2012 | | |
| DE | 102011108196 A1 | 1/2013 | | |
| DE | 102012210032 A1 * | 12/2013 | ......... | H01M 10/615 |
| DE | 102012210091 A1 | 12/2013 | | |
| DE | 102012210146 A1 | 12/2013 | | |
| DE | 102013221747 A1 | 4/2015 | | |
| DE | 102013021255 A1 | 6/2015 | | |
| DE | 102016208064 A1 | 11/2017 | | |
| DE | 102016213159 A1 | 1/2018 | | |
| DE | 102016214337 A1 | 2/2018 | | |
| DE | 102017212275 A1 | 1/2019 | | |
| DE | 102017130559 A1 | 6/2019 | | |
| DE | 102018210417 A1 | 1/2020 | | |
| DE | 102018123910 A1 | 4/2020 | | |
| DE | 102019214648 A1 | 3/2021 | | |
| EP | 2827427 A1 | 1/2015 | | |
| JP | 2003-197277 | 9/2006 | | |
| JP | 2007-227209 | 9/2007 | | |
| JP | 2004-178950 | 8/2008 | | |
| JP | 4139199 B2 | 8/2008 | | |
| JP | 2010-160932 | 7/2010 | | |
| JP | 2013-149414 | 1/2015 | | |
| JP | 5649594 B2 | 1/2015 | | |
| JP | 6361322 B2 | 7/2018 | | |
| JP | 6455538 | 1/2019 | | |
| JP | 6463570 B1 | 2/2019 | | |
| KR | 10-2011-0020666 | 3/2011 | | |
| KR | 20130130292 A | 12/2013 | | |
| KR | 20150037242 A | 4/2015 | | |
| KR | 101721916 B1 | 3/2017 | | |
| KR | 10-1793311 | 11/2017 | | |
| KR | 10-1816948 | 1/2018 | | |
| KR | 102016122 B1 | 10/2019 | | |
| KR | 102042755 B1 | 11/2019 | | |

OTHER PUBLICATIONS

Stanley Zinn, Coil design and fabrication: Basic Design and Modifications, Oct. 1988, vol. 20, Issue 6, United States.

Thomas Bayerl, Induction Heating of Thermoplastic Materials by Particulate Heating Promoters, Polymers & Polymer Composites, vol. 20, No. 4, 2012, p. 333-341.

Sophie Laurent and Morteza Mahmoudi, Superparamagnetic iron oxide nanoparticles: promises for diagnosis and treatment of cancer, International Journal of Molecular Epidemiology and Genetics, 2011; vol. 2, No. 4, p. 367-390.

Anthoney J. Bur, Dielectric properties of polymers at microwave frequencies: a review, Polymer vol. 26, No. 7, 1985, p. 963-977.

Xiao-Guang Yang, Asymmetric Temperature Modulation for Extreme Fast Charging of Lithium-Ion Batteries, Joule vol. 3, No. 12, 2019, p. 3002-3019.

Zhang et al., "Magnetic Induction Heating of Nano-sized Ferrite Particles," in Advances in Induction and Microwave Heating of Mineral and Organic Materials (InTech, 2011), pp. 483-500.

Xiao-Guang Yang et al., Fast charging of lithium-ion batteries at all temperatures, PNAS, Jul. 10, 2018.

* cited by examiner

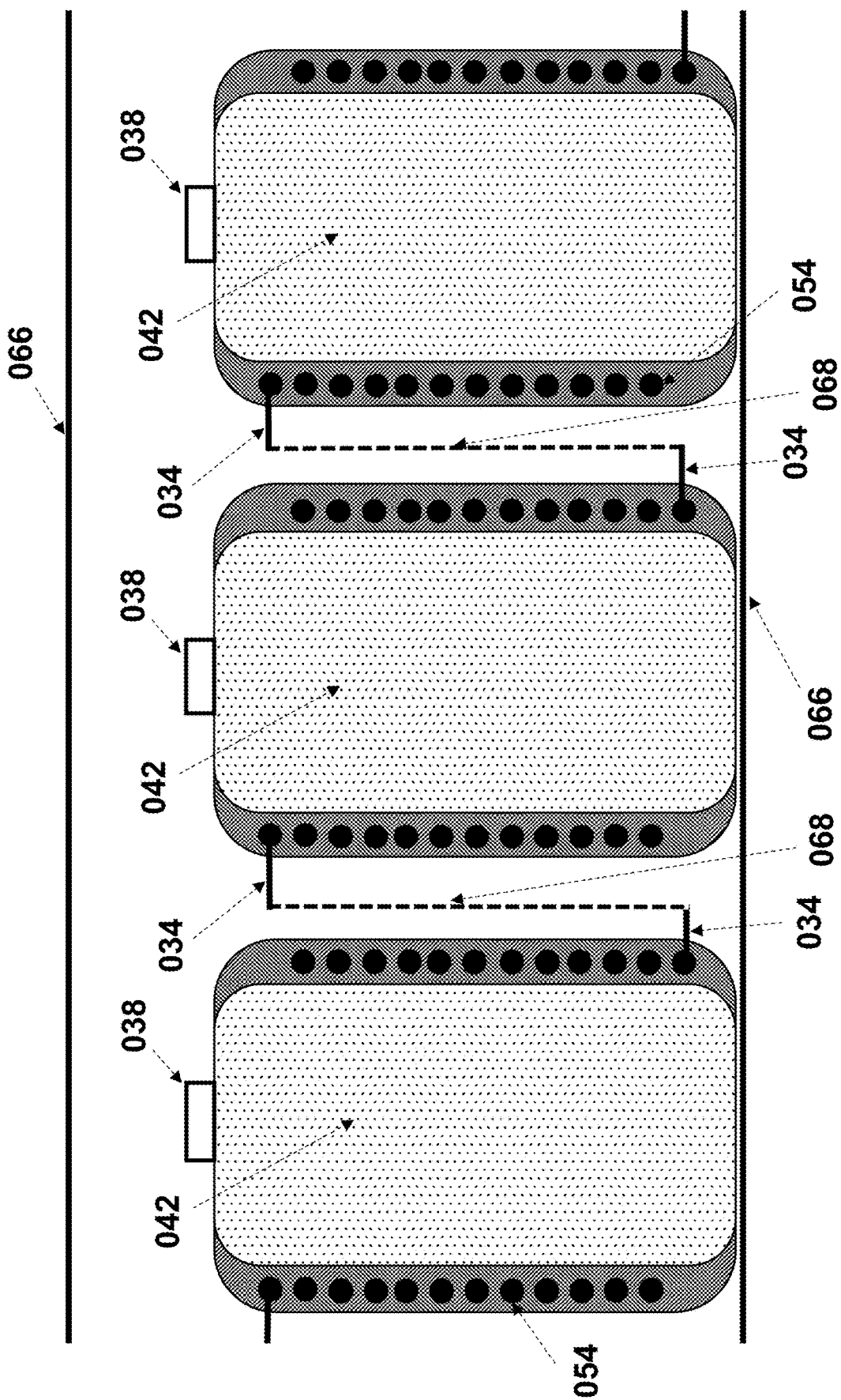

BATTERY CELL, BATTERY MODULE, BATTERY PACK, ELECTRIC VEHICLE, AND METHOD OF HEATING

PRIORITY

This application claims priority from U.S. Ser. No. 62/936,406, filed on Nov. 16, 2019, the entire contents of which are incorporated herein by reference.

FIELD

The present disclosure relates to systems and methods for heating of an electrolyte in a battery cell.

BACKGROUND

The electrolyte plays a critical role in a battery by providing an ionic conducting media positioned between an anode and a cathode. During battery cell operation, ions may conduct or flow through the electrolyte media. In some instances, the ions conduct or flow in only one direction such as the case in primary batteries, zinc or aluminum air batteries, and fuel cells. In other instances, the ions may conduct or flow in both directions depending on whether it is a charge or discharge cycle. In extreme cold climates, batteries can cease to function due to poor electrolyte ion conductivity.

Accordingly, those skilled in the art continue with research and development in the field of systems and methods for heating of an electrolyte in a battery cell.

SUMMARY

In one embodiment, there is a battery cell that includes an anode, a cathode, an electrolyte, and at least one inductively heatable material embedded or suspended in the electrolyte.

In another embodiment, there is a battery module that includes a plurality of the battery cells and an inductive coil.

In yet another embodiment, there is a battery pack that includes of a plurality of battery modules that each include a plurality of the battery cells and an inductive coil.

In yet another embodiment, there is an electric vehicle that includes the battery cell.

In yet another embodiment, there is a method of heating an electrolyte comprising at least one inductively heatable material embedded or suspended in the electrolyte. The method includes passing an alternating current generating eddy currents within the embedded or suspended inductively heatable materials, to thereby heat the electrolyte.

Other embodiments of the disclosed battery cell, battery module, battery pack, electric vehicle, and method of heating will become apparent from the following detailed description, the accompanying drawings and the appended claims.

BRIEF DESCRIPTION OF THE DRAWINGS

FIG. 7A: A schematic illustration of cylindrical battery cells, wherein the inductive coils of the cells are connected to the inductive coils of neighboring cells through a series circuit forming an inductive heating series circuit.

DETAILED DESCRIPTION

Figure 1A:
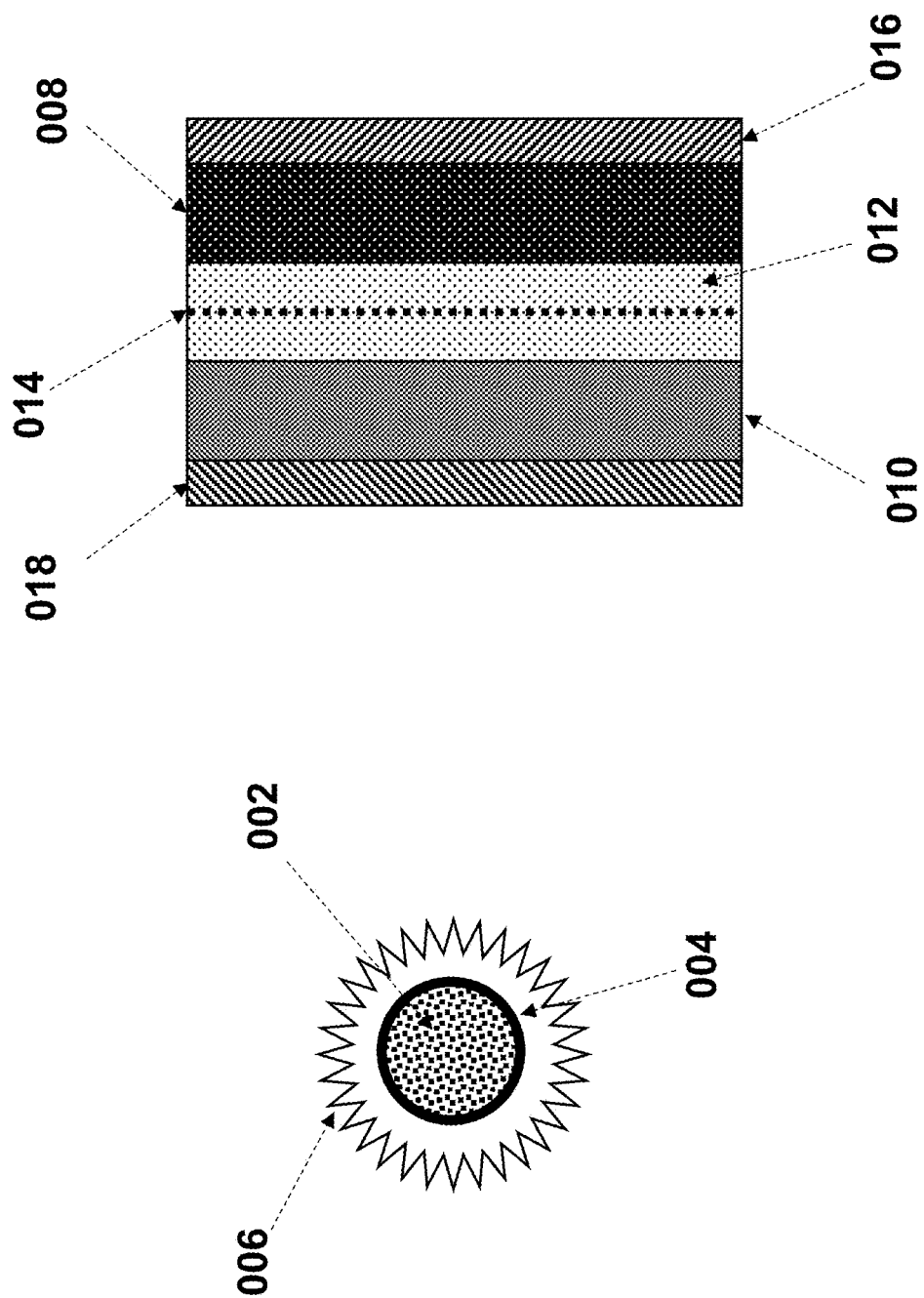
FIG. 1A: A schematic illustration of a battery structure, wherein the battery contains a liquid electrolyte with inductively heatable materials suspended within.

The present disclosure relates to the internal heating systems and methods for battery cells, modules and packs based on induction heating mechanism.

In extreme cold or harsh climates, batteries can cease to function due to poor electrolyte ion conductivity. Inductive heating particles may be embedded in the electrolyte in order to maintain an elevated temperature to allow normal battery functioning or allow fast charging of the battery. Eddy currents generated inside the particles may provide sufficient heat to maintain the required ionic conductivity. These eddy currents may be generated by passing an alternating current through inductive coils.

In an embodiment, a battery may a include a primary battery or secondary battery.

In another embodiment, battery electrolytes may include, for example, aqueous liquid, nonaqueous liquid such as organic or inorganic, polymer, gel polymer, solid-state ceramics, ceramic-polymer composites, or a combination thereof.

In yet another embodiment, materials with inductive heating properties may be suspended or embedded within the electrolyte of the battery cell.

In an aspect, materials with inductive heating properties may include materials such as quantum dots, nanoparticles, microparticles, irregular shapes, etc. Such materials may be coated with a thin electrical insulative layer as to avoid short circuiting of the battery cell.

In another aspect, materials with inductive heating properties may include wires or fibers, such as nanofibers, nanorods, microfibers, microrods, etc. Such wires or fibers may be coated with a thin electrical insulative layer as to avoid short circuiting of the battery cell.

In yet another aspect, materials with inductive heating properties may include a mesh such as metal mesh or foam structure. Such mesh or foam structures may be coated with a thin electrical insulative layer as to avoid short circuiting of the battery cell.

In yet another embodiment, inductively heatable materials coated with a thin insulating layer may be deposited on, or embedded within, a battery separator. Such separators may include, for example, cellulosic, glass mats, polyolefin, polyethylene, polypropylene, etc.

In yet another embodiment, the embedded or suspended inductive heating materials may be heated using an inductive coil. The inductive coil may pass alternating current through it at pulsed intervals, or in some instances continuous, as to control the internal temperature of the electrolyte. The alternating current may generate a magnetic field within and around the coil. The magnetic field may in turn generate eddy currents within the embedded or suspended inductive heating materials, heating the electrolyte.

In yet another embodiment, an inductive coil may be positioned at the battery cell level.

In an aspect, a planar shaped inductive coil may be positioned at the top of the battery cell above the active components. Alternatively, a planar shaped inductive coil may be positioned at the bottom of the battery cell underneath the active components.

In another aspect, an inductive coil may have a looped or spiral configuration and positioned on the interior surface of the battery housing, casing, or packaging material.

In yet another aspect, an inductive coil may have a looped or spiral configuration and positioned on the exterior surface of the battery housing, casing, or packaging material.

In yet another aspect, an inductive coil may have a looped or spiral configuration and embedded in the battery housing, casing, or packaging material.

In yet another embodiment, an inductive coil may be positioned at the battery module level, wherein a battery module is defined as a compartment comprising of two or more battery cells.

In an aspect, an inductive coil may have a looped or spiral configuration inside the battery module and positioned around two, or more, or all the battery cells.

In another aspect, an inductive coil may have a looped or spiral configuration around the outside of the battery module and positioned around the entirety of the module.

In yet another aspect, an inductive coil may have a planar configuration inside the battery module and positioned over, or under, two, or more, or all the battery cells.

In yet another aspect, an inductive coil may have a planar configuration outside the battery module and positioned above, below, or to the side of the battery module.

In yet another embodiment, an inductive coil may be positioned at the battery pack level, wherein a battery pack is defined as a compartment comprising of two or more battery modules.

In an aspect, an inductive coil may have a looped or spiral configuration inside the battery pack and positioned around two, or more, or all the battery modules.

In another aspect, an inductive coil may have a looped or spiral configuration around the outside of the battery pack and positioned around the entirety of the pack.

In yet another aspect, an inductive coil may have a planar configuration inside the battery pack and positioned over, or under, two, or more, or all the battery modules.

In yet another aspect, an inductive coil may have a planar configuration outside the battery pack and positioned above, below, or to the side of the battery pack.

In yet another embodiment, an inductive coil may be positioned externally of the application using the batteries with inductively heatable materials embedded or suspended within.

In an aspect, an external inductive coil may be used to heat up an individual battery in a mobile application.

In another aspect, an external inductive coil may be used to heat up batteries in a battery module of a mobile application.

In yet another aspect, an external inductive coil may be used to heat up batteries in a battery pack of a mobile application.

The present disclosure relates to primary batteries.

A battery may include a primary battery, wherein the battery has a single discharge cycle. Types of primary batteries may include, for example, alkaline batteries (or alkaline zinc-manganese dioxide), zinc-carbon batteries (or Leclanché cell), zinc chloride batteries (or heavy duty), silver-oxide batteries (or zinc-silver oxide), mercury batteries (or zinc-mercuric oxide), nickel oxyhydroxide batteries, magnesium batteries, lithium batteries (lithium carbon monofluoride, lithium iron disulfide, lithium-thionyl chloride, lithium manganese dioxide, lithium sulfide dioxide), aluminum-air, zinc-air, sugar batteries, paper batteries, organic radical battery, etc.

Alkaline or alkaline zinc-manganese dioxide batteries may be characterized as a dry cell primary battery with a zinc powder/gel negative electrode (anode) and manganese dioxide/carbon paste (positive electrode or cathode) coated on to the container, wherein an alkali metal hydroxide solution such as potassium hydroxide serves as the electrolyte.

Zinc-carbon (Lechanché or Standard Duty) batteries may be characterized as a dry cell primary battery with zinc serving as both the negative electrode (anode) and container and manganese dioxide as the positive electrode (cathode) on a carbon rod serving as the current collector, wherein an ammonium chloride solution serves as the electrolyte.

Zinc chloride (Heavy Duty, Super Heavy Duty, Extra Heavy Duty) batteries may be characterized as a dry cell primary battery with zinc serving as both the negative electrode (anode) and container and a manganese dioxide positive electrode (cathode) on a carbon rod serving as the current collector, wherein a zinc chloride solution serves as the electrolyte.

Silver-oxide or zinc-silver oxide batteries may be characterized as a dry cell primary battery with zinc or an amalgamated zinc gel as the negative electrode (anode) and a silver oxide paste as the positive electrode (cathode), wherein an alkali metal hydroxide solution such as potassium hydroxide or sodium hydroxide serves as the electrolyte. In some instances, the negative electrode may have a small percentage ($\leq 1\%$) of mercury. In other instances, the positive electrode may be mixed with manganese dioxide.

Mercury or zinc-mercury oxide batteries may be characterized as a dry cell primary battery with a with zinc as the negative electrode (anode) and mercury oxide as the positive electrode (cathode), where an alkali metal hydroxide solution such as potassium hydroxide or sodium hydroxide serves as the electrolyte. In some instances, the manganese dioxide may be mixed into the positive electrode.

Nickel oxyhydroxide batteries may be characterized as a dry cell primary battery with zinc as the negative electrode (anode) and manganese dioxide mixed with nickel oxyhydroxide as the positive electrode (cathode), wherein an alkali metal hydroxide solution such as potassium hydroxide serves as the electrolyte.

Magnesium batteries may be characterized as a dry cell primary battery with magnesium as the negative electrode (anode) and silver chloride as the positive electrode (cathode) as in the case of the BA-4386, wherein the battery is activated with water to form a silver chloride electrolyte solution.

Lithium batteries may be characterized as a primary battery with lithium metal as the negative electrode (anode) and a variety of materials as the positive electrode (cathode). For instance, Lithium Carbon Monofluoride batteries use carbon monofluoride as the cathode. In another instance, Lithium Iron Disulfide batteries use iron disulfide as the cathode. In yet another instance, Lithium Manganese Dioxide batteries use manganese dioxide as the cathode. In yet another instance, Lithium Copper Oxide batteries use copper oxide as the cathode. These lithium batteries use an organic-based electrolyte such as lithium perchlorate or lithium tetrafluoroborate in propylene carbonate.

Another example of a primary lithium battery is the Lithium Thionyl Chloride battery which uses liquid thionyl chloride as the cathode and a non-aqueous inorganic electrolyte such as lithium tetrachloroaluminate dissolved in thionyl chloride. In some instances, bromide chloride may be added to the thionyl chloride cathode to increase voltage. Such batteries are typically used for cold weather environments, wherein induction heating is expected to only increase the temperature to a sufficient operating temperature in extreme cold environments.

Other primary lithium batteries may be specialized having a cathode composed of, for example, lithium silver chromate, lithium silver vanadium oxide, lithium lead bismuthate, lithium bismuth trioxide, lithium copper sulfide, lithium lead copper sulfide, lithium iodine, lithium sulfur dioxide, lithium sulfuryl chloride, etc.

Standard sizes of batteries may include, for example, cylindrical (D, C, AA, AAA, AAAA, etc.), button or coin cell (LR44, CR2032, CR2016, CR2025, BR2330, CR2330, LR1154, SR516, etc.), pouch, prismatic, 4.5V multicell, 9V multicell, etc.

Zinc-air batteries are a primary metal-air battery ranging in size from a button cell to large scale for grid energy storage backup. Zinc-air batteries may contain a zinc anode and a porous cathode containing a catalyst, wherein an alkali metal hydroxide solution such as potassium hydroxide may serve as the electrolyte.

Aluminum-air batteries are a primary metal-air battery with an aluminum metal and a porous cathode containing a catalyst, wherein metal hydroxide solution such as potassium hydroxide may serve as the electrolyte. Alternatively, seawater may be used as an electrolyte in some instances. An exemplary cathode is composed of a nickel grid coated with a layer of carbon and a cobalt catalyst, all coated with a porous hydrophobic layer of polytetrafluoroethylene (PTFE).

The present disclosure relates to primary battery electrolytes.

Electrolytes for primary batteries may be in liquid form. The liquid electrolyte may include, for example, aqueous, non-aqueous organics, or non-aqueous inorganics.

An aqueous liquid electrolyte may include an ammonium chloride solution as in the case of a Zinc-Carbon battery. An aqueous liquid electrolyte may include a zinc chloride solution as in the case of a Zinc-Chloride battery. An aqueous liquid electrolyte may include a silver chloride solution as in the case of a Magnesium battery. An aqueous liquid electrolyte may include an alkali metal hydroxide solution such as potassium hydroxide or sodium hydroxide as in the case for Alkaline batteries, Silver-Oxide batteries, Mercury batteries, Nickel Oxyhydroxide batteries, Zinc-air batteries, and Aluminum-air batteries. In some instances, the electrolyte may be in the form of seawater containing alkali metal hydroxides as in the case of Aluminum-air batteries.

A non-aqueous organic liquid electrolyte may include lithium perchlorate or lithium tetrafluoroborate dissolved in propylene carbonate as in the case of Lithium Carbon Monofluoride batteries, Lithium Iron Disulfide batteries, Lithium Manganese Dioxide batteries, and Lithium Copper Oxide batteries. A non-aqueous inorganic liquid electrolyte may include lithium tetrachloroaluminate dissolved in thionyl chloride as in the case of Lithium Thionyl Chloride batteries.

The present disclosure relates to secondary batteries. A secondary battery may be defined as a battery that is rechargeable or not limited to one discharge cycle. A secondary battery has an anode and cathode that are in electrical contact through an external circuit but physically separated by an electrolyte, and in some instances a separating porous material. Secondary batteries may be in the form of, for example, ion-based batteries, metal batteries, air-batteries, thin film batteries, or micro batteries. Types of secondary ion-based batteries, or intercalation batteries, may include, for example, lithium ion batteries, lithium-ion polymer, sodium ion batteries, magnesium ion batteries, aluminum ion batteries, potassium ion batteries, zinc ion batteries, lithium titanate battery, etc.

A positive electrode cathode for an ion-based secondary battery may include an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

A negative electrode or anode for an ion-based secondary battery may include an active material such as, for example, graphite, titanate, titanium oxide, silicon, tin oxide, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

Ion-based secondary batteries may be defined as a liquid battery with a liquid electrolyte, a polymer battery with a polymer or gel-polymer electrolyte, a solid-state battery with a solid-polymer, solid-state ceramic, or a composite electrolyte, or a combination thereof.

In the case of a liquid or polymer battery, the negative electrode may be coated with an artificial solid electrolyte interface layer.

In the case of a solid-state battery, the positive and negative electrodes may contain an ionic conductive media to facility ion transportation in said electrode.

In the case of a solid-state battery, the positive electrode and/or the negative electrode may be coated with a protective layer to enhance stability at the electrode/electrolyte interface. Such layers are assumed to be composed materials capable of ionic conduction.

Types of secondary metal-based batteries may include, for example, lithium metal batteries, sodium metal batteries, magnesium metal batteries, aluminum metal batteries, potassium metal batteries, zinc metal batteries.

A positive electrode cathode for a metal-based secondary battery may include an active intercalation material such as, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide $FeF_3$, LiSe.

In the case of a lithium intercalation, cathodes may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5$, $0.3 \geq y \geq 0.025$, $0.2 \geq z \geq 0.025$), lithium nickel cobalt aluminum oxide ($LiNi_xCo_yAl_zO_2$, $0.95 \geq x \geq 0.5$, $0.3 \geq y \geq 0.025$, $0.2 \geq z \geq 0.025$), lithium nickel manganese spinel ($LiNi_{0.5}Mn_{1.5}O_4$), etc.

A negative electrode anode for a metal-based secondary battery may include, for example a metal or metal-alloy interacting with ions through a plating and stripping mechanism. Such metal anodes may comprise of, for example, lithium metal, lithium metal alloy, sodium metal, sodium metal alloy, magnesium metal, magnesium metal alloy, aluminum metal, aluminum metal alloy, potassium metal, potassium metal alloy, zinc metal, zinc metal alloy. Alloying materials may include, for example, indium, manganese, etc.

Metal-based secondary batteries may be defined as a liquid battery with a liquid electrolyte provided that dendrite formation is prohibited, a polymer battery with a polymer or gel-polymer electrolyte provided that dendrite formation is prohibited, or a solid-state battery with a solid-polymer, solid-state ceramic, or a composite electrolyte, or a combination thereof.

In the case of a liquid or polymer battery, the negative electrode may be coated with an artificial solid electrolyte interface layer.

In the case of a solid-state battery, the positive electrode may contain an ionic conductive media to facility ion transportation in said electrode.

In the case of a solid-state battery, the positive electrode and/or the metal/metal alloy anode may be coated with a protective layer to enhance stability at the electrode/electrolyte interface. Such layers are assumed to be composed materials capable of ionic conduction.

Types of secondary air-batteries may include, for example, lithium-air batteries, sodium-air batteries, potassium-air batteries, iron-air batteries, silicon-air batteries.

A secondary air-battery may contain metal, metal alloy, metal oxide as the negative electrode or anode. For example, a lithium-air battery may contain lithium metal or a lithium metal alloy. A sodium-air battery may contain sodium metal or sodium metal alloy. A potassium-air battery may contain potassium metal or a potassium metal alloy. A silicon-air battery may contain silicon metal, a silicon wafer, or a silicon alloy. An iron-air battery may contain iron metal or iron oxide anode.

A secondary air-battery anode may be coated with a thin layer to serve as, for example, an artificial solid electrolyte interface layer as a protective layer or a layer to reduce resistance at the electrode electrolyte interface where in the air-battery is composed of a solid-state electrolyte.

A secondary air-battery may contain a porous cathode structure as to allow atmospheric oxygen to enter the system. The porous cathode may be composed of carbon such as a mesoporous carbon. Alternatively, the porous cathode may be a screen, grid, or foam material such as nickel foam, and coated with a carbon layer.

The secondary air-battery may contain a catalyst such as, for example, manganese, cobalt, ruthenium, platinum, silver, or a combination thereof. A catalyst may be deposited onto the carbon in the instance of a catalyst particle or oriented within the carbon structure as a dopant.

Alternatively, a secondary air-batteries may be devoid of a cathode structure where atmospheric oxygen acts as the cathode, as in the case of silicon-air batteries.

A secondary air-battery may contain an electrolyte with the nature or composition of, for example, aprotic, aqueous, mixed aqueous/aprotic, or solid-state.

Other types of secondary batteries may include, for example, lead acid battery, nickel cadmium battery, nickel-metal hydride battery, silver-zinc battery, nickel-iron battery, nickel-zinc battery, lithium-sulfur battery, rechargeable alkaline battery, glass battery or organic radical battery.

Lead acid batteries may be characterized as a secondary battery with a lead plate for negative electrode (anode) and lead oxide plate for the positive electrode (cathode) in the charged state, wherein aqueous sulfuric acid is the electrolyte. In the discharge state both plates may become lead sulfate. Such batteries may be in the form of a liquid cell, wherein a separate may be rubber, glass fiber, cellulose, or polyethylene, in the form of a gel which comprise of a silica gelling agent, or in the form of an absorbed glass mate (AGM) with limited sulfuric acid. The gel and AGM forms may be further classed as a maintenance free, sealed, and/or valve-regulated lead acid (VRLA).

Nickel cadmium batteries may be characterized as a secondary battery with metallic cadmium as the negative electrode (anode) and nickel oxide hydroxide as the positive electrode (cathode), wherein an alkali metal hydroxide solution such as potassium hydroxide may serve as the electrolyte. Nickel cadmium batteries may be sealed, as in the case of small compact cells, or vented as in the case for stand by emergency power backup or aviation purposes.

Nickel-metal hydride batteries may be characterized as a secondary battery with nickel oxide hydroxide as the positive electrode (cathode) and a hydrogen absorbing alloy as the negative electrode (anode), wherein an alkali metal hydroxide solution such as potassium hydroxide may serve as the electrolyte. A hydrogen absorbing alloy may be designated as an $AB_5$, where A is a mixture of lanthanum, cerium, neodymium, praseodymium, and B is nickel, cobalt, manganese, or aluminum, or an $AB_2$, where A is titanium or vanadium, and B is zirconium or nickel, modified with chromium, cobalt, iron, or manganese.

Silver-zinc batteries may be characterized as a secondary battery with metallic silver as the positive electrode (cathode) and a mixture of zinc oxide and pure zinc powders as the negative electrode (anode); wherein an alkali metal hydroxide solution such as potassium hydroxide may serve as the electrolyte.

Nickel-iron batteries may be characterized as a secondary battery with an iron plate as the negative electrode (anode) and nickel oxide hydroxide as the positive electrode (cathode), wherein an alkali metal hydroxide solution such as potassium hydroxide may serve as the electrolyte.

Nickel-zinc batteries may be characterized as a secondary battery with metallic zinc as the negative electrode (anode) and nickel oxide hydroxide as the positive electrode (cathode), wherein an alkali metal hydroxide solution such as potassium hydroxide may serve as the electrolyte.

Lithium-sulfur batteries may be characterized as a secondary battery with metallic lithium as the negative electrode (anode) and sulfur as the positive electrode (cathode); wherein a liquid organic solution composed of lithium salt and an ether, such as cyclic ether, short-chain ether, or glycol ether, or a combination thereof, serve as the electrolyte. Alternatively, the anode may be composed of carbon, lithiated carbon, or silicon. In some instance the sulfur cathode may be encapsulated within a carbon structure, or a structure of similar design, or coated with a polymer as to reduce or prevent the polysulfide shuttle effect.

Secondary batteries may also include molten-salt batteries such as, for example sodium-sulfur or sodium-nickel chloride (Zebra) batteries.

The present disclosure relates to secondary battery electrolytes. Secondary battery electrolytes may be in the form of, for example, liquid, polymer, gel polymer, solid-state ceramics, ceramic-polymer composite, or a combination thereof.

The characteristics of a liquid electrolyte for a secondary battery system may include the following, and may have the nature of, for example, aqueous or organic.

An aqueous secondary battery electrolyte may include sulfuric acid as in the case of lead acid batteries. An aqueous secondary battery electrolyte may include alkali metal hydroxide as in the case of Nickel Cadmium batteries, Nickel-Metal Hydride batteries, Silver-Zinc batteries, Nickel Iron batteries, Nickel Zinc batteries. An aqueous secondary battery electrolyte may include a lithium, sodium, potassium, magnesium, aluminum, or iron salt dissolved in water to serve as an electrolyte for a metal-air batteries, wherein specifics of such an electrolyte and systems thereof are further described in the art.

An organic secondary battery electrolyte may be used in ion-based, metal-based, metal-based secondary batteries. Examples of organic based liquid electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

Organic-based secondary battery electrolytes may include and ionic conducting salt. Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$), $LiNO_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide $(Mg(TFSI)_2)$ and magnesium bis(fluorosulfonyl)imide $(Mg(FSI)_2)$, magnesium bis(oxalato)borate $(Mg(BOB)_2)$, magnesium Difluro(oxalato)borate $(Mg(DFOB)_2)$, $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

The characteristics of a polymer electrolyte for a secondary battery system may include the following. Polymer electrolytes may be used in, for example, ion-based, metal-based, metal-air secondary batteries. Polymers for the crosslinked polymer matrix may be ionic conducting polymers or nonionic conducting polymers.

Examples of polymers included, for example, polyethylene glycol, polyisobutene (e.g., OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Polymer-based secondary battery electrolytes may include and ionic conducting salt. Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl) imide (Mg(FSI)$_2$), magnesium bis(oxalato)borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato)borate (KBOB), potassium Difluro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

In some instances, nonionic conducting additives may be used in the polymer matrix. Nonionic conductive additives may include, but not limited to, for example, inorganics such as alumina, titania, lanthanum oxide or zirconia; epoxies, resins, plasticizers, surfactants, binders etc.

The characteristics of a gel polymer electrolyte for a secondary battery system may include the following. Gel polymer electrolytes may be used in, for example, ion-based, metal-based and metal-air secondary batteries. A gel polymer electrolyte may be composed of, but not limited to, a polymer matrix, an ionic conducting salt and a liquid-based electrolyte.

Polymers for the crosslinked polymer matrix in a gel polymer electrolyte may be ionic conducting polymers or nonionic conducting polymers.

Examples of polymers include, for example, polyethylene glycol, polyisobutene (e.g., OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluoro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato)borate (Mg(BOB)$_2$), magnesium Difluoro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato)borate (KBOB), potassium Difluoro(oxalato)borate (KDFOB), KSCN, KBr, KI, KClO$_4$, KAsF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

In some instances, nonionic conducting additives may be used in the polymer matrix. Nonionic conductive additives may include, but not limited to, for example, inorganics such as alumina, titania, lanthanum oxide or zirconia; epoxies, resins, plasticizers, surfactants, binders etc.

Liquid based electrolytes in gel polymer electrolytes may include, for example organic based liquid electrolyte and ionic liquid electrolyte.

A gel polymer electrolyte may include an organic based liquid electrolyte. Examples of organic based liquid electrolyte may include, for example, ethylene carbonate (EC), fluoroethylene carbonate (FEC), propylene carbonate (PC), ethyl-methyl carbonate (EMC), dimethyl carbonate (DMC), diethyl carbonate (DEC), dimethyl ether (DME), diethylene glycol dimethyl ether (DEGDME), tetraethylene glycol dimethyl ether (TEGDME), 1,3-dioxolane (DOL), and 1-ethyl-3-methylimidoxzoium chloride and the mixtures of two or more of them.

A gel polymer electrolyte may include a room temperature ionic liquid electrolyte. Examples of room temperature ionic liquid electrolytes may include, for example, imidazolium, pyrrolidinium, piperidinium, ammonium, hexafluorophosphate, dicyanamide, tetrachloroaluminate, sulfonium, phosphonium, pyridinium, pyrazolium and thiazolium.

A gel polymer electrolyte may consist of a mixture of organic based liquid electrolyte and room temperature ionic liquid electrolyte.

The characteristics of a solid-state ceramic electrolyte may include the following. Solid-state ceramic electrolytes may be used in, for example, ion-based, metal-based and metal-air secondary batteries.

A solid-state ceramic electrolyte includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

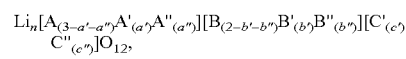

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv, wherein $0 \le a' \le 2$ and $0 \le a" \le 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv, wherein $0 \le b'$, $0 \le b"$, and $b'+b" \le 2$;

c. where C' and C" stand for a tetrahedral position of the crystal structure, i. where C' stands for one or more of Al, Ga, and boron, ii. where C" stands for one or more of Si and Ge, and iii, wherein $0 \le c' \le 0.5$ and $0 \le c" \le 0.4$; and d. wherein $n=7+a'+2 \cdot a"-b'-2 \cdot b"-3 \cdot c'-4 \cdot c"$ and $4.5 \le n \le 7.5$.

In another example, a solid-state ionic conductive material includes perovskite-type oxides such as (Li,La)TiO$_3$ or doped or replaced compounds.

In yet another example, a solid-state ionic conductive material includes NASICON-structured lithium membrane, such as LAGP (Li$_{1-x}$Al$_x$Ge$_{2-x}$(PO$_4$)$_3$), LATP (Li$_{1+x}$Al$_x$Ti$_{2-x}$(PO$_4$)$_3$) and these materials with other elements doped therein.

In yet another example, a solid-state ionic conductive material includes anti-perovskite structure materials and their derivatives, such as the composition of Li$_3$OCl, Li$_3$OBr, Li$_3$OI.

In yet another example, a solid-state ionic conductive material includes Li$_3$YH$_6$ (H=F, Cl, Br, I) family of materials, Y can be replaced by other rare earth elements.

In yet another example, a solid-state ionic conductive material includes Li$_{2x}$S$_{x+w+5z}$M$_y$P$_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: Li$_{12-m-x}$(M$_m$Y$_4^{2-}$)Y$_{2-x}^{2-}$X$_x^-$; wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \le x \le 2$.

The characteristics of a ceramic-polymer composite electrolyte may include the following. Ceramic-polymer electrolytes may be used in, for example, ion-based, metal-based and metal-air secondary batteries. A ceramic-polymer composite electrolyte may be composed of, for example, polymers, ionic conducting salt, ionic conductive ceramics, and nonionic conducting additives.

The polymer may be chemically stable with the ionic conductive ceramics. Alternatively, and in some instances, the polymer may chemically react with the ionic conductive ceramics to improve ionic conductivity. Polymers for the crosslinked polymer matrix may be ionic conducting polymers or nonionic conducting polymers.

Examples of polymers included, for example, polyethylene glycol, polyisobutene (e.g. OPPANOL™), polyvinylidene fluoride, polyvinyl alcohol. Additional examples of suitable polymer include, for example, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(ε-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(ε-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

Examples of ionic conducting salts may include, for example, lithium bis(trifluoromethanesulfonyl)imide (LiTFSI) and lithium bis(fluorosulfonyl)imide (LiFSI), lithium bis(oxalato)borate (LiBOB), lithium Difluoro(oxalato)borate (LiDFOB), LiSCN, LiBr, LiI, LiClO₄, LiAsF₆, LiSO₃CF₃, LiSO₃CH₃, LiBF₄, LiB(Ph)₄, LiPF₆, LiC(SO₂CF₃)₃, LiN(SO₂CF₃)₂), LiNO₃, sodium bis(trifluoromethanesulfonyl)imide (NaTFSI) and sodium bis(fluorosulfonyl)imide (NaFSI), sodium bis(oxalato)borate (NaBOB) Sodium-difluoro(oxalato)borate (NaDFOB), NaSCN, NaBr, NaI, NaAsF₆, NaSO₃CF₃, NaSO₃CH₃, NaBF₄, NaPF₆, NaN(SO₂F)₂, NaClO₄, NaN(SO₂CF₃)₂, NaNO₃, magnesium bis(trifluoromethanesulfonyl)imide (Mg(TFSI)₂) and magnesium bis(fluorosulfonyl)imide (Mg(FSI)₂), magnesium bis(oxalato)borate (Mg(BOB)₂), magnesium Difluoro(oxalato)borate (Mg(DFOB)₂), Mg(SCN)₂, MgBr₂, MgI₂, Mg(ClO₄)₂, Mg(AsF₆)₂, Mg(SO₃CF₃)₂, Mg(SO₃CH₃)₂, Mg(BF₄)₂, Mg(PF₆)₂, Mg(NO₃)₂, Mg(CH₃COOH)₂, potassium bis(trifluoromethanesulfonyl)imide (KTFSI) and potassium bis(fluorosulfonyl)imide (KFSI), potassium bis(oxalato)borate (KBOB), potassium Difluoro(oxalato)borate (KDFOB), KSCN, KBr, KI, KClO₄, KAsF₆, KSO₃CF₃, KSO₃CH₃, KBF₄, KB(Ph)₄, KPF₆, KC(SO₂CF₃)₃, KN(SO₂CF₃)₂), KNO₃, Al(NO₃)₂, AlCl₃, Al₂(SO₄)₃, AlBr₃, AlI₃, AlN, AlSCN, Al(ClO₄)₃.

An ionic conductive ceramic includes or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example H⁺, Li⁺, Na⁺, K⁺, Ag⁺, Mg²⁺, Zn²⁺, Al³⁺, Fe³⁺, etc.

The ionic conductivity of the corresponding ions is preferably to be >10⁻⁷ S/cm. It is preferably to have lower electronic conductivity (<10⁻⁷ S/cm).

Examples of the solid-state ionic conductive material include for example a garnet-like structure oxide material with the general formula:

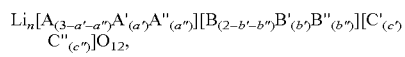
$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv, wherein 0≤a'≤2 and 0≤a"≤1;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv, wherein 0≤b', 0≤b", and b'+b"≤2;

c. where C' and C" stand for a tetrahedral position of the crystal structure, i. where C' stands for one or more of Al, Ga, and boron, ii. where C" stands for one or more of Si and Ge, and iii, wherein 0≤c'≤0.5 and 0≤c"≤0.4; and d. wherein n=7+a'+2·a"−b'−2·b"−3·c'−4·c" and 4.5≤n≤7.5.

In another example, a solid-state ionic conductive material includes perovskite-type oxides such as (Li,La)TiO₃ or doped or replaced compounds.

In yet another example, a solid-state ionic conductive material includes NASICON-structured lithium membrane, such as LAGP (Li₁₋ₓAlₓGe₂₋ₓ(PO₄)₃), LATP (Li₁₊ₓAlₓTi₂₋ₓ(PO₄)₃) and these materials with other elements doped therein.

In yet another example, a solid-state ionic conductive material includes anti-perovskite structure materials and their derivatives, such as the composition of Li₃OCl, Li₃OBr, Li₃OI.

In yet another example, a solid-state ionic conductive material includes $Li_3YH_6$ (H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x^-$; wherein $M^{m+}=B^{3+}, Ga^{3+}, Sb^{3+}, Si^{4+}, Ge^{4+}, P^{5+}, As^{5+}$, or a combination thereof; $Y^{2-}=O^{2-}, S^{2-}, Se^{2-}, Te^{2-}$, or a combination thereof; $X^-=F^-, Cl^-, Br^-, I^-$, or a combination thereof; and x is in the range of $0 \le x \le 2$.

The ionic conductive ceramics may have a weight content of 0.1 to 99.9% relative to the polymer content.

In some instances, nonionic conducting additives may be used in the polymer matrix.

Nonionic conductive additives may include, for example, inorganics such as alumina, titania, lanthanum oxide or zirconia; epoxies, resins, plasticizers, surfactants, binders etc.

The present disclosure relates to embedded materials with inductive heating properties.

Induction heating may be defined as a process by which materials with inductive heating properties are embedded or suspended within the electrolyte of a battery and are heated by the generation of eddy currents using electromagnetic induction.

Inductively heatable materials include any material capable of generating eddy currents when in the presence of an induced magnetic field. Such materials may be described as conductors, ferromagnetic materials, or semiconductors.

Inductively heatable materials embedded or suspended in the electrolyte of a battery may include, for example, iron, steel, nickel, Zinc, cobalt, aluminum, copper, silicon, carbon, neodymium, manganese, ferrite, magnetite ($Fe_3O_4$), brass, silicon carbide, $Co_2Ba_2Fe_{12}O_{22}$, $SrFe_{12}O_{19}$, and the alloys and mixtures of them.

Inductively heatable materials may be in the form of, for example, a wire or fiber, a single element or particle, or a metal mesh-based fabric support.

The present description relates to inductively heatable materials in the form of small particles, powder, or sphere like configuration.

Inductively heatable materials may be defined as zero-dimension powders.

Inductively heatable materials may be defined as two-dimensional flakes, or sheets.

Inductively heatable materials may be suspended or dispersed in the electrolyte or formed within the electrolyte matrix.

Inductively heatable materials may be suspended or dispersed in a precursor solution and then become part of the final electrolyte matrix, in the case of polymer, gel polymer, or ceramic-polymer composite electrolyte.

Inductively heatable materials may be added to a ceramic mixture prior to the electrolyte formation, in the case of solid-state electrolytes or ceramic-polymer composite electrolytes.

Inductively heatable materials may have a particle size in the range of $0<s<100$ μm, with a preferred range of $0<s<1$ μm.

Inductively heatable materials may be commonly referred to as, for example, quantum dots, nano dots, powder, micro particles, flakes, spheres, microspheres, nanospheres, etc.

Inductively heatable materials may be conformally coated with an insulating material such a polymer or an inorganic nonelectronic conductive material to form a core-shell structure.

Electrically insulative coating thickness may be in the range of $0<t<3000$ nm, with a preferred range of $0<t<100$ nm.

An electrically insulative coating may have electronic conductivity value of less than $10^{-6}$ S cm$^{-1}$, with preferred value of $10^{-9}$ S cm$^{-1}$ or less.

Inductively heatable materials may be suspended or dispersed by the use of a surfactant, in the case of liquid electrolytes. Liquid electrolytes may refer to aqueous or nonaqueous based electrolytes.

Surfactants may be anionic, cationic, nonionic, or amphoteric. Anionic surfactants may include, for example, sulfates ($C_nH_{2n+1}OSO_3^-Na^+$), sulfonates ($C_nH_{2n+1}SO_3H$), phosphates ($C_nH_{2n+1}OPO_3H_2$), carboxylates ($C_nH_{2n+1}COOH$). Cationic surfactants may include, for example, alkylammonium ($C_nH_{2n+1}(CH_3)NX$ [X=OH, Cl, Br, $HSO_4$]), dialkylammonium (($C_{16}H_{33})_2(CH_3)_2N^+Br^-$). Non-ionic surfactants may include, for example, primary amines ($C_nH_{2n+1}NH_2$), polyethylene oxides ($HO(CH_2CH_2O)_nH$).

Inductively heatable materials may be located at the surface of the electrolyte and in contact with, for example, a separator, fabric substrate, negative electrode, or positive electrode.

The present description relates to inductively heatable materials supported or deposited on or in a battery separator.

A battery cell separator is defined as a porous material that allows ions and liquid to pass through and not selective toward any ions. Separator materials may include, for example, nonwoven fibers, such as cloth, nylon, polyester, glass fiber, glass mats, polymers, such as polyethylene, polypropylene, poly(tetrafluoroethylene, polyvinyl chloride, polyamide, polyolefin, polyacrylonitrile, cellulose, and natural materials, such as wood, rubber, and asbestos.

Inductively heatable materials may be deposited onto, or within, a separator using methods such as, for example, drop casting, spin coating, spraying, tape casting, dip coating, evaporation, Langmuir-Blodgett, gel casting, chemical vapor deposition, physical vapor deposition, etc.

The inductively heatable materials may be introduced into the separator production process so that the inductive heating materials are embedded in the separators.

Inductively heatable materials deposited on, or embedded within, a separator, may be defined as zero-dimension powders.

Inductively heatable materials deposited on, or embedded within, a separator may be defined as two-dimensional flakes, or sheets.

Inductively heatable materials deposited in or on a separator material may have a particle size in the range of $0<s<100$ μm, with a preferred range of $0<s<1$ μm.

The inductively heatable materials deposited in or on a separator material may be commonly referred to as, for example, quantum dots, nano dots, micro particles, etc.

The inductively heatable materials deposed in or on a separator material may be conformally coated with an insulating material such a polymer or an inorganic nonelectronic conductive material to form a core-shell structure.

Electrically insulative coating thickness may be in the range of $0<t<3000$ nm, with a preferred range of $0<t<100$ nm.

An electrically insulative coating may have electronic conductivity value of less than $10^{-6}$ S cm$^{-1}$, with preferred value of $10^{-9}$ S cm$^{-1}$ or less.

Inductively heatable materials deposited in or on a separator material may be in contact with, for example, an electrolyte, negative electrode, positive electrode, or a combination thereof.

Alternatively, the inductively heatable materials may be deposited onto a fabric support using methods such as, for example, drop casting, spin coating, spraying, tape casting, dip coating, evaporation, Langmuir-Blodgett, gel casting, chemical vapor deposition, physical vapor deposition, etc., wherein the fabric support is used to support an electrolyte such as a gel polymer electrolyte, solid polymer electrolyte, or a ceramic-polymer composite electrolyte.

The present description relates to inductively heatable wires or fibers.

The inductively heatable wires or fibers may be coated with an electrically insulative material such as, for example, an electrically insulative polymer, metal oxide, or ceramic to form a core-shell structure.

Electrically insulative coating thickness may be in the range of $0<t<3000$ nm, with a preferred range of $0<t<100$ nm.

An electrically insulative coating may have electronic conductivity value of less than $10^{-6}$ S cm$^{-1}$, with preferred value of $10^{-9}$ S cm$^{-1}$ or less.

An inductively heatable wire or fiber may be defined as a one-dimensional or two-dimensional material.

An inductively heatable wire or fiber may have a diameter in the range of $0.01<d<1000$ μm, with a preferred range of $0.1<d<10$ μm.

Inductively heatable wires or fibers may be commonly referred to as, for example, nanowires, nanofibers, microwires, microfibers, nanotubes, microtubes, multiwalled, single walled, etc.

A solid electrolyte may contain multiple inductively heatable wires or fibers. And the solid electrolyte may be supported onto a fabric support.

The inductively heatable wires or fibers may have an orientation of, for example, spiral, curled, bent, straight, mesh, or random.

In the case of a spiral, curled, or bent orientation, it preferable that a single inductively heatable wire or fiber is flat in what is commonly referred to as a pancake shape. In such an instance, it is preferable that the pancake shape wire or fiber will be positioned on to one side of a solid electrolyte near an electrode. In this instance, the solid electrolyte may be supported on a fabric support. Though it is preferred that the pancake shaped wire or fiber be embedded within the solid electrolyte near one surface, there may be instances where the wire or fiber makes contact with either the anode or cathode or both. Alternatively, the pancake shaped wire or fiber may be positioned in the middle of the solid electrotype, in which case it is preferable that there is no fabric support.

In the case of a straight orientation, it is preferable that multiple inductively heatable wires or fibers run areawise of a layer solid electrolyte. The inductively heatable wires or fibers may run parallel to each other. In such an instance, it is preferable that the inductively heatable wires or fibers will be positioned on to one side of the solid electrolyte near, but preferably not in contact with, the anode or cathode. In this instance, the solid electrolyte may be supported on a fabric support. Though it is preferred that the inductively heatable wires or fibers be embedded within the solid electrolyte near one surface, there may be instances where the wires or fibers make contact with the anode or cathode or both. Alternatively, the inductively heatable wires or fibers may be positioned in the middle of the solid electrotype, in which case it is preferable that there is no fabric support.

In the case of a mesh orientation, it is preferable that the multiple inductively heatable wires or fibers run areawise of a layer of the solid electrolyte. The inductively heatable wires or fibers may be orientated in a screen or grid like fashion. In such an instance, it is preferable inductively heatable wires or fibers (or mesh) will be positioned on to one side of the solid electrolyte near the anode or cathode. In this instance, the solid electrolyte may be supported on a fabric support. Though it is preferred that the inductively heatable wires or fibers (or mesh) be embedded within the solid electrolyte near one surface, there may be instances where the wires or fibers (or mesh) makes contact with the anode or cathode or both. Alternatively, the inductively heatable wires or fibers (or mesh) may be positioned in the middle of the solid electrotype, in which case it is preferable that there is no fabric support. In this instance, the mesh is a planar, non-porous, non-supporting material in which the solid electrolyte is simply coated onto, wherein the mesh is not acting as a support structure.

In the case of a random orientation, the multiple inductively heatable wires or fibers may be orientated or transverse through a thickness of the layer of solid electrolyte, or throughout the fabric support. In this instance the inductively heatable wires or fibers are positioned throughout a fabric support prior to the formation of the solid electrolyte. The inductively heatable wires or fibers may be in a parallel fashion or, a screen, grid, or mesh like formation throughout the fabric support. Alternatively, the wires or fibers are mixed with the solid electrolyte prior to the formation onto the fabric support.

The present description relates to inductively heatable fabric support.

An inductively heatable material may be a fabric support with induction heating properties such as metal mesh fabric support that is used to support the electrolyte, wherein the metal fabric is used as both inductively heatable material and the supporting material of electrolytes such as gel polymer electrolytes, polymer electrolytes, ceramic-polymer composite electrolytes, and solid-state ceramic electrolytes.

An inductively heatable metal mesh may be conformally coated with an electronic insulating material such a polymer or an inorganic nonelectronic conductive material to form a core-shell structure.

Electrically insulative coating thickness may be in the range of $0<t<3000$ nm, with a preferred range of $0<t<100$ nm.

An electrically insulative coating may have electronic conductivity value of less than $10^{-6}$ S cm$^{-1}$, with preferred value of $10^{-9}$ S cm$^{-1}$ or less.

An inductively heatable metal mesh may be in contact with both the positive and negative electrodes simultaneously provided that entirely of the metal mesh surface is covered with a conformally coated insulative layer.

The present disclosure relates to an induction heating system.

An induction heating system may be composed of an inductive heating coil and inductively heatable materials embedded or suspended within the electrolyte of a battery.

An alternating current is passed through an inductive coil generating a magnetic field within and around said inductive coil. The magnetic field may generate eddy currents within induction heating materials embedded or suspended within the electrolyte. The generated eddy currents provide the localized heat necessary to raise the internal temperature of the electrolyte to facilitate ionic conduction in cold environment.

In some instances, the induction heating may be used to melt to electrolyte components to enable operation at elevated temperatures.

In yet another instance, induction heating may be used to heat up the electrolyte of an electrochemical cell to enable operation at high temperatures.

An induction heating system may be powered by a power source.

A power source for the induction heating system may include the grid.

A power source for the induction heating system may include the batteries themselves, wherein a portion of the discharge energy is used to power the induction heating system.

A power source for the induction heating system may include a secondary group of batteries or other electrochemical technologies. For example, the induction heating system of an electric car may be heated by batteries, or a capacitor, that is separate for the batteries with inductively heatable materials embedded within.

In the case of an electric vehicle, an induction heating system may be powered by a charging station connected to the grid or powered from a stationary power generating platform. A stationary power generating platform may get power for a source such as, for example, solar, wind, flow battery, etc.

Alternatively, and in the case of an electric vehicle, the alternating current may be generated from a home plugin source.

The present disclosure relates to induction heating system parameters.

An induction heating system, or the alternating current, may have a frequency in the range of $0.05 < f < 250$ kHz, with a preferred range of $0.1 < f < 200$ kHz.

The alternating current may be pulsed at intervals with a duration in the range of $0.000001 \leq s \leq 10$ seconds, with a preferred range of $0.001 \leq s \leq 1$ seconds. Time between intervals may have a duration in the range of $0.001 \leq s \leq 1000$ s, with a preferred range of $1 \leq s \leq 100$ seconds.

It is assumed that pulsed alternating current, at longer durations, and with less time between the intervals, is used to heat up a battery in cold environments to a desired temperature near ambient conditions.

It is assumed that pulsed alternating current, at shorter durations, and with more time between the intervals, is used to stabilize a temperature, and said temperature is near ambient conditions, wherein the battery is in a cold environment.

It is assumed that pulsed alternating current at longer duration, and with more time between the intervals; or alternatively, shorter duration, and with less time between the intervals are used to heat up and maintain a battery at elevated temperature above ambient conditions, wherein the battery is in a cold environment.

Pulsed alternating current is assumed to be used as to not overheat or damage the battery and the surrounding components. And that the pulsation of the alternating current is engineered and controlled to perform the specific function of the induction heating system without detrimental side effects to the battery or its performance.

Alternatively, a continuous alternating current may be used. In this instance, it is assumed that the battery must be maintained at a temperature well above ambient conditions. It is assumed that the use of continuous current will not overheat or damage the battery or its surrounding components.

It is assumed that the induction heating system is designed and engineered to specifically target the inductively heatable materials embedded or suspended in the electrolyte. Thus, the inductive materials to be embedded or suspended, the frequency of the alternating current, the choice of continuous or pulsed, as well as the parameters thereof, are all chosen, designed, and engineered to target the embedded or suspended heating materials. Other components in the batteries such as the electrodes, both positive and negative, current collectors, tabs, packaging, bipolar plates, etc., may be heated as a byproduct of the induction heating system. However, it is assumed that they are not the target of the induction heating system.

It is further assumed that the induction heating system is designed and engineered as to not damage the other components of the battery, or to deteriorate the battery, or to result in the shortening of the life expectancy or performance of the battery.

In an electric vehicle, an induction heating may be initiated by the charging of the battery pack, wherein the charging station provides the power for the induction heating system allowing the battery pack to charge quickly In an electric vehicle, an induction heating may be initiated by the depressing of the acceleration pedal to provide an additional boost during electric vehicle acceleration.

In an electric vehicle, an induction heating may be initiated by a temperature sensor in or around the electric vehicle to enable induction heating in cold weather.

The present disclosure relates to the nature of the inductive coil.

An inductive heating coil may be referred to as an electromagnetic induction source.

An inductive coil may be used to pass an alternating current to induce magnetic field coupling.

Preferably the inductive coil is made up of copper. Alternatively, materials may include, for example, aluminum, silver, gold, brass, nickel, tungsten, chromium, carbon etc.

The coil may have a thickness in the range of $0.01 \leq t \leq 10$ mm, with a preferred thickness of $0.1 \leq t \leq 1$ mm.

The coil may be coated with an electronic insulating layer such as a transition metal oxide or a polymer. The insulating layer may have a thickness in the range of, for example, $0.01 \leq t \leq 500$ μm.

An electrically insulative coating may have electronic conductivity value of less than $10^{-6}$ S cm$^{-1}$, with preferred value of $10^{-9}$ S cm$^{-1}$ or less.

An inductive coil may be oriented or positioned at the battery cell level, wherein the inductive coil is either positioned inside the battery cell on the interior surface of the packaging material, outside the battery cell on the exterior surface of the packaging material, or embedded within the packaging material.

An inductive coil may be orientated or positioned at the battery module level, wherein the inductive coil is either positioned inside, or directly outside the battery module.

An inductive coil may be orientated or positioned at the battery pack level, wherein the inductive coil is either positioned inside, or directly outside the battery pack.

An inductive coil may be orientated or positioned externally of the application that uses a battery, or batteries, with inductively heatable material embedded within.

The present disclosure relates to the orientation of the inductive coil at the battery cell level.

A battery cell may be defined as a single battery composed of an anode, cathode, current collectors, and electrolyte with inductively heatable materials embedded or suspended within.

An inductive coil may be positioned inside or outside, but in the proximity of, the battery cell, An inductive coil may be embedded inside the battery packaging or housing material.

The present description relates to an inductive coil positioned inside the battery cell.

An inductive coil may be positioned inside the battery cell, but away from the active components of the battery.

The active components of the battery may be described as the cathode, anode, current collectors, separators, electrolytes and the inductively heatable materials suspended or embedded within.

In an aspect, an inductive coil may be positioned around the active components of the battery cell in a loop or spiral configuration.

The inductive coil may be positioned on or fixed to the inside or interior surface of the casing, housing, or packaging material of the battery cell.

In another aspect, an inductive coil may have a planar orientation, wherein it is positioned above or below the active components of the battery cell.

Though it is preferred that the planar inductive coil be positioned above or below the active components, the planar inductive coil may be positioned inside the battery in an undefined fashion.

The inductive coil may have leads protruding out of the battery packaging material.

The inductive coil may be connected to inductive coils in neighboring battery cells or to a power source. Electrical connections may be in either a series or parallel circuit.

The parameters of the induction heating system may be tuned to specifically heat the materials embedded or suspended within the electrolyte without heating the housing or casing materials of the battery cells.

The casing, housing, or packaging materials of the individual battery cells may be composed of a metal, mu-metal, metal alloy, or a nonmetal.

The casing or housing of the battery modules may be composed of a metal, mu-metal, metal alloy, or a nonmetal.

The casing or housing of the battery pack may be composed of a metal, mu-metal, metal alloy, or a nonmetal.

The present description relates to an inductive coil positioned outside the battery cell.

An inductive coil may be positioned outside and in proximity of a battery cell.

In an aspect, an inductive coil may be positioned around the entirety of the battery cell.

Though it is preferred that the inductive coil be orientated around the battery cell is in a loop or spiral configuration, the inductive coil may be orientated around the battery module in an undefined fashion.

The inductive coil may be positioned on or fixed to the outside or exterior surface of the casing, housing, or packaging material of the battery cell.

In another aspect, an inductive coil may have a planar orientation, wherein it is positioned above, below, or to the side of the battery cell.

Though it is preferred that a single planar inductive coil be orientated around a battery cell, two or more planar inductive coils may be orientated around a battery cell.

The inductive coil may have leads protruding away from the battery cell.

The inductive coil may be connected to inductive coils in, or around, neighboring battery cells or to a power source. Electrical connections may be in either a series or parallel circuit.

The casing, housing, or packaging materials of the individual battery cells may be composed of materials with low or absent of magnetic shielding properties.

The parameters of the induction heating system may be tuned to specifically heat the materials embedded or suspended within the electrolyte without heating the housing or casing materials of the battery cells.

The casing or housing of the battery modules may be composed of a metal, mu-metal, metal alloy, or a nonmetal.

The casing or housing of the battery pack may be composed of a metal, mu-metal, metal alloy, or a nonmetal.

The present description relates to an inductive coil embedded inside the battery packaging or housing.

An inductive coil may be embedded in the housing, casing, or packaging material of the battery cell.

Though it is preferred that the embedded inductive coil be in a loop or spiral configuration, the embedded coil may be in an undefined orientation.

It is preferred that the inductive coil be embedded or assembled during the manufacturing or processing of the housing, casing, or packaging material.

The inductive coil may have leads protruding out of the battery packaging material.

The inductive coil may be connected to inductive coils in neighboring battery cells or to a power source. Electrical connections may be in either a series or parallel circuit.

The casing, housing, or packaging materials of the individual battery cells may be composed of materials with low or absent of magnetic shielding properties.

The parameters of the induction heating system may be tuned to specifically heat the materials embedded or suspended within the electrolyte without heating the housing or casing materials of the battery cells.

The casing or housing of the battery modules may be composed of a metal, mu-metal, metal alloy, or a nonmetal.

The casing or housing of the battery pack may be composed of a metal, mu-metal, metal alloy, or a nonmetal.

The present disclosure relates to the orientation of the inductive coil at the battery module level.

A battery module may be defined as a housing compartment comprised of two or more individual battery cells.

All, or a subset of, the battery cells, within the battery module, may be electrically connected to one another.

An inductive coil may be orientated inside or outside, but in the proximity of, the battery module.

An inductive coil may be embedded in the casing or housing of the battery module material.

The present description relates to an inductive coil positioned inside the battery module.

An inductive coil may be positioned inside the battery module, but outside the battery cells.

In an aspect, an inductive coil may be positioned around two, or more, or all of the battery cells, within the battery module.

Though it is preferred that the inductive coil be orientated around two, or more, or all battery cells in a loop or spiral configuration, the inductive coil may be orientated throughout the battery module in an undefined fashion.

In the instance that the inductive coil is positioned around a subset of the battery cells, it is expected that the inductive coil is orientated around a single group of battery cells within said battery module.

In another aspect, an inductive coil may have a planar orientation, wherein it is positioned above two, or more, or all of the battery cells, within the battery module.

Though it is preferred that a single planar inductive coil be orientated above two, or more, or all battery cells, multiple planar inductive coils may be orientated throughout the battery module in an undefined fashion.

In the event of multiple planar inductive coils in the battery module, the coils may be in electrical connection through a series or parallel circuit.

A single, or multiple planar induction coils, may be positioned above the battery cells, below the battery cells, or to the sides of the battery cells.

The casing, housing, or packaging materials of the individual battery cells may be composed of materials with low or absent of magnetic shielding properties.

The parameters of the induction heating system may be tuned to specifically heat the materials embedded or suspended within the electrolyte without heating the housing or casing materials of the battery cells, or battery modules.

The casing or housing of the battery modules may be composed of a metal, mu-metal, metal alloy, or a nonmetal.

The casing or housing of the battery pack may be composed of a metal, mu-metal, metal alloy, or a nonmetal.

The inductive coil or coils within the battery module may be in electrical connection with a power source or with induction coils in neighboring battery modules in either a series or parallel circuit.

The present description relates to an inductive coil positioned outside the battery module.

An inductive coil may be positioned outside and in proximity of a battery module.

In an aspect, an inductive coil may be positioned around the entirety of the battery module.

Though it is preferred that the inductive coil be orientated around the battery module in a loop or spiral configuration, the inductive coil may be orientated around the battery module in an undefined fashion.

In another aspect, an inductive coil may have a planar orientation, wherein it is positioned above, below, or to the side of the battery module.

Though it is preferred that a single planar inductive coil be orientated around a battery module, two or more planar inductive coils may be orientated around a battery module.

The casing or housing of the battery pack may be composed of materials with low or absent of magnetic shielding properties.

The casing or housing of the battery modules may be composed of materials with low or absent of magnetic shielding properties.

The casing, housing, or packaging materials of the individual battery cells may be composed of materials with low or absent of magnetic shielding properties.

The parameters of the induction heating system may be tuned to specifically heat the materials embedded or suspended within the electrolyte without heating the housing or casing materials of the battery cells, battery modules, or battery pack.

The casing or housing of the battery pack may be composed of a metal, mu-metal, metal alloy, or a nonmetal.

The inductive coil or coils outside the battery module may be in electrical connection with a power source or with induction coils around neighboring battery modules in either a series or parallel circuit.

The present disclosure relates to the orientation of the inductive coil at the battery pack level.

A battery pack may be defined as a housing compartment comprised of two or more battery modules. And each battery module may be comprised of two or more battery cells.

All, or a subset of, the battery modules, within the battery pack, may be electrically connected to one another.

An inductive coil may be orientated inside or outside, but in the proximity of, the battery pack An inductive coil may be embedded in the casing or housing of the battery pack material.

The present description relates to an inductive coil positioned inside the battery pack.

An inductive coil may be positioned inside the battery pack, but outside the battery modules.

In an aspect, an inductive coil may be positioned around two, or more, or all of the battery modules, within the battery pack.

Though it is preferred that the inductive coil be orientated around two, or more, or all battery modules in a loop or spiral configuration, the inductive coil may be orientated throughout the battery pack in an undefined fashion.

In the instance that the inductive coil is positioned around a subset of the battery modules, it is expected that the inductive coil is orientated around a single group of battery modules within said battery pack.

In another aspect, an inductive coil may have a planar orientation, wherein it is positioned above two, or more, or all of the battery modules, within the battery pack.

Though it is preferred that a single inductive coil be orientated above two, or more, or all battery modules, multiple planar inductive coils may be orientated throughout the battery pack in an undefined fashion.

A single, or multiple planar inductive coils, may be positioned above the battery modules, below the battery modules, or two the sides of the battery modules.

The casing or housing of the battery modules may be composed of materials with low or absent of magnetic shielding properties.

The casing, housing, or packaging materials of the individual battery cells may be composed of materials with low or absent of magnetic shielding properties.

The parameters of the induction heating system may be tuned to specifically heat the materials embedded or suspended within the electrolyte without heating the housing or casing materials of the battery cells, or battery modules.

The casing or housing of the battery pack may be composed of a metal, mu-metal, metal alloy, or a nonmetal.

The inductive coil or coils inside the battery pack may be in electrical connection with a power source.

The present description relates to an inductive coil positioned outside the battery pack.

An inductive coil may be positioned outside and in proximity of the battery pack.

In an aspect, an inductive coil may be positioned around the entirety of the battery pack.

Though it is preferred that the inductive coil be orientated around the battery pack in a loop or spiral configuration, the inductive coil may be orientated around the battery pack in an undefined fashion.

In another aspect, an inductive coil may have a planar orientation, wherein it is positioned above, below, or to the side of the battery pack.

Though it is preferred that a single planar inductive coil be orientated around the battery pack, two or more planar inductive coils may be orientated around the battery pack.

The casing or housing of the battery pack may be composed of materials with low or absent of magnetic shielding properties.

The casing or housing of the battery modules may be composed of materials with low or absent of magnetic shielding properties.

The casing, housing, or packaging materials of the individual battery cells may be composed of materials with low or absent of magnetic shielding properties.

The parameters of the induction heating system may be tuned to specifically heat the materials embedded or suspended within the electrolyte without heating the housing or casing materials of the battery cells, battery modules, or battery pack.

The inductive coil or coils outside the battery pack may be in electrical connection with a power source.

The present disclosure relates to an external inductive coil.

An external inductive coil may be referred to as an inductive coil that is located externally of the application.

An external inductive coil may have a flat or planar orientation.

Alternatively, an inductive coil may have a loop or spiral configuration.

An external induction coil may be used to heat batteries at the cell level.

For example, in a cold climate environment a planar external inductive coil may be located in the sidewalk or in the side of a structure next to a busy walkway, wherein smartphone or smartwatch batteries, with inductively heatable materials suspended or embedded in the battery electrolyte, are heated when they pass through an induced magnetic field. The uniform heating of the electrolyte may increase the smartphone or smartwatch battery efficiency in cold weather.

An external inductive coil may be used to heat batteries at the module level.

For example, a planar external inductive coil may be located in a sidewalk or crosswalk, wherein the batteries of an electric scooter battery module, with inductively heatable materials suspended or embedded in the electrolyte, may be heated when pass through an induced magnetic field. The heating of the electrolyte may increase scooter speed and increase battery efficiency in cold weather.

An external inductive coil may be used to heat batteries at the pack level.

For example, a planar inductive coil may be located in the road or highway, wherein an electric vehicle battery pack, containing secondary batteries with inductively heatable materials embedded within the electrolyte, drives over resulting in the heating of the secondary batteries.

An external inductive coil may also be used for wireless charging of secondary batteries in conjunction with the heating mechanism.

The casing or housing of a battery pack may be composed of materials with low or absent of magnetic shielding properties.

The casing or housing of a battery module or modules may be composed of materials with low or absent of magnetic shielding properties.

The casing, housing, or packaging materials of an individual battery cell or cells may be composed of materials with low or absent of magnetic shielding properties.

The parameters of the induction heating system may be tuned to specifically heat the materials embedded or suspended within the electrolyte without heating the housing or casing materials of the battery cells, battery modules, or battery pack.

In an aspect, it is assumed that an external induction heating system is configured in such a way to only heat the embedded inductively heatable materials without causing any adverse effects to the application.

In another aspect, it is assumed that an external induction heating system is configured in such a way to protect any individual or individuals from any adverse effects as a result of the induced magnetic field.

In yet another aspect, it is assumed that an application is configured with proper magnetic shieling in such a way to protect it from any adverse effects as a result of the induced magnetic field.

In yet another aspect, it is assumed that an application is configured with proper magnetic shield in such a way to protect an individual or individuals from any adverse effects as a result of the induced magnetic field.

The drawings of the present disclosure further describe examples of induction coil orientations for the induction heating of batteries.

FIG. 1A: A schematic illustration of a battery structure, wherein the battery includes a liquid electrolyte with inductively heatable materials suspended within (012). The battery further includes a cathode (008), an anode (010), a porous separator (014), a positive current collector (016), and a negative current collector (018). FIG. 1A further includes a schematic illustration of a zero or two dimensional inductively heatable particle (002) with an electronically insulative coating (004) and an optimal surfactant (006).

Figure 1B:
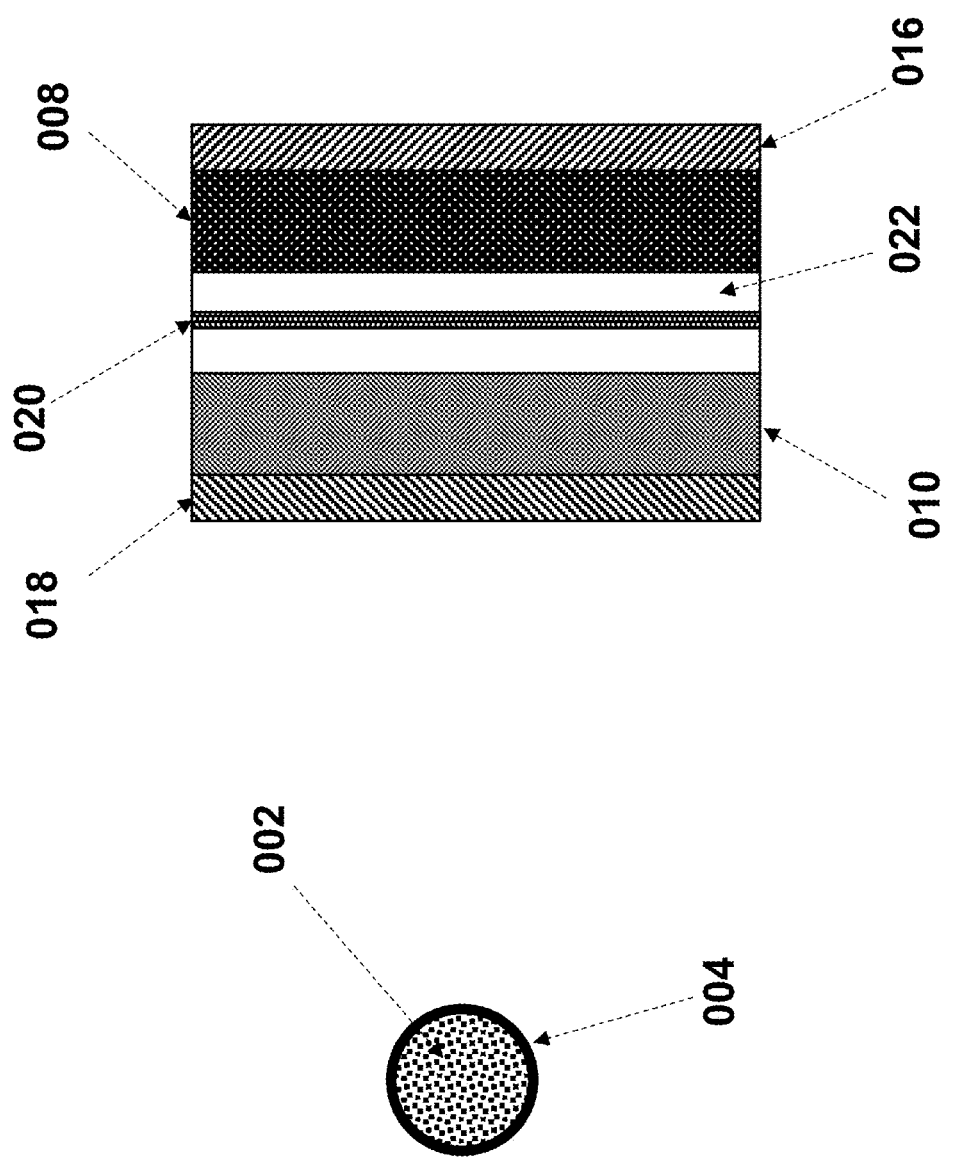
FIG. 1B: A schematic illustration of a battery structure, wherein the battery contains a porous separator with inductively heatable materials deposited on or mixed within.

FIG. 1B: A schematic illustration of a battery structure, wherein the battery includes a porous separator with inductively heatable materials deposited on or mixed within (020). The battery further includes a cathode (008), an anode (010), a liquid electrolyte (022), a positive current collector (016), and a negative current collector (018). FIG. 1B further includes a schematic illustration of a zero or two dimensional inductively heatable particle (002) with an electronically insulative coating (004).

Figure 1C:
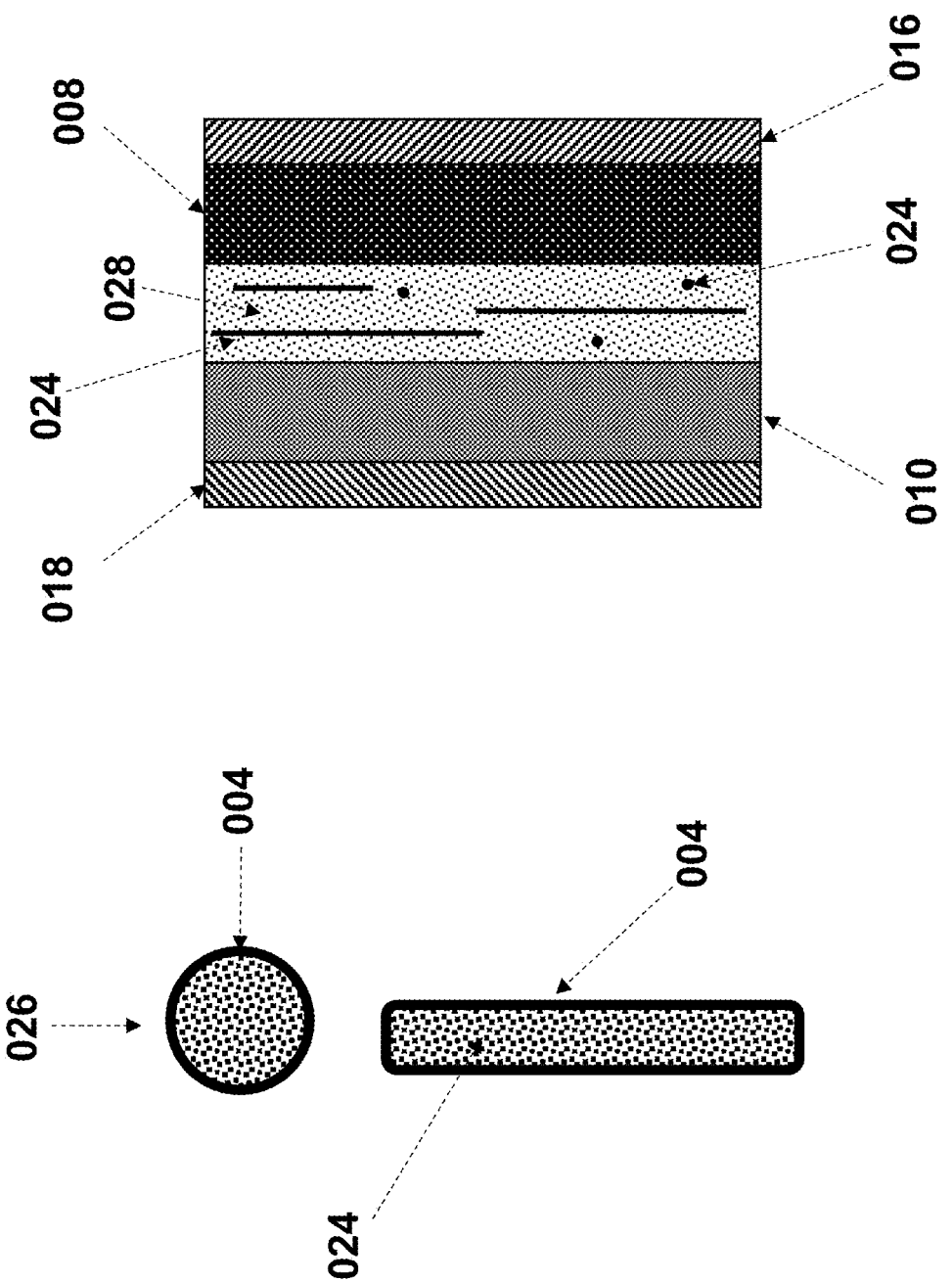
FIG. 1C: A schematic illustration of a battery structure, wherein the battery contains one or more inductively heatable wires or fibers embedded in an electrolyte.

FIG. 1C: A schematic illustration of a battery structure, wherein the battery includes one or more inductively heatable wires or fibers (024) embedded in an electrolyte (028), and where the electrolyte is preferably a solid or gel like electrolyte. The battery further includes a cathode (008), an anode (010), a positive current collector (016), and a negative current collector (018). FIG. 1C further includes a cross-section schematic of an inductively heatable wire (026) with an electronically insulative coating (004).

Figure 1D:
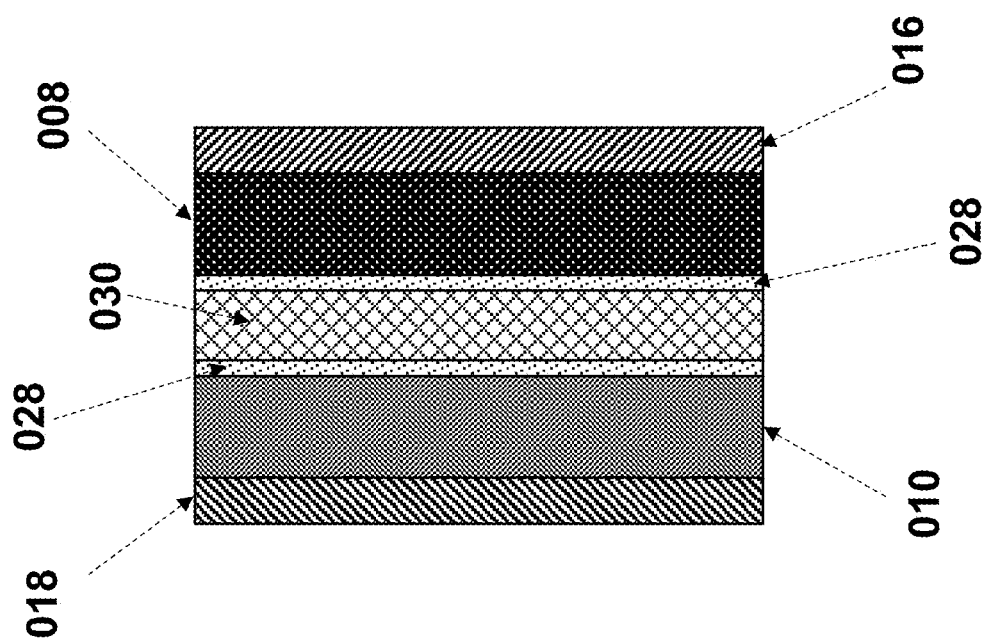
FIG. 1D: A schematic illustration of a battery structure, wherein the battery electrolyte is supported on an inductively heatable fabric support.

FIG. 1D: A schematic illustration of a battery structure, wherein the battery electrolyte is supported on a fabric support (030), and the battery support is either the inductively heatable material itself or has inductively heatable materials dispersed within. The battery further includes a cathode (008), an anode (010), an electrolyte (028), a positive current collector (016), and a negative current collector (018).

Figure 2A:
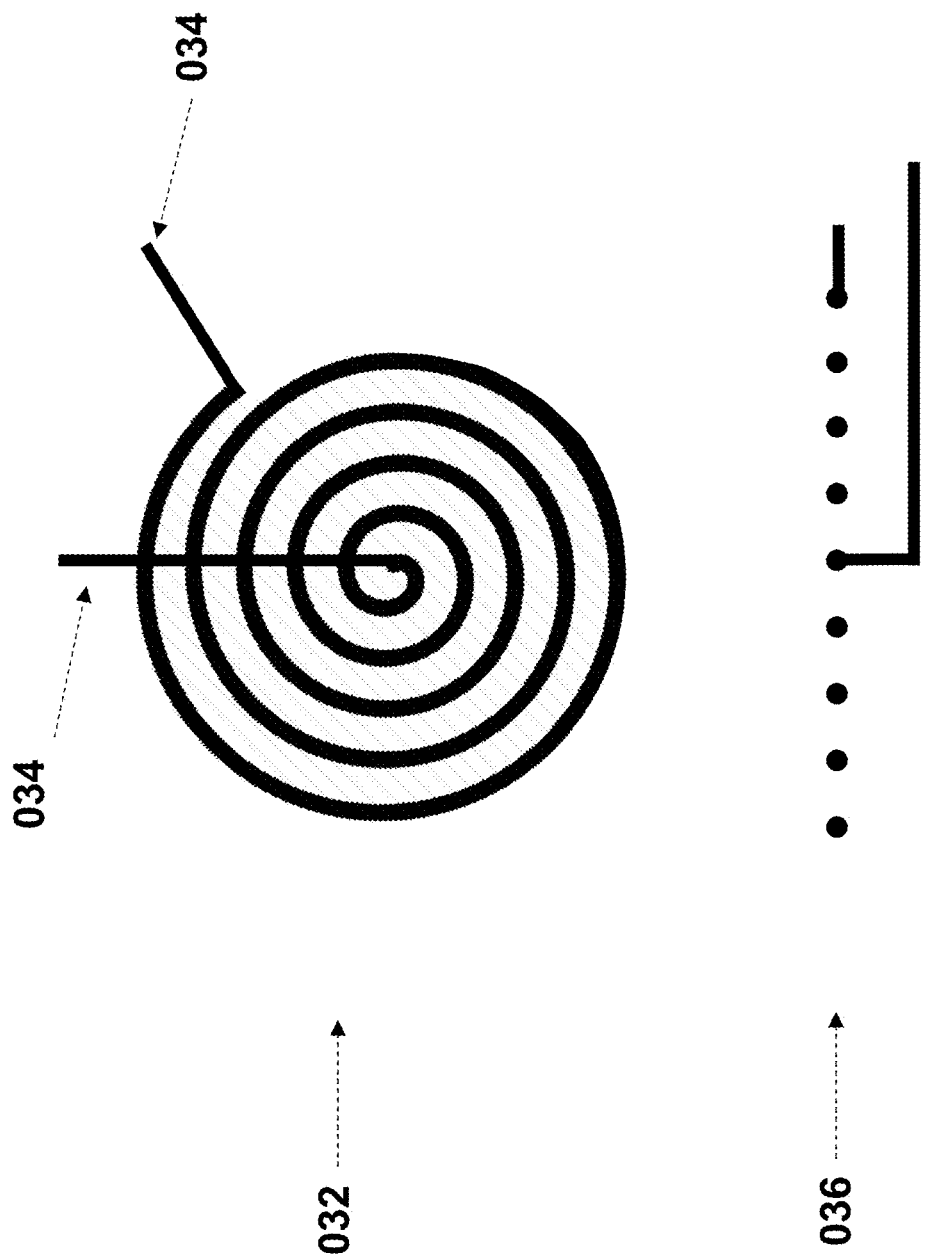
FIG. 2A: A schematic illustration of a planar shaped inductive coil.

FIG. 2A: A schematic illustration of a planar induction coil. The schematic includes a planar view (032) and cross-sectional view (036) of a planar induction coil along with induction coil leads (034).

Figure 2B:
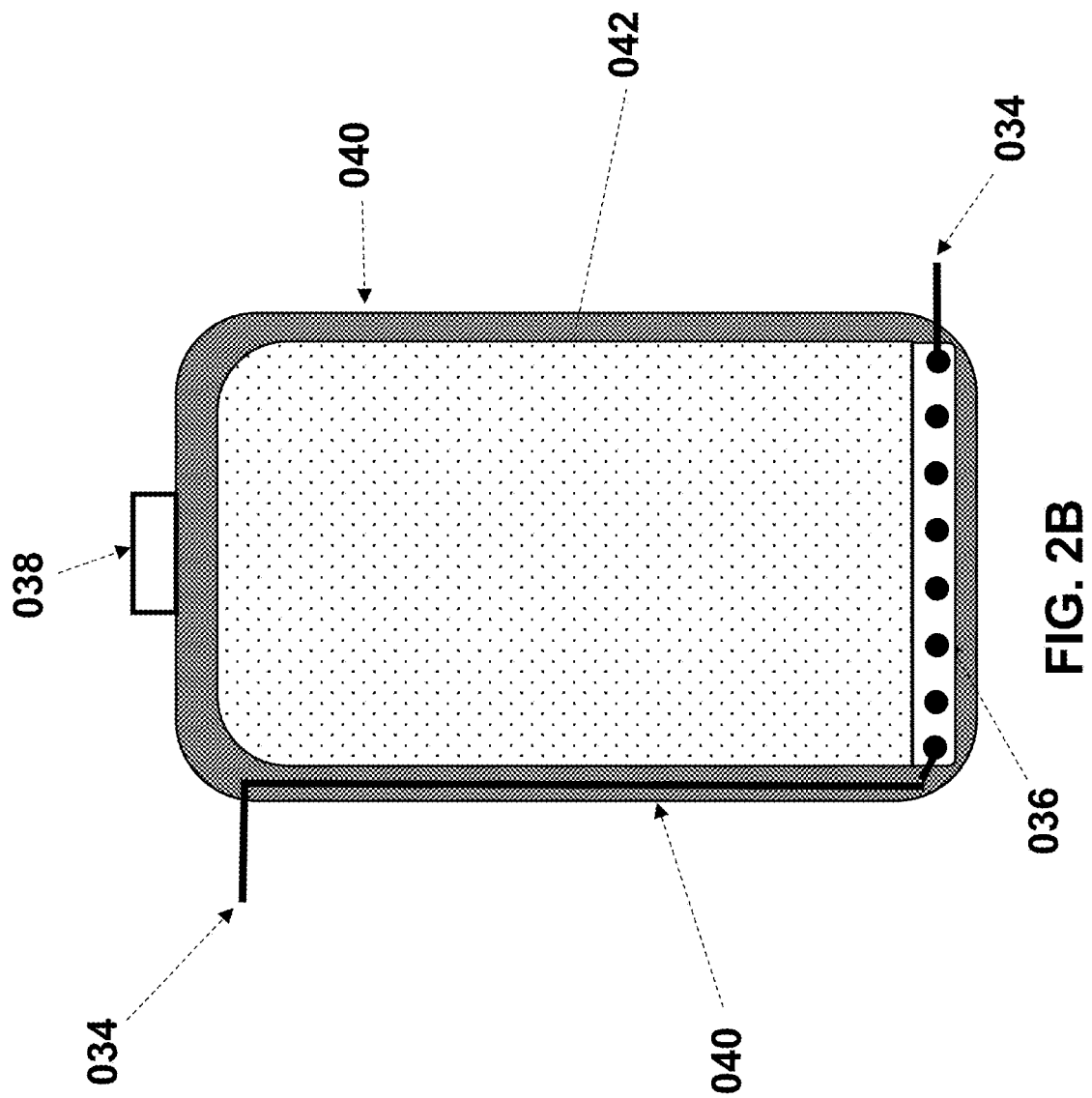
FIG. 2B: A schematic illustration of a cylindrical battery, wherein the battery contains a planar inductive coil positioned within the battery cell.

FIG. 2B: A schematic illustration of a cylindrical battery, wherein the battery includes a planar inductive coil (036) positioned within the battery cell. The illustration shows the inductive coil positioned below the active components of the battery (042). Alternatively, the planar inductive coil may be positioned above the active components. The active components of the battery may include all or some of 002-030. The battery structure further includes a battery terminal (038), battery casing (040), and inductive coil leads (034).

Figure 2C:
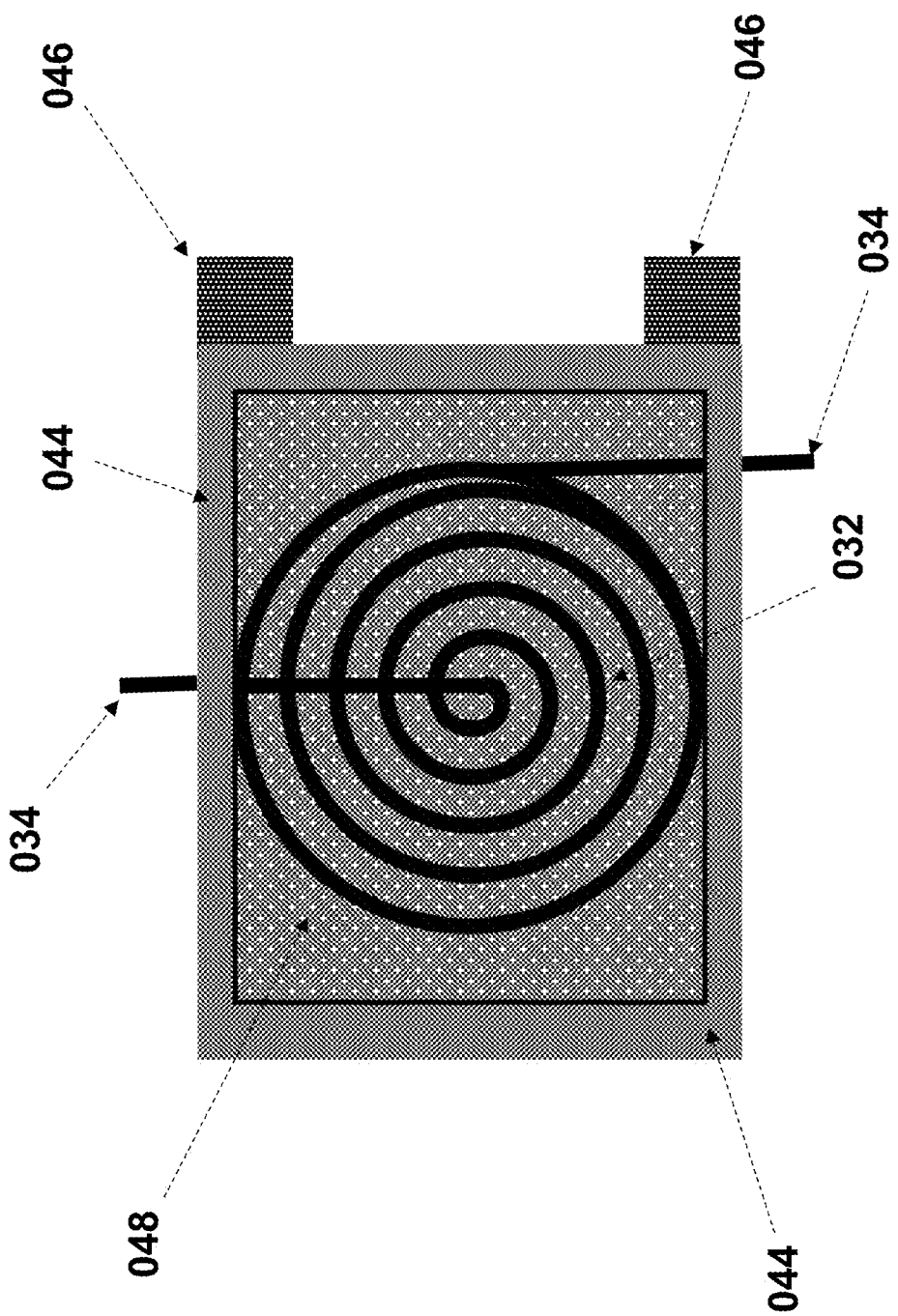
FIG. 2C: A schematic illustration of a pouch type battery, wherein the battery contains a planar inductive coil embedded in the pouch cell packaging material.

FIG. 2C: A schematic illustration of a pouch type battery, wherein the battery includes a planar inductive coil (032) embedded in, or on, the top or bottom of the pouch cell packaging material (044). The illustration demonstrates how the planar inductive coil is positioned when embedded inside the packing system with the interior surface of the packing material (048) adjacent to the active battery components (not shown). The battery structure further includes pouch cell tabs (046) and inductive coil leads (034).

Figure 2D:
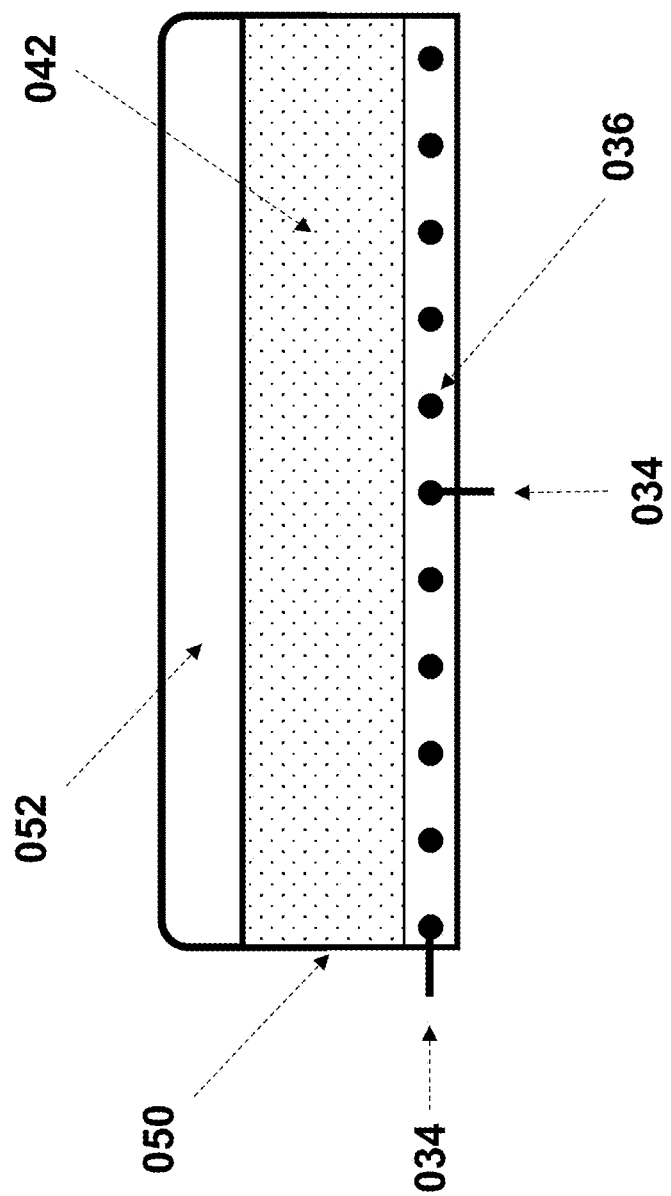
FIG. 2D: A schematic illustration of a coin or button type battery, wherein the battery contains a planar inductive coil positioned inside the coin cell.

FIG. 2D: A schematic illustration of a coin or button type battery, wherein the battery includes a planar inductive coil (036) positioned inside the coin cell. The illustration shows the inductive coil positioned below the active components of the battery (042). Alternatively, the inductive coil may be positioned above the active components on the side of the crimped coin cell cap (052). The active components of the battery may include all or some of 002-030. The battery structure further includes the inductive coil leads (034) and coin cell casing (050).

Figure 3A:
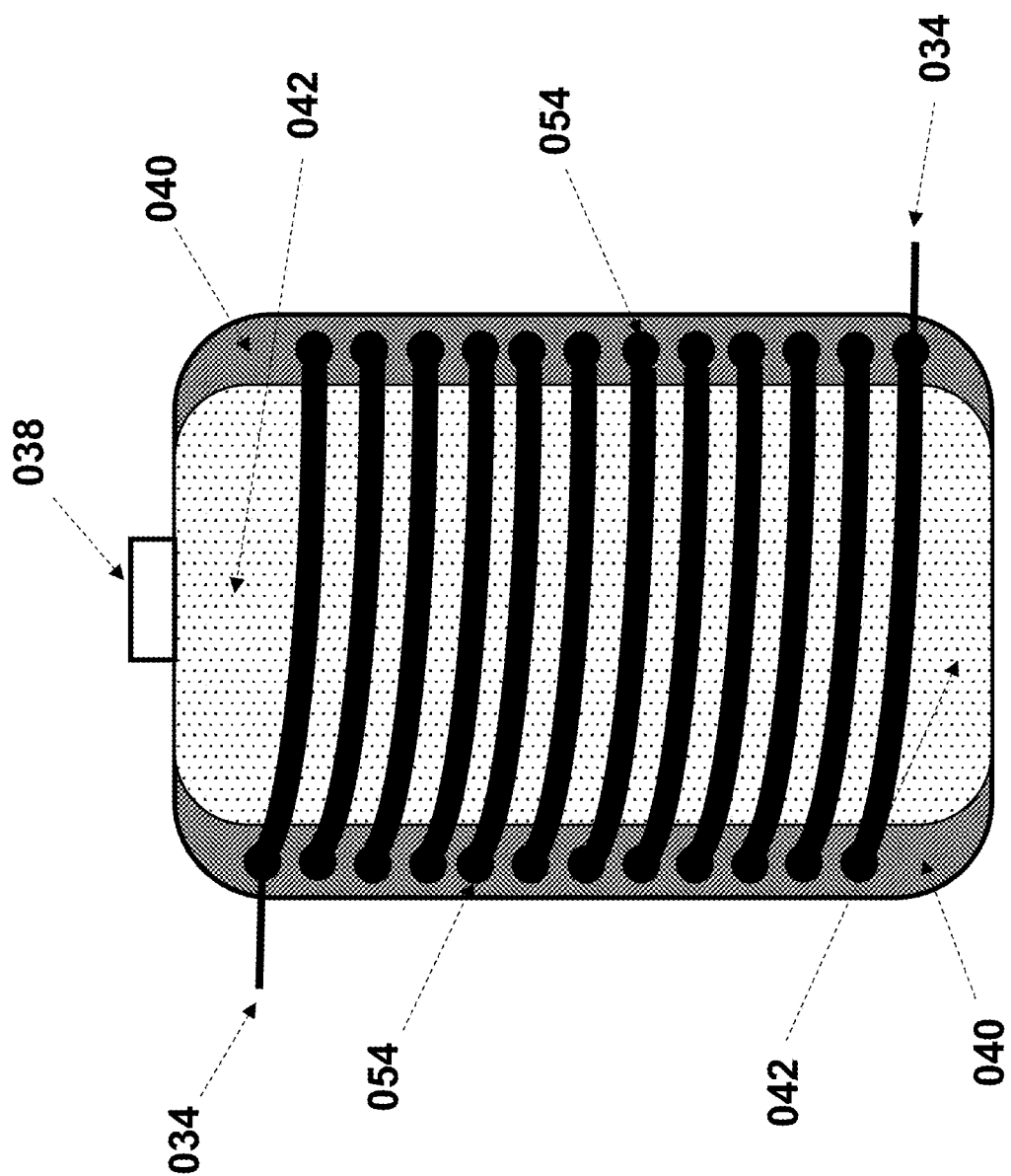
FIG. 3A: A schematic illustration of a cylindrical battery, wherein the battery contains an inductive coil embedded in the battery casing.

FIG. 3A: A schematic illustration of a cylindrical battery, wherein the battery includes an inductive coil (054) embedded in the battery casing (040). The illustration demonstrates the coil like features of the inductive coil where it is looped around the active components of the battery (042). Though the illustration shows the coil embedded in the battery casing, the coil may be positioned on the interior of the casing or exterior of the casing. The active components of the battery may include all or some of 002-030. The battery structure further includes a terminal (038) and inductive coil leads (034).

Figure 3B:
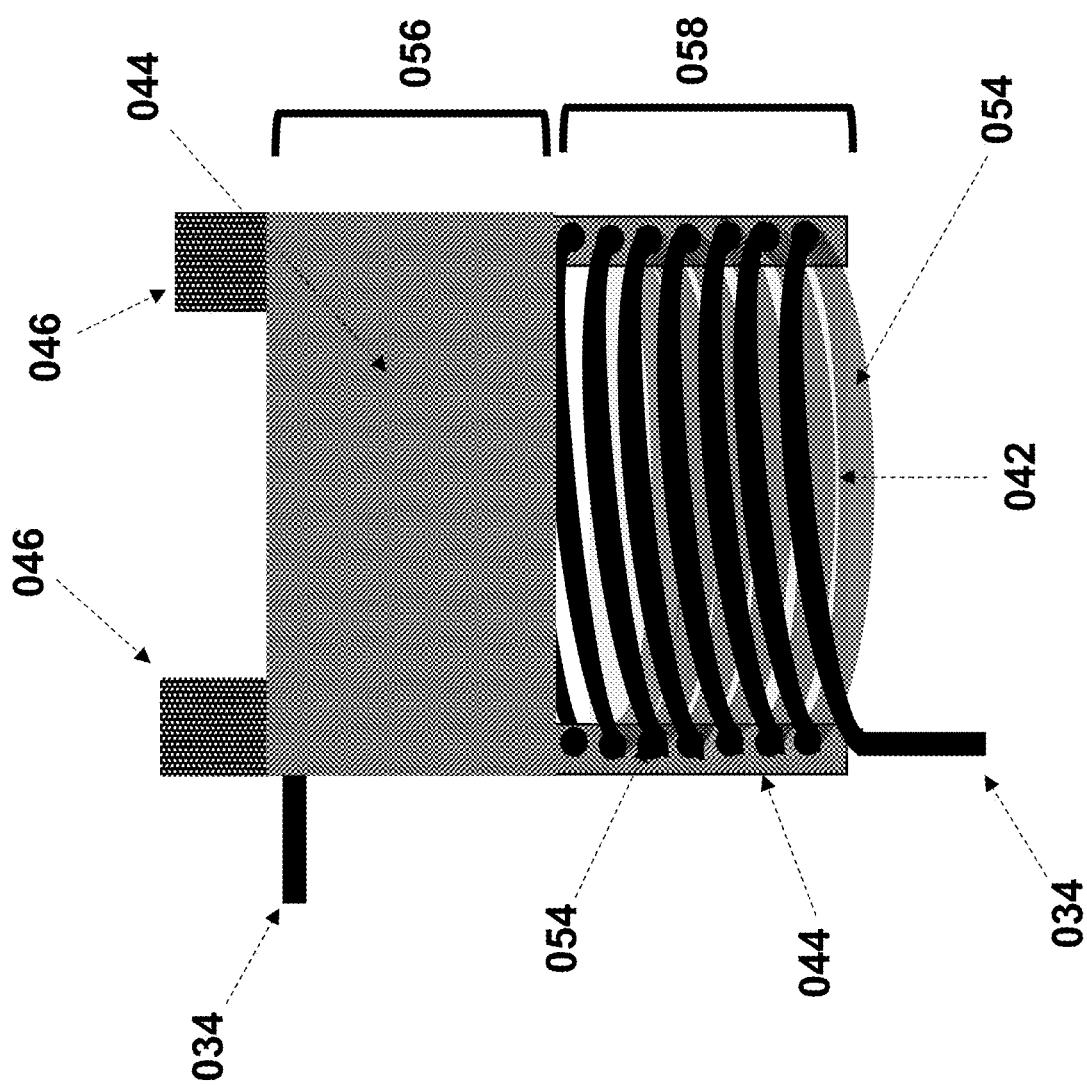
FIG. 3B: A schematic illustration of a pouch type battery, wherein the battery contains an inductive coil embedded the pouch cell packaging material.

FIG. 3B: A schematic illustration of a pouch type battery, wherein the battery includes an inductive coil (054) embedded the pouch cell packaging material (044). The illustration demonstrates an open view of the inductive coil embedded in the pouch cell packaging material (058) surrounding the active components of the battery (042) and in relationship to a sealed pouch cell (056). Though the illustration shows the coil embedded in the pouch cell packaging material, the coil may be positioned on the interior of the packaging or exterior of the packaging. The active components of the battery may include all or some of 002-030. The battery structure further includes pouch cell tabs (046) and inductive coil leads (034).

Figure 3C:
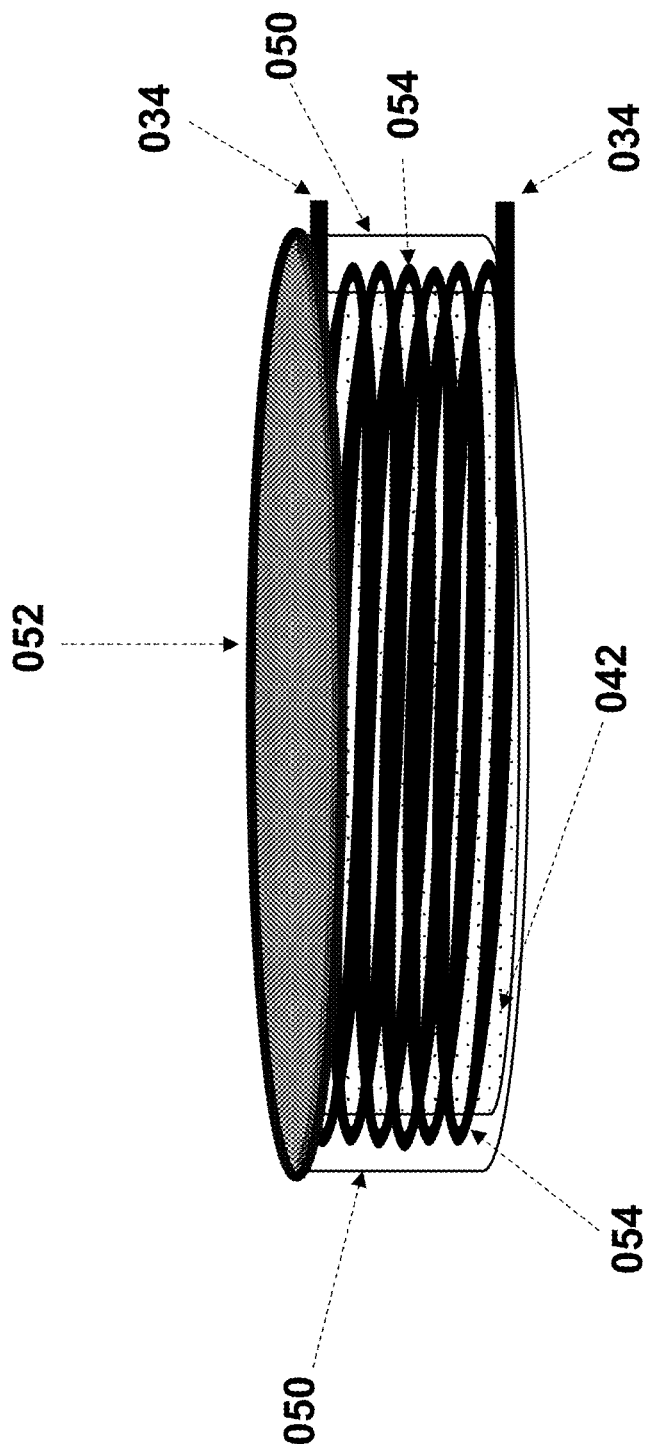
FIG. 3C: A schematic illustration of a coin or button type battery, wherein the battery contains an inductive coil inside the coin cell casing.

FIG. 3C: A schematic illustration of a coin or button type battery, wherein the battery includes an inductive coil (054) inside the coin cell casing (050). The illustration shows the inductive coil looped around the active components of the battery (042). Though the illustration shows the coil embedded in the coin cell casing, the coil may be positioned on the interior of the casing or exterior of the casing. The active components of the battery may include all or some of 002-030. The battery structure further includes a crimped coin cell cap (052) and inductive coil leads (034).

Figure 4A:
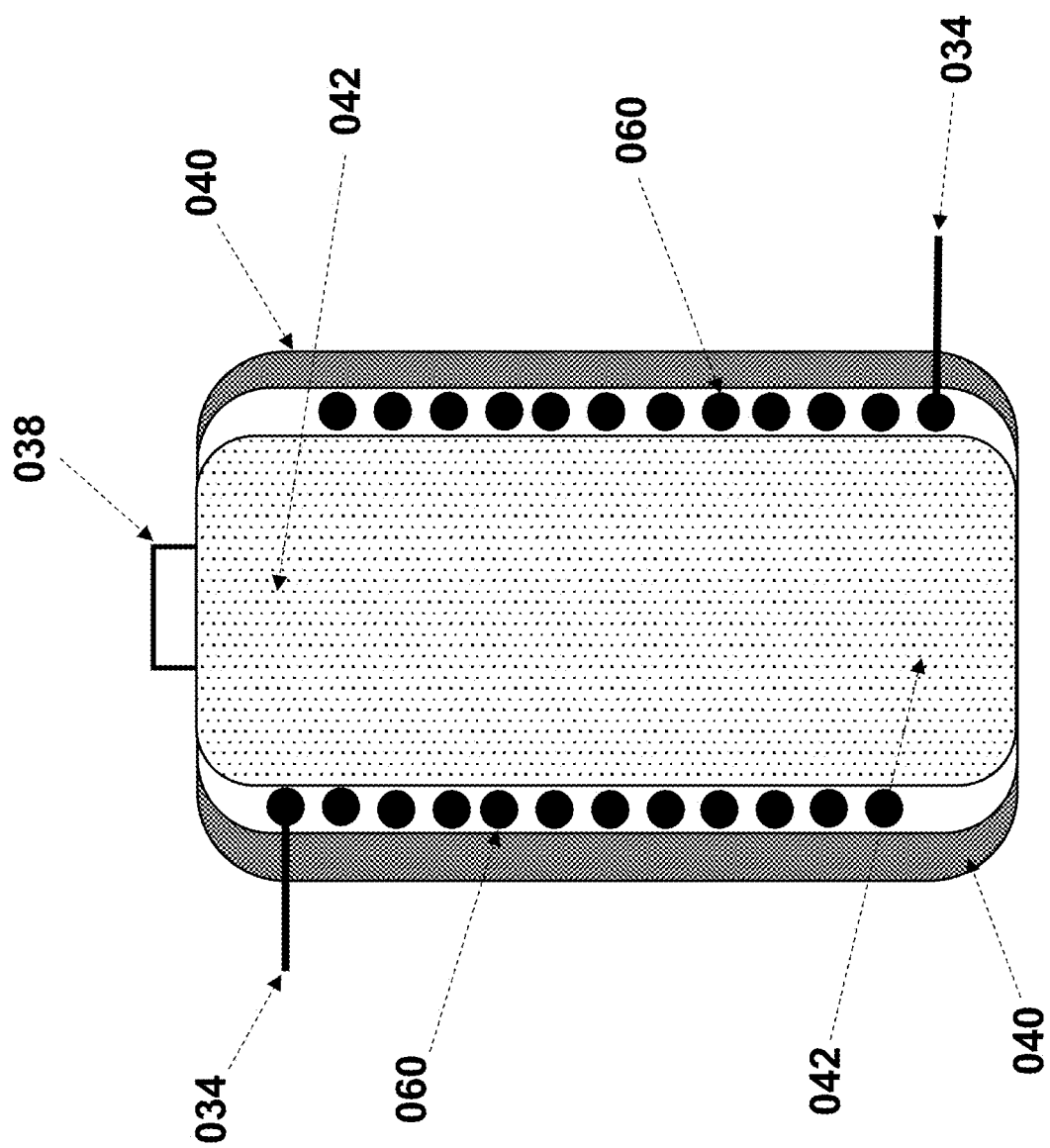
FIG. 4A: A schematic illustration of a cylindrical battery, wherein the battery contains an inductive coil on the interior surface of the battery casing.

FIG. 4A: A schematic illustration of a cylindrical battery, wherein the battery includes an inductive coil (060) on the interior surface of the battery casing (040). The illustration demonstrates a cross-sectional view of the battery with the inductive coil surrounding the active components of the battery (042). The active components of the battery may include all or some of 002-030. The battery structure further includes a terminal (038) and inductive coil leads (034).

Figure 4B:
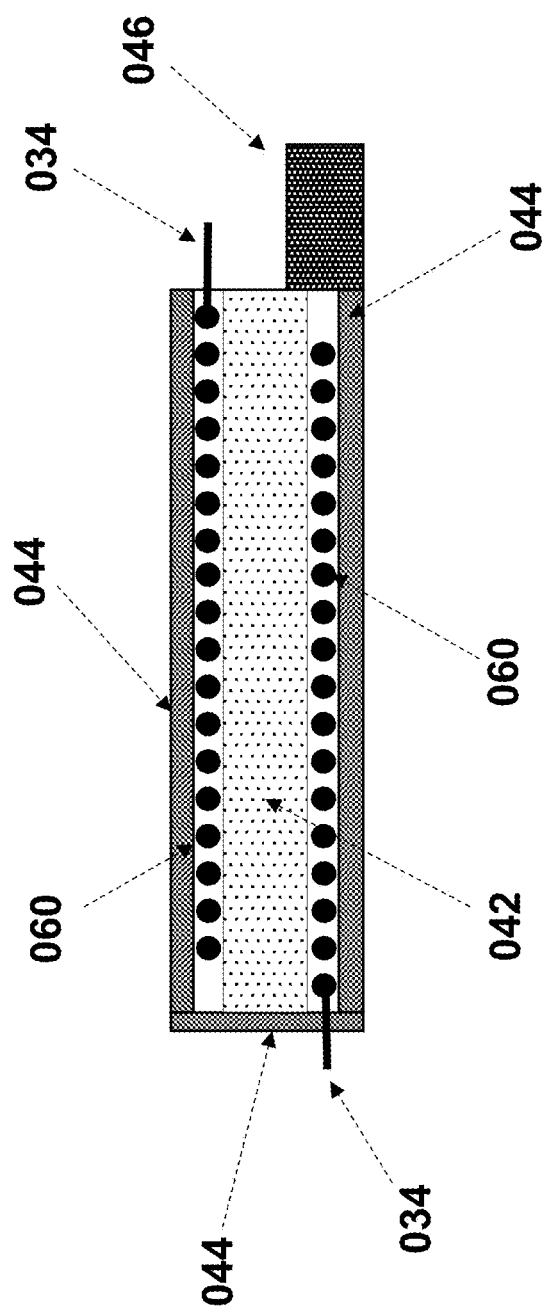
FIG. 4B: A schematic illustration of a pouch type battery, wherein the battery contains an inductive coil on the interior surface of the pouch cell packaging material.

FIG. 4B: A schematic illustration of a pouch type battery, wherein the battery includes an inductive coil (060) on the interior surface of the pouch cell packaging material (044). The illustration demonstrates a cross-sectional view of the battery with the inductive coil surrounding the active components of the battery (042). The active components of the battery may include all or some of 002-030. The battery structure further includes pouch cell tabs (046) and inductive coil leads (034).

Figure 4C:
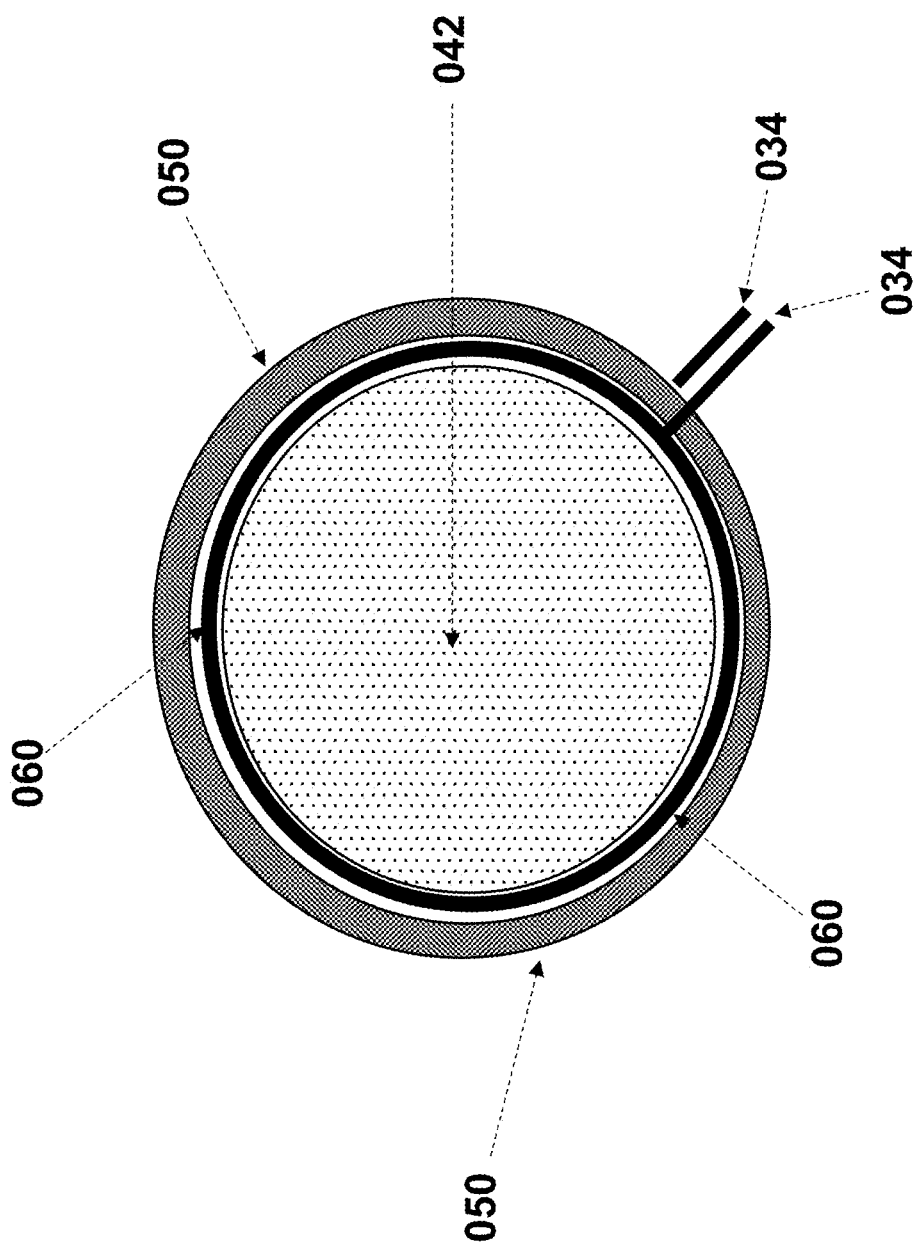
FIG. 4C: A schematic illustration of a coin or button type battery, wherein the battery contains an inductive coil on the interior surface of the coin cell casing.

FIG. 4C: A schematic illustration of a coin or button type battery, wherein the battery includes an inductive coil (060) on the interior surface of the coin cell casing (050). The illustration demonstrates a cross-sectional view of the battery with the inductive coil surrounding the active components of the battery (042). The active components of the battery may include all or some of 002-030. The battery structure further includes an inductive coil leads (034) protruding outwards from the coin cell.

Figure 5A:
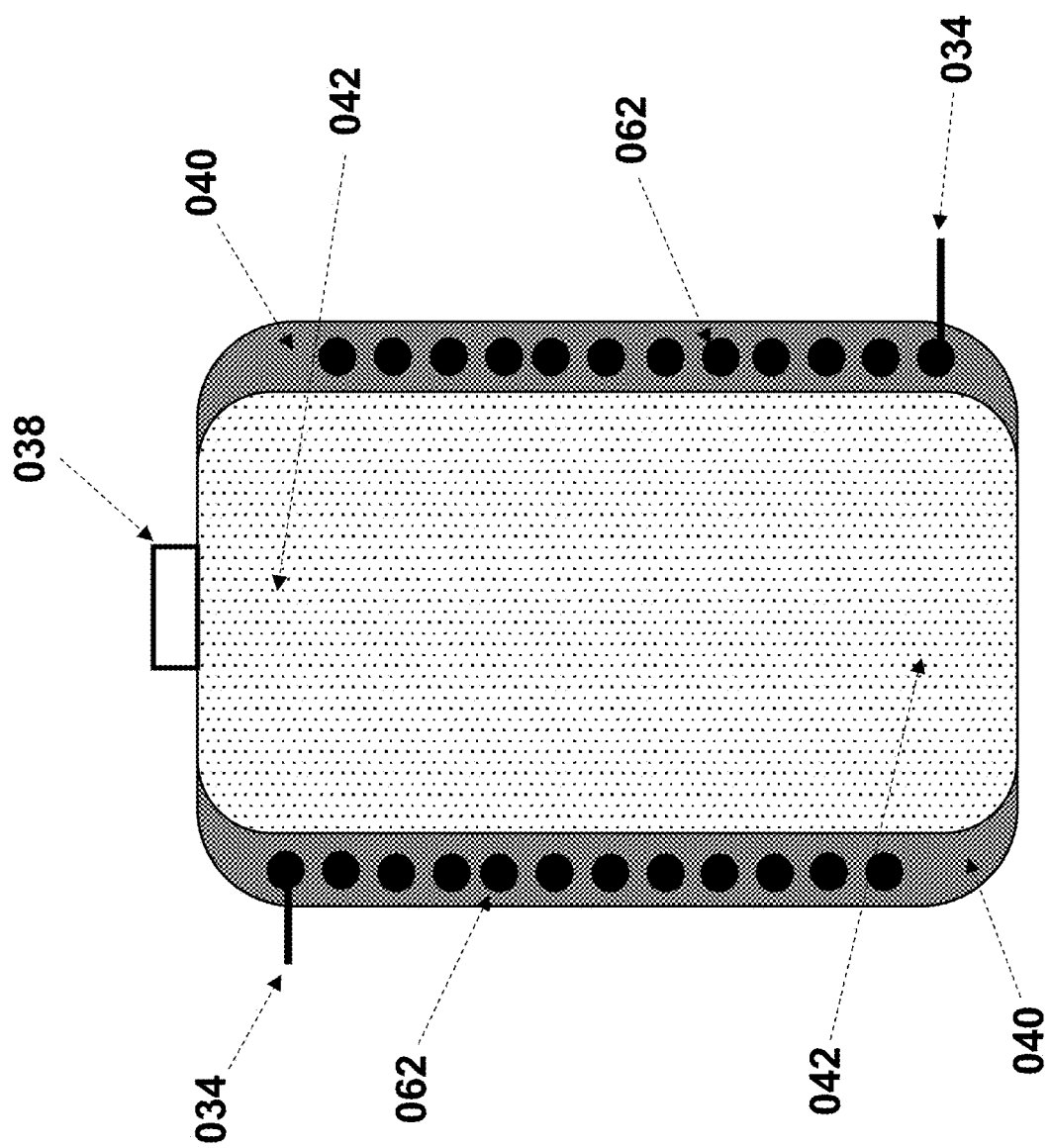
FIG. 5A: A schematic illustration of a cylindrical battery, wherein the battery contains an inductive coil embedded within the battery casing.

FIG. 5A: A schematic illustration of a cylindrical battery, wherein the battery includes an inductive coil (062) embedded within the battery casing (040). The illustration demonstrates a cross-sectional view of the battery with the inductive coil surrounding the active components of the battery (042). The active components of the battery may include all or some of 002-030. The battery structure further includes a terminal (038) and inductive coil leads (034).

Figure 5B:
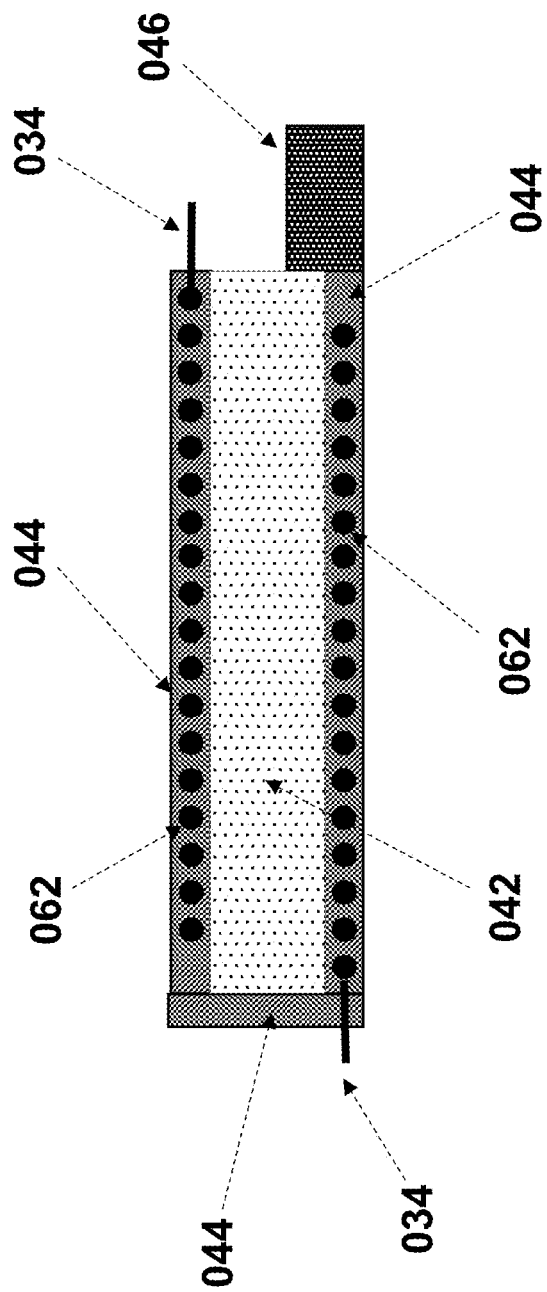
FIG. 5B: A schematic illustration of a pouch type battery, wherein the battery contains an inductive coil embedded within the pouch cell packaging material.

FIG. 5B: A schematic illustration of a pouch type battery, wherein the battery includes an inductive coil (062) embedded within the pouch cell packaging material (044). The illustration demonstrates a cross-sectional view of the battery with the inductive coil surrounding the active components of the battery (042). The active components of the battery may include all or some of 002-030. The battery structure further includes pouch cell tabs (046) and inductive coil leads (034).

Figure 5C:
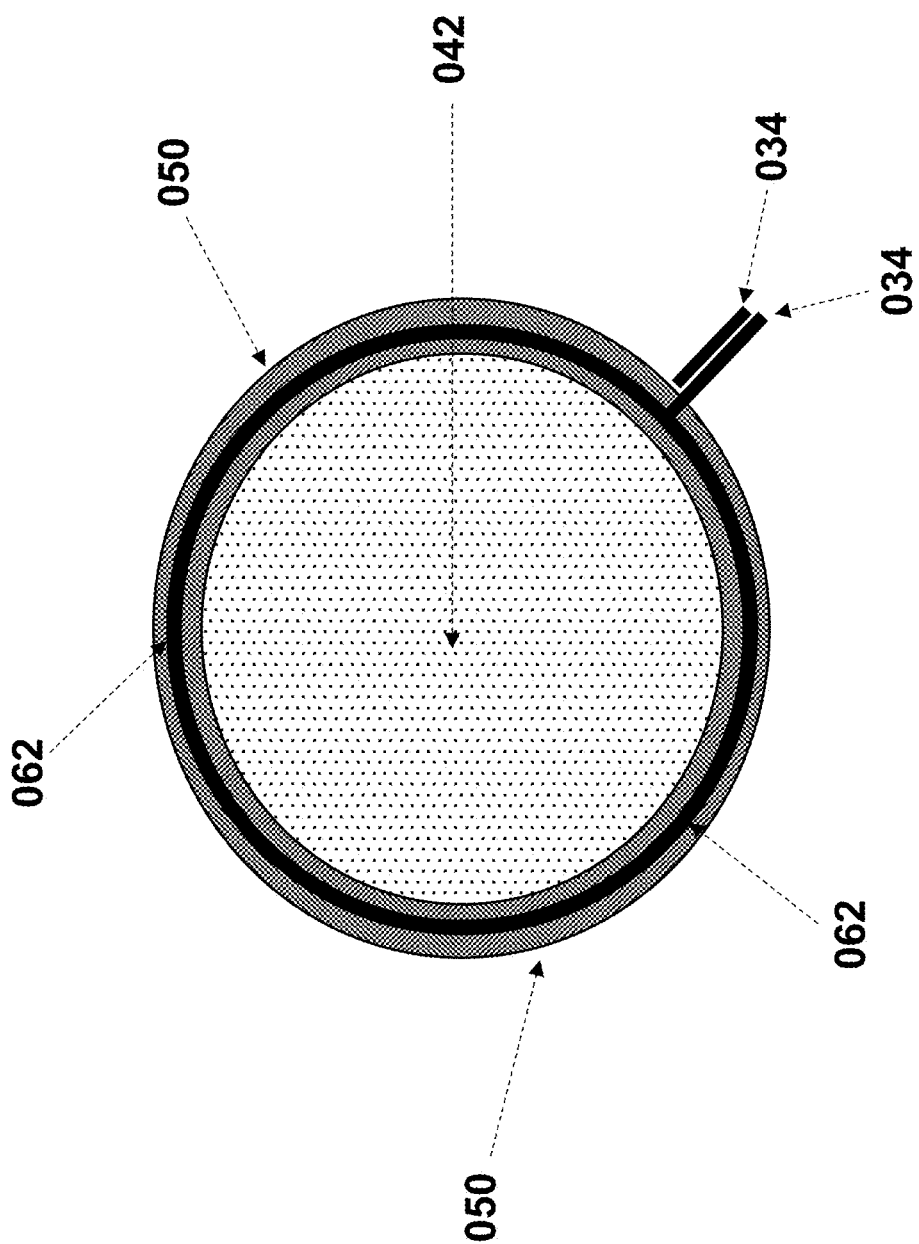
FIG. 5C: A schematic illustration of a coin or button type battery, wherein the battery contains an inductive coil embed within the coin cell casing.

FIG. 5C: A schematic illustration of a coin or button type battery, wherein the battery includes an inductive coil (062) embed within the coin cell casing (050). The illustration demonstrates a cross-sectional view of the battery with the inductive coil surrounding the active components of the battery (042). The active components of the battery may include all or some of 002-030. The battery structure further includes an inductive coil leads (034) protruding outwards from the coin cell.

Figure 6A:
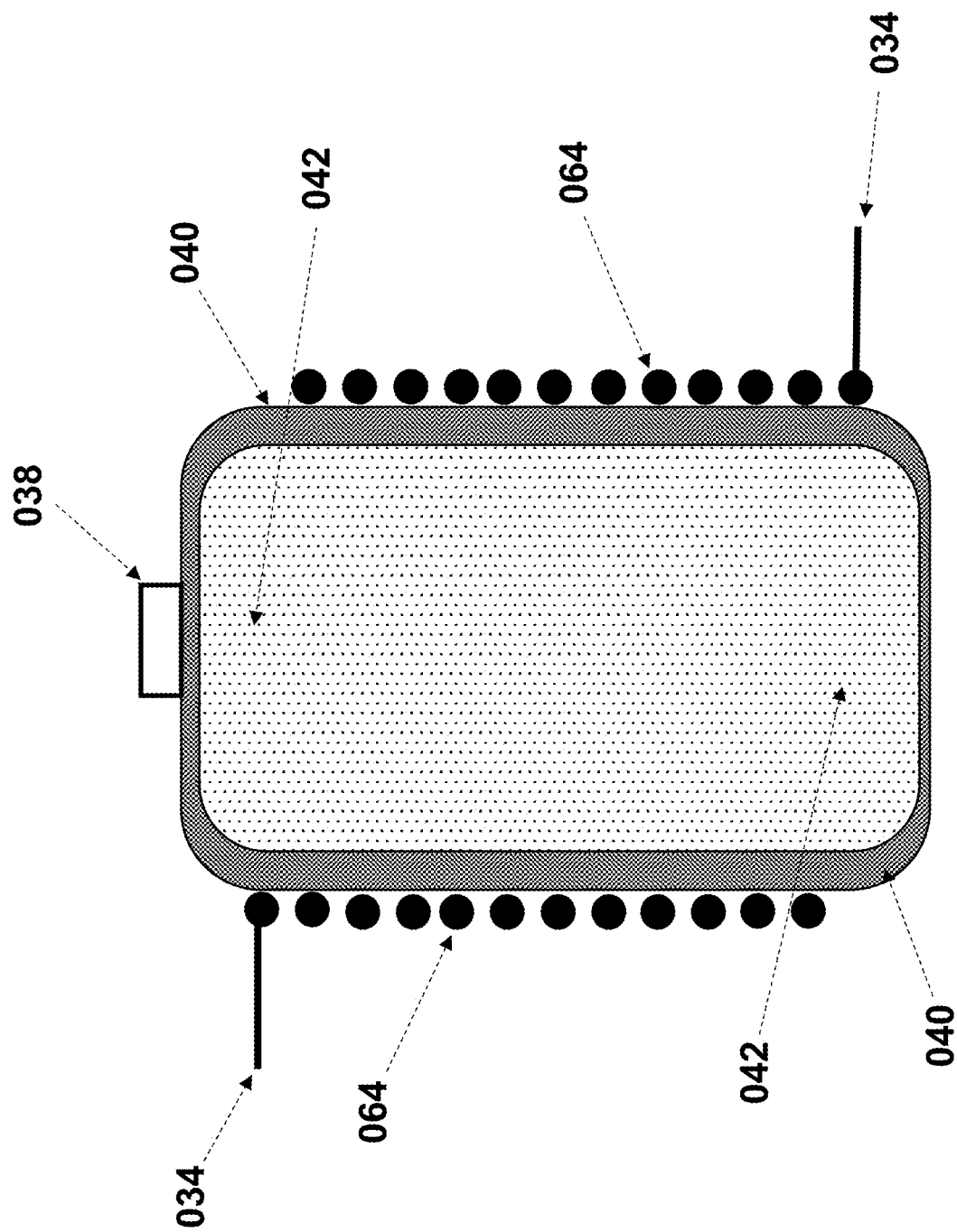
FIG. 6A: A schematic illustration of a cylindrical battery, wherein the battery contains an inductive coil positioned on the exterior surface battery casing.

FIG. 6A: A schematic illustration of a cylindrical battery, wherein the battery includes an inductive coil (064) positioned on the exterior surface battery casing (040). The illustration demonstrates a cross-sectional view of the battery with the inductive coil surrounding the active components of the battery (042). The active components of the battery may include all or some of 002-030. The battery structure further includes a terminal (038) and inductive coil leads (034).

Figure 6B:
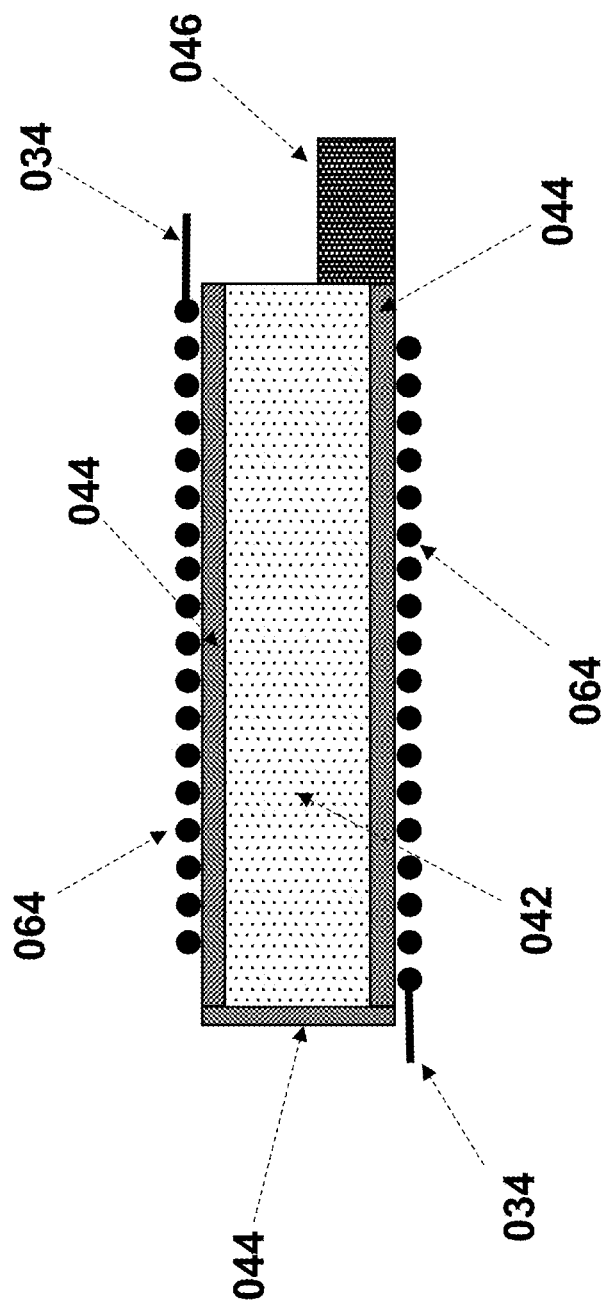
FIG. 6B: A schematic illustration of a pouch type battery, wherein the battery contains an inductive coil positioned on the exterior surface of the pouch cell packaging material.

FIG. 6B: A schematic illustration of a pouch type battery, wherein the battery includes an inductive coil (064) positioned on the exterior surface of the pouch cell packaging material (044). The illustration demonstrates a cross-sectional view of the battery with the inductive coil surrounding the active components of the battery (042). The active components of the battery may include all or some of 002-030. The battery structure further includes pouch cell tabs (046) and inductive coil leads (034).

Figure 6C:
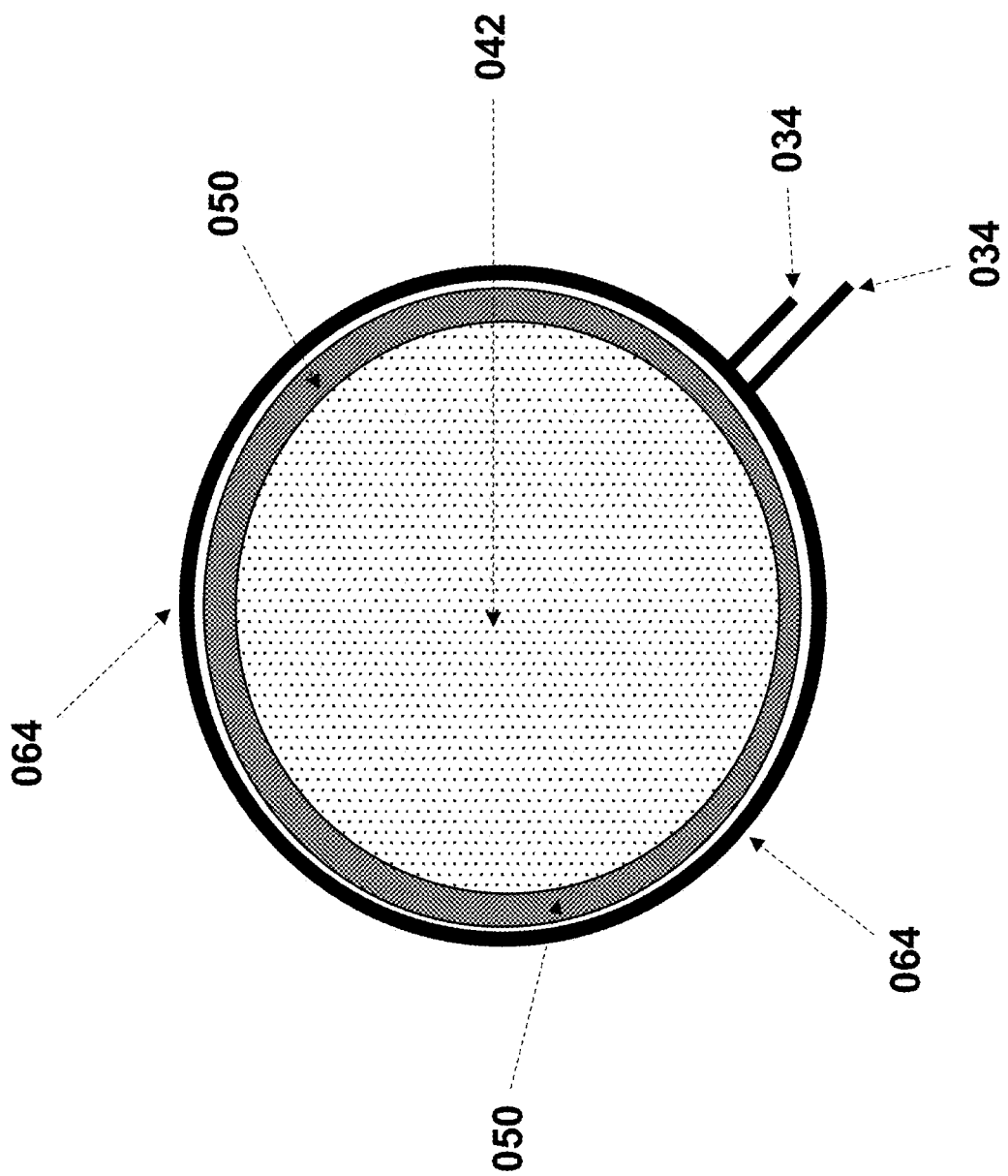
FIG. 6C: A schematic illustration of a coin or button type battery, wherein the battery contains an inductive coil positioned on the exterior surface of the coin cell casing.

FIG. 6C: A schematic illustration of a coin or button type battery, wherein the battery includes an inductive coil (064) positioned on the exterior surface of the coin cell casing (050). The illustration demonstrates a cross-sectional view of the battery with the inductive coil surrounding the active components of the battery (042). The active components of the battery may include all or some of 002-030. The battery structure further includes an inductive coil leads (034) protruding outwards from the coin cell.

FIG. 7A: A schematic illustration of cylindrical battery cells, wherein the inductive coils (054) of the cells are connected to the inductive coils of neighboring cells through a series circuit forming an inductive heating series circuit (068). The cylindrical cells are considered to be grouped with the battery module casing (066). Though the illustration shows the coil embedded in the battery casing, the coil may be positioned on the interior of the casing or exterior of the casing. Moreover, the inductive coil may be planar and positioned inside the battery cell above or below the active battery components (042). The battery structure further includes inductive coil leads (034), battery terminal (038).

Figure 7B:
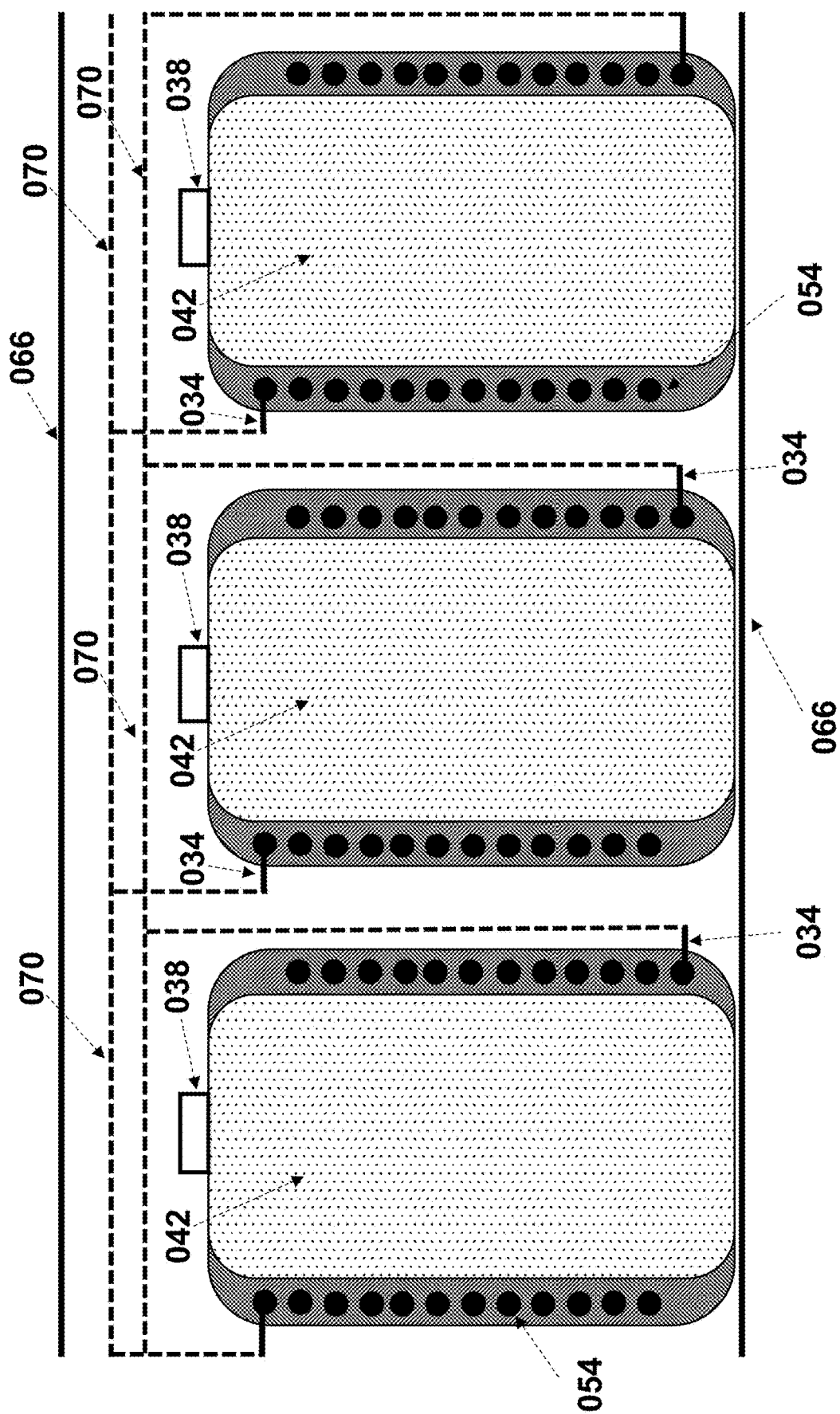
FIG. 7B: A schematic illustration of cylindrical battery cells, wherein the inductive coils of the cells are connected to the inductive coils of neighboring cells through a parallel circuit forming an inductive heating parallel circuit.

FIG. 7B: A schematic illustration of cylindrical battery cells, wherein the inductive coils (054) of the cells are connected to the inductive coils of neighboring cells through a parallel circuit forming an inductive heating parallel circuit (070). The cylindrical cells are considered to be grouped with the battery module casing (066). Though the illustration shows the coil embedded in the battery casing, the coil may be positioned on the interior of the casing or exterior of the casing. Moreover, the inductive coil may be planar and positioned inside the battery cell above or below the active battery components (042). The battery structure further includes inductive coil leads (034), battery terminal (038).

Figure 8A:
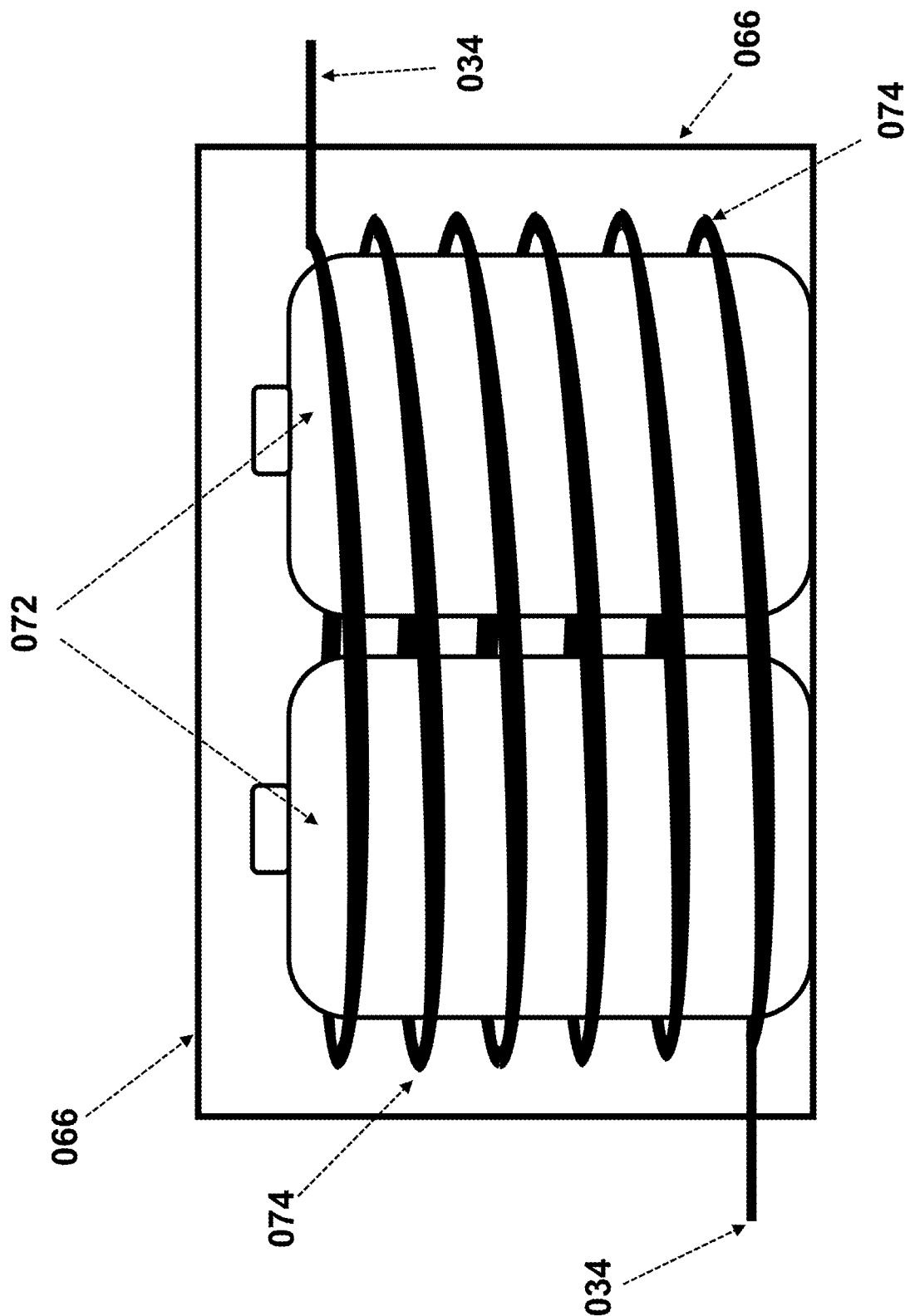
FIG. 8A: A schematic illustration of a battery module, wherein an inductive coil is wrapped around two, or more, or all, of the individual battery cells within a battery module.

FIG. 8A: A schematic illustration of a battery module, wherein an inductive coil (074) is wrapped around two, or more, or all, of the individual battery cells (072) within the battery module. The inductive coil leads (034) may protrude outward of the module casing (066) and be connected to either other induction coils or a power source.

Figure 8B:
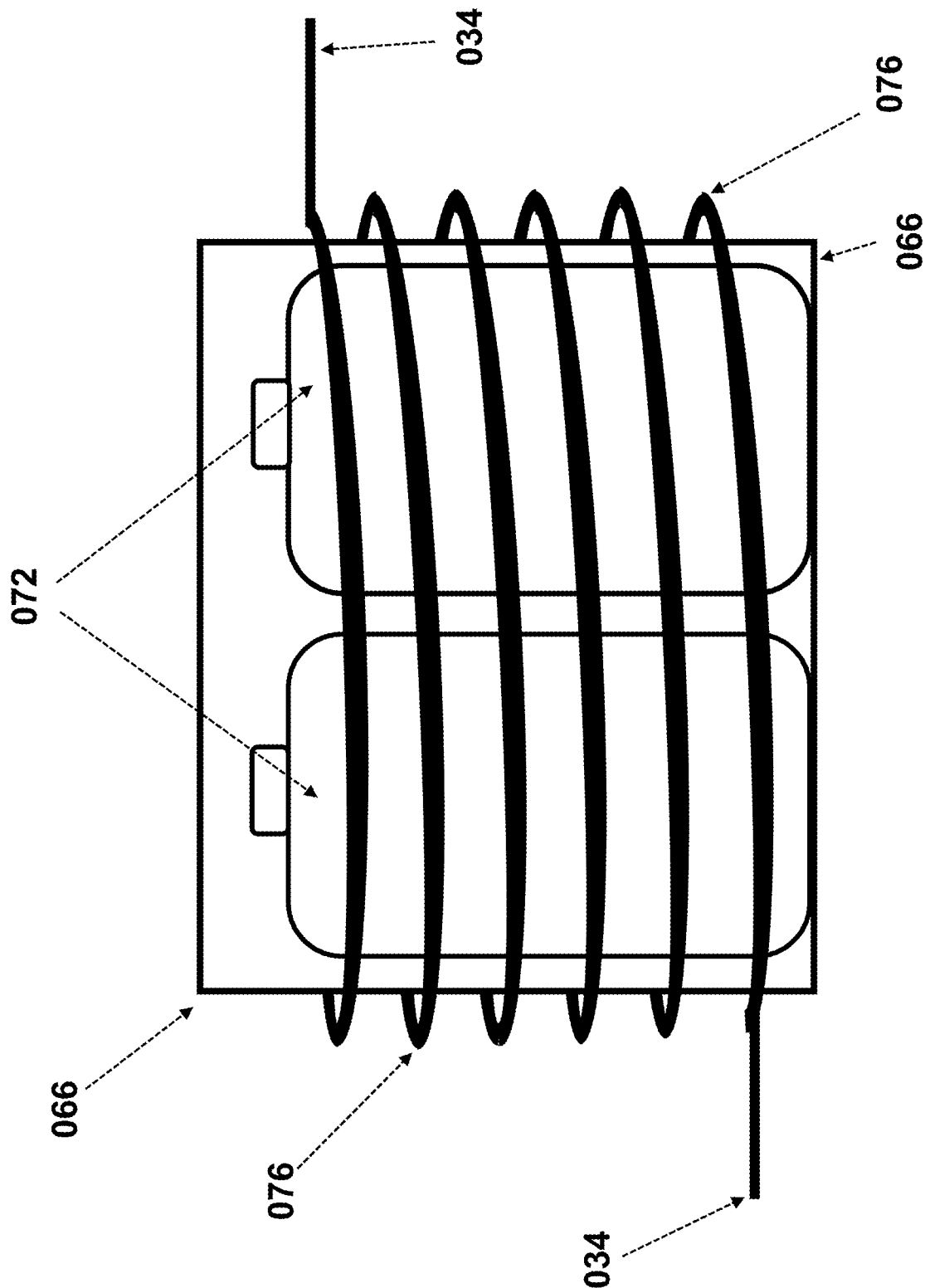
FIG. 8B: A schematic illustration of a battery module, wherein an inductive coil is wrapped around the entirety of the battery module.

FIG. 8B: A schematic illustration of a battery module composed of two or more individual battery cells (072), wherein an inductive coil is wrapped around the entirety of the battery module (076). The inductive coil leads (034) may protrude outward from the module casing (066) and be connected to either other induction coils or a power source.

Figure 8C:
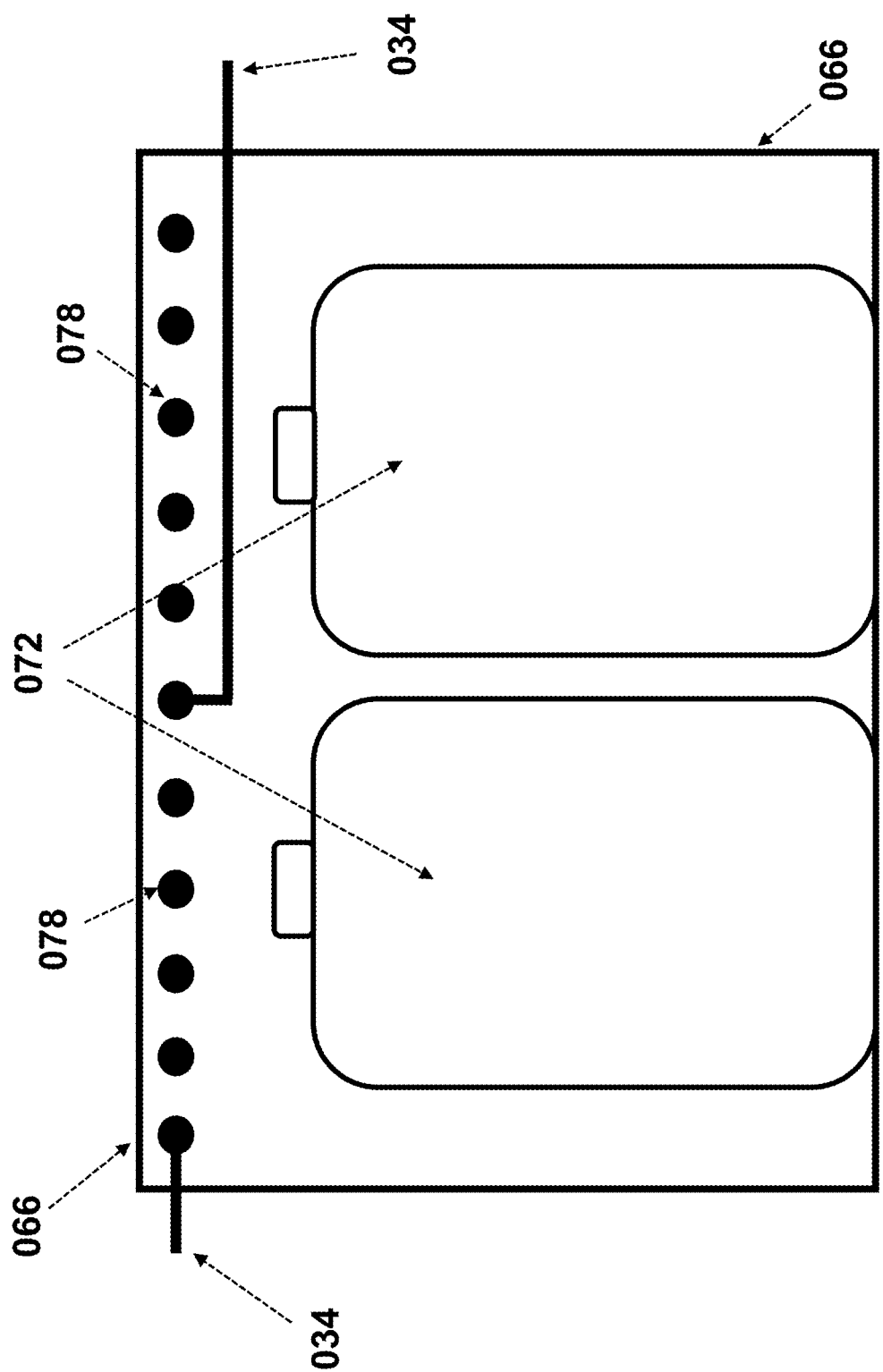
FIG. 8C: A schematic illustration of a battery module composed of two or more individual battery cells, wherein a planar inductive coil is positioned within the battery module.

FIG. 8C: A schematic illustration of a battery module composed of two or more individual battery cells (072), wherein a planar inductive coil (078) is positioned within the battery module. Though the schematic shows the planar inductive coil positioned above the individual battery cells, the planar coil may be positioned below the cells. Moreover, the planar coil may be positioned over two, or more, or all of the battery cells within the battery module. The inductive coil leads (034) may protrude outward of the module casing (066) and be connected to either other induction coils or a power source.

Figure 8D:
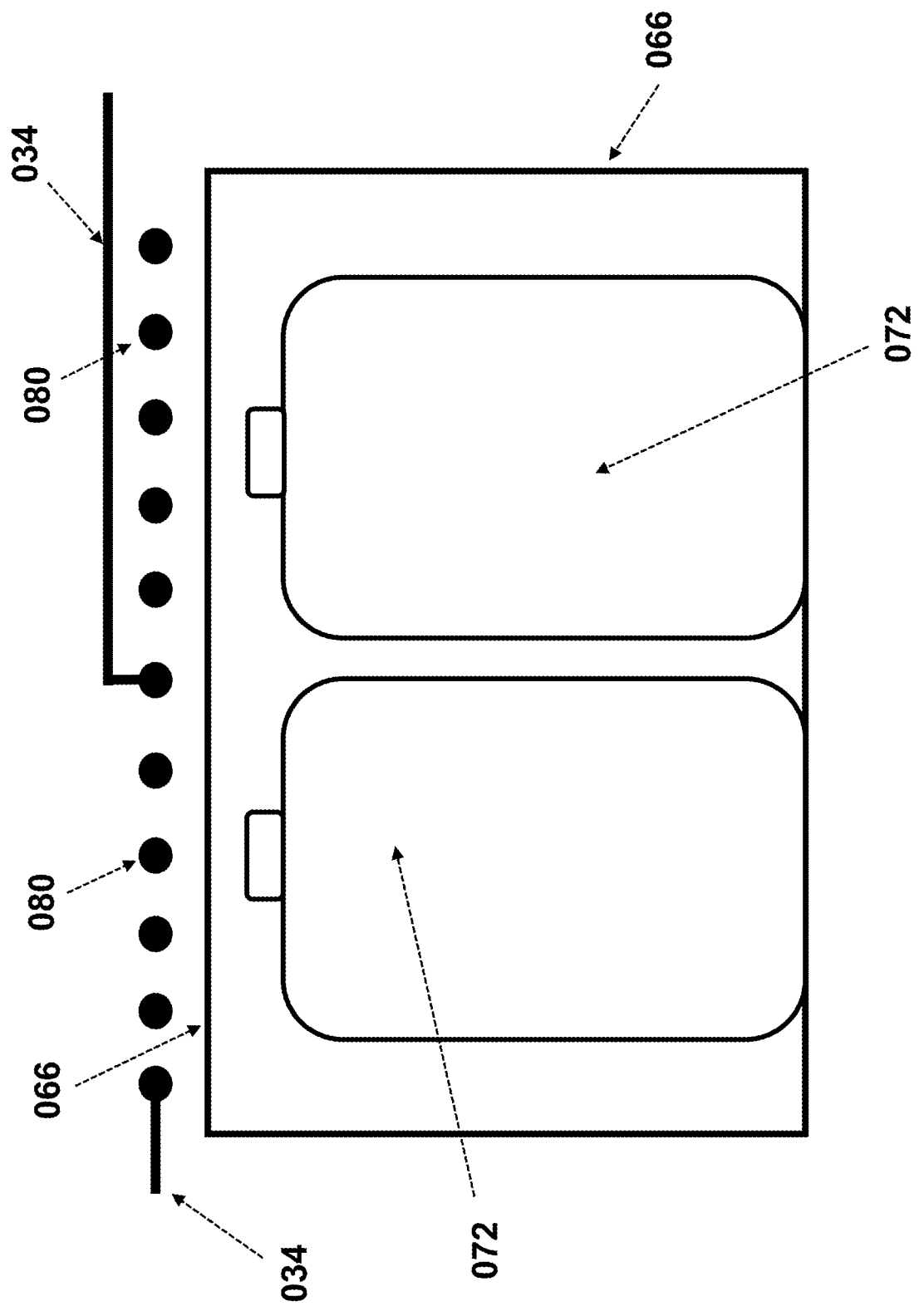
FIG. 8D: A schematic illustration of a battery module composed of two or more individual battery cells, wherein a planar inductive coil is positioned outside the battery module.

FIG. 8D: A schematic illustration of a battery module composed of two or more individual battery cells (072), wherein a planar inductive coil (080) is positioned outside the battery module. Though the schematic shows the planar inductive coil positioned above the battery module, the planar coil may be positioned below the module. The inductive coil leads (034) may protrude outward from the module casing (066) and be connected to either other induction coils or a power source.

Figure 9A:
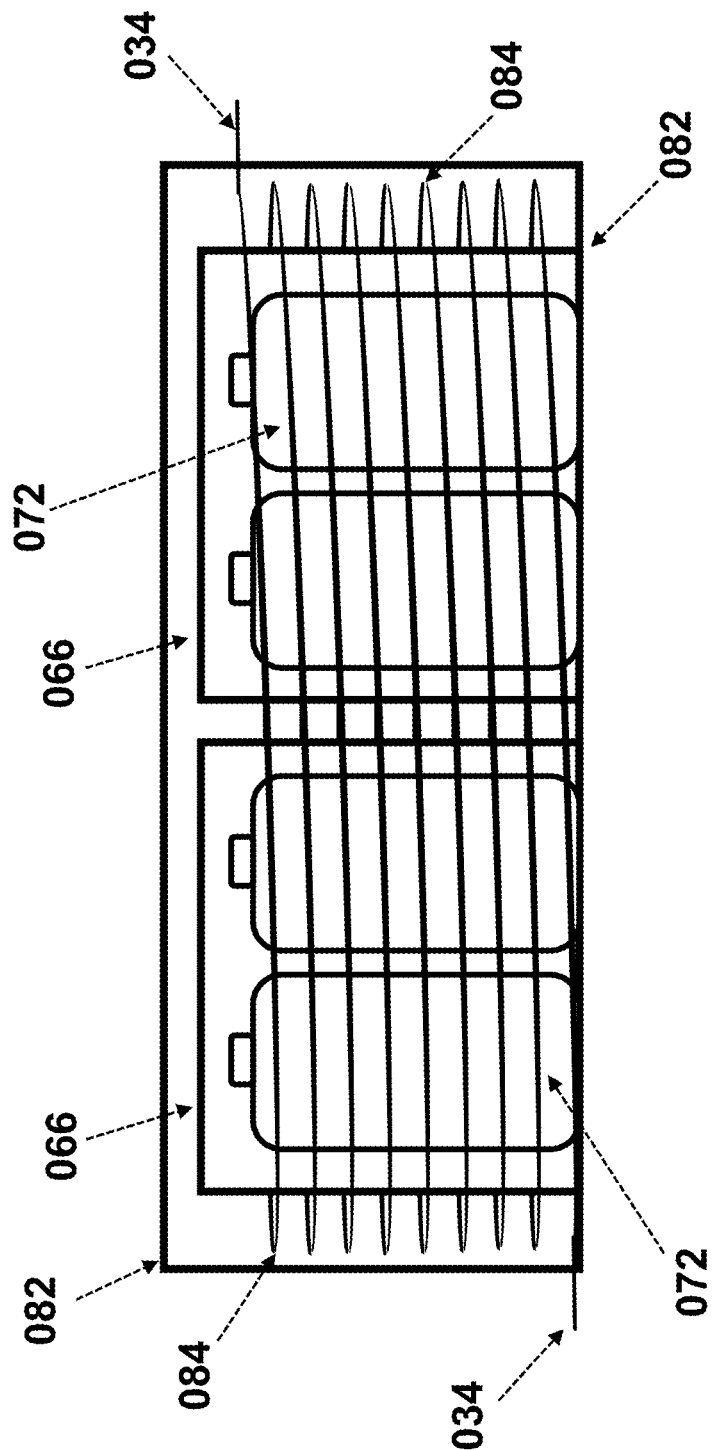
FIG. 9A: A schematic illustration of a battery pack, wherein an inductive coil is wrapped around two, or more, or all, battery modules within the battery pack.

FIG. 9A: A schematic illustration of a battery pack, wherein an inductive coil (084) is wrapped around two, or more, or all, battery modules (066) within the battery pack. Each battery module may contain two or more individual battery cells (072). The inductive coil leads (034) may protrude outward of the battery pack casing (082) and be connected to either other induction coils or a power source.

Figure 9B:
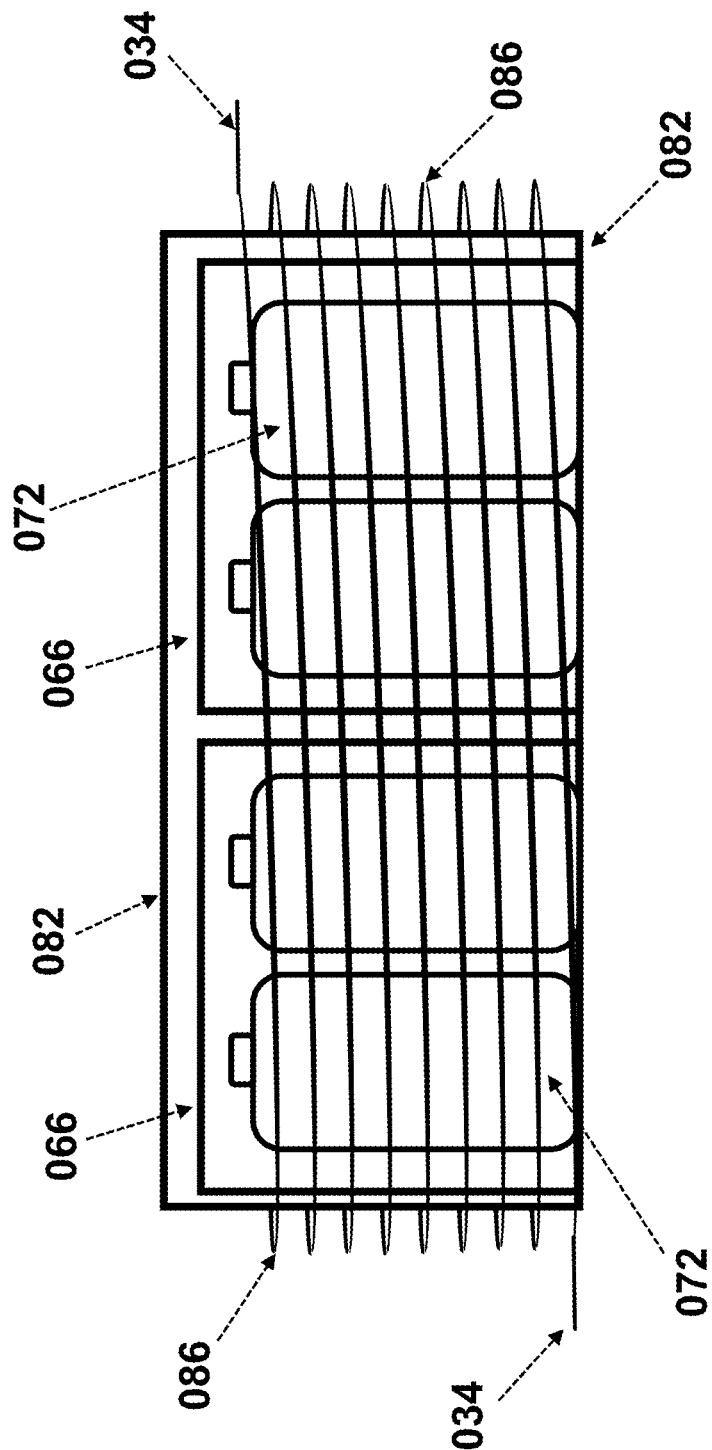
FIG. 9B: A schematic illustration of a battery pack, containing two or more battery modules, wherein an inductive coil is wrapped around the entirety of the battery pack.

FIG. 9B: A schematic illustration of a battery pack, containing two or more battery modules (066), wherein an induction coil is wrapped around the entirety of the battery pack (086). Each battery module may contain two or more individual battery cells (072). The inductive coil leads (034) may protrude outward from the battery pack casing (082) and be connected to either other induction coils or a power source.

Figure 9C:
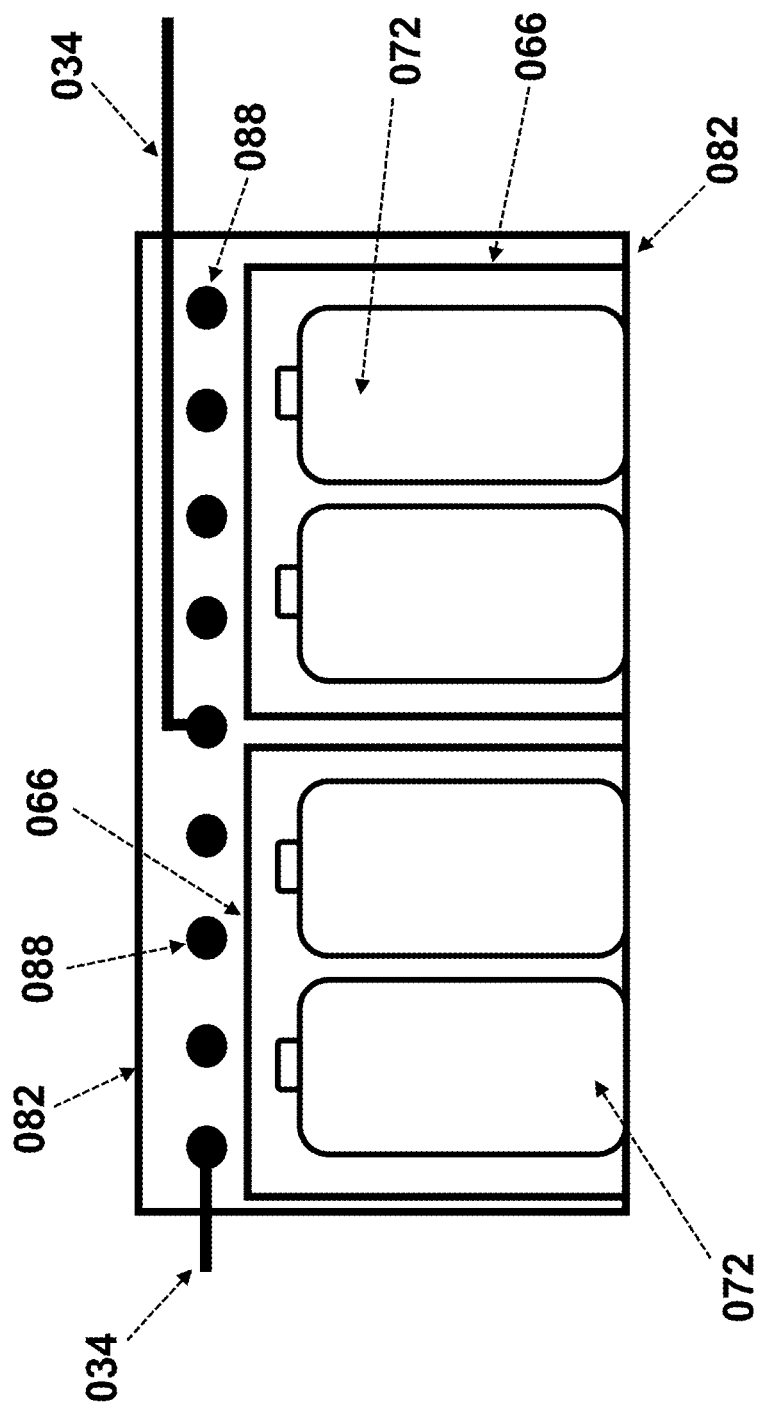
FIG. 9C: A schematic illustration of a battery pack composed of two or more battery modules, wherein a planar inductive coil is positioned within the battery pack.

FIG. 9C: A schematic illustration of a battery pack composed of two or more battery modules (066), wherein a planar inductive coil (088) is positioned within the battery pack. Though the schematic shows the planar inductive coil positioned above the battery modules, the planar coil may be positioned below the modules. Moreover, the planar coil may be positioned over two, or more, or all of the battery modules within the battery pack. Each of the battery modules may contain one or more individual battery cells (072). The inductive coil leads (034) may protrude outward of the battery pack casing (082) and be connected to either other induction coils or a power source.

Figure 9D:
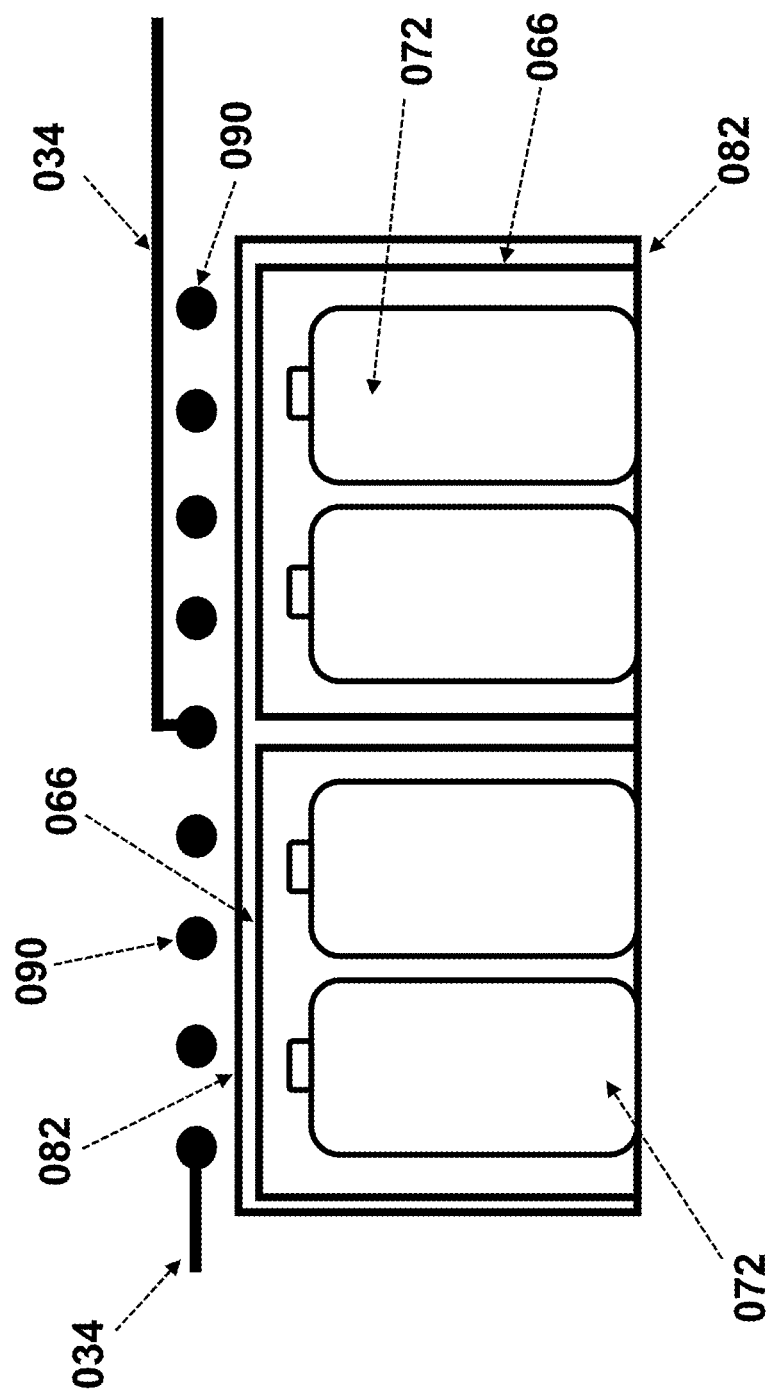
FIG. 9D: A schematic illustration of a battery pack composed of two or more battery modules, wherein a planar inductive coil is positioned outside the battery pack.

FIG. 9D: A schematic illustration of a battery pack composed of two or more battery modules (066), wherein a planar inductive coil (090) is positioned outside the battery pack. Though the schematic shows the planar inductive coil positioned above the battery pack, the planar coil may be positioned below the pack. Each of the battery modules may contain one or more individual battery cells (072). The inductive coil leads (034) may protrude outward from the battery pack casing (082) and be connected to either other induction coils or a power source.

Figure 10A:
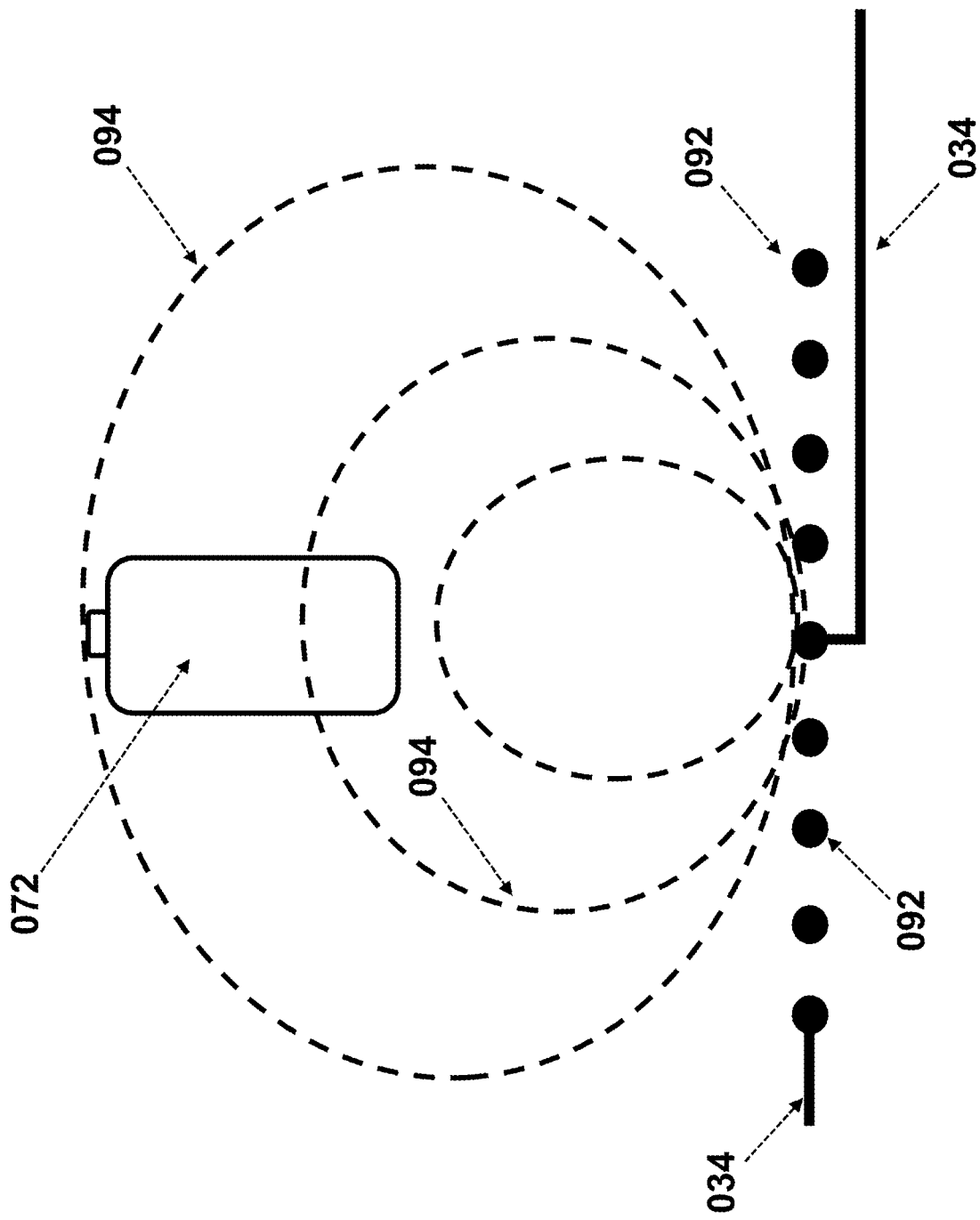
FIG. 10A: A schematic illustration of a planar inductive coil, wherein the planar coil is external of the application using the individual battery cell.

FIG. 10A: A schematic illustration of a planar inductive coil, wherein the planar coil (092) is external of the application using the individual battery cell (072). The induvial battery cell may be heated when passed through the induced coupled magnetic field (094) generated from the planar induction coil. The induction coil leads (034) may be connected to other inductive coils or a power source.

Figure 10B:
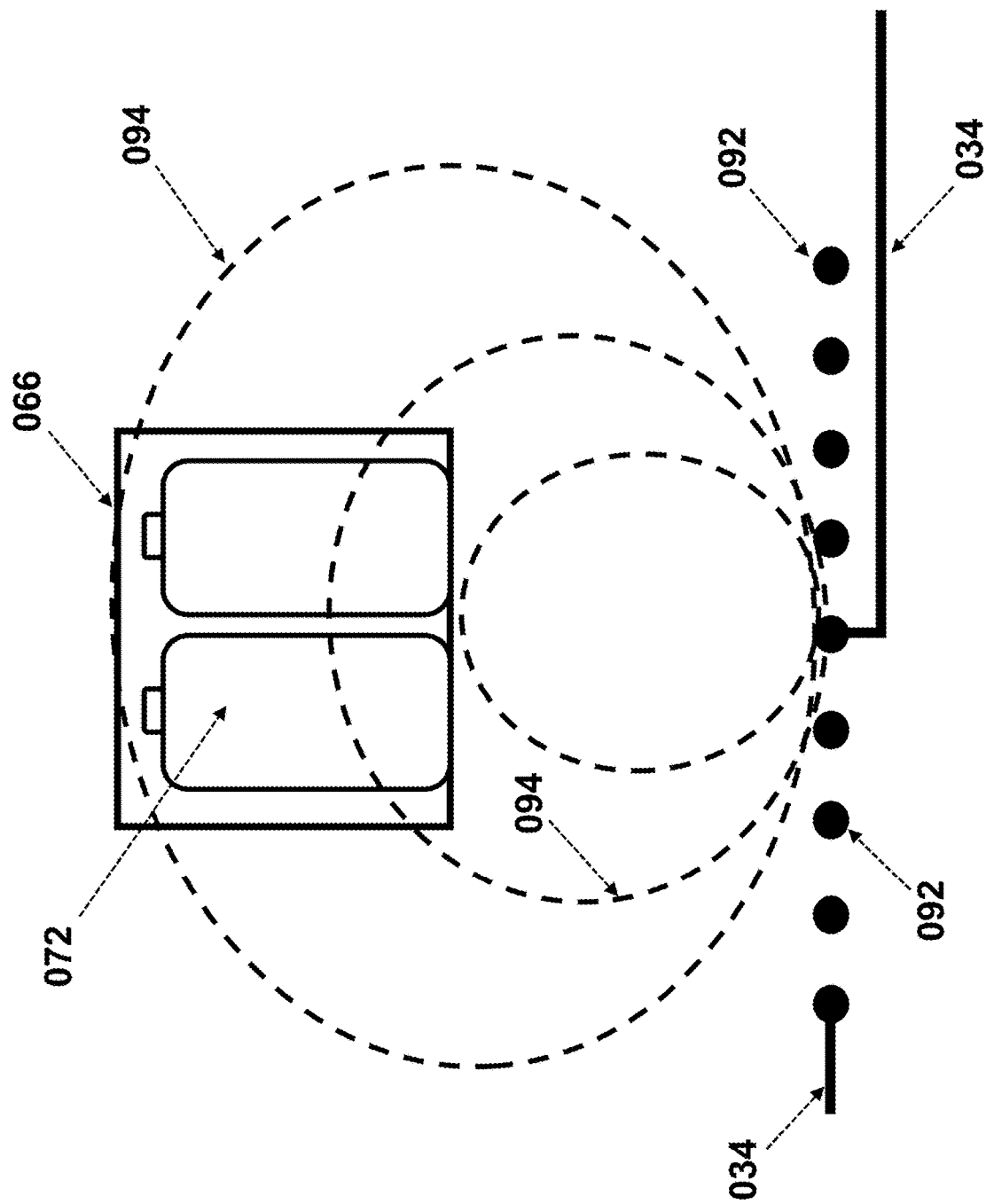
FIG. 10B: A schematic illustration of a planar inductive coil, wherein the planar coil is external of the application that contains the battery module.

FIG. 10B: A schematic illustration of a planar inductive coil, wherein the planar coil (092) is external of the application that contains the battery module (066). The battery module may contain two or more induvial battery cells (072). The induvial battery cells may be heated when passed through the induced coupled magnetic field (094) generated from the planar induction coil. The induction coil leads (034) may be connected to other inductive coils or a power source.

Figure 10C:
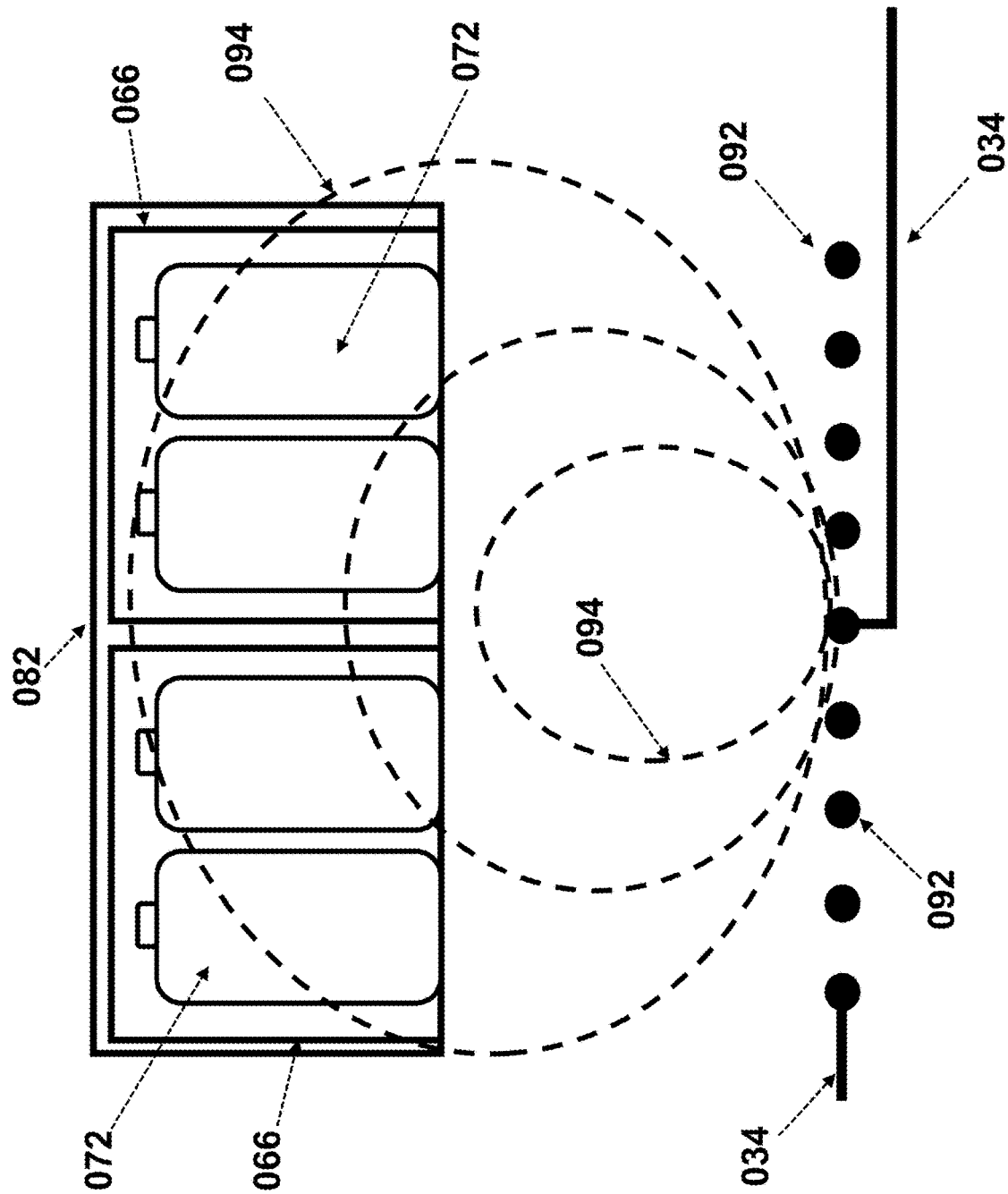
FIG. 10C: A schematic illustration of a planar inductive coil, wherein the planar coil is external of the application that contains the battery pack.

FIG. 10C: A schematic illustration of a planar inductive coil, wherein the planar coil (092) is external of the application that contains the battery pack (082). The battery pack may contain two or more battery modules (066). And each battery module may contain two or more induvial battery cells (072). The induvial battery cells may be heated when passed through the induced coupled magnetic field (094) generated from the planar induction coil. The induction coil leads (034) may be connected to other inductive coils or a power source.

With reference to the drawings, examples of batteries containing inductively heatable materials embedded or suspended in the electrolyte and with an inductive coil in proximity to the battery, may include the following.

Example 1: In an example, inductive heatable materials may be suspended in the liquid electrolyte of a primary battery cell, as shown in FIG. 1A. A primary battery cell may include, for example, an Alkaline battery, wherein the inductive heating materials are suspended in a potassium hydroxide solution and composed of an inductive heating material coated with an insulative layer and enclosed within a surfactant. The alkaline battery may include a zinc powder/gel anode coated on an anode current collector and a manganese dioxide/carbon paste cathode coated onto the container, which are separated by porous separator and potassium hydroxide solution with inductive heating materials suspended within.

An alternative example may include, for example, silver oxide primary battery cells with inductive heating materials supported in a sodium hydroxide solution separating an amalgamated zinc gel anode and silver oxide paste cathode.

An alternative example may include, for example, lithium primary battery cells where the inductive heating materials are suspended in an organic solution positioned between a lithium metal anode and a variety of cathodes depending on the type of lithium battery.

Example 2: In an example, inductive heatable materials may be suspended in the liquid electrolyte of a secondary battery cell as shown in FIG. 1A. A secondary battery cell may include, for example, a lead acid battery, wherein the inductive heating materials are suspended in a solution of sulfuric acid and composed of an inductive heating material coated with an insulative layer and enclosed within a surfactant. The lead acid cell may contain one lead plate and one lead oxide plate when in the charged state.

An alternative example may include, for example, a secondary Lithium ion battery cell wherein the inductive heating materials are suspended in an organic solution positioned between a lithium intercalation cathode, such as $LiCoO_2$, and a lithium intercalation anode, such as graphite.

Yet another example may include, for example, a secondary Nickel-metal hydride battery cell wherein the inductive heating materials are suspended in a potassium hydroxide solution between a nickel oxide hydroxide cathode and a hydrogen absorbing alloy in the $AB_5$, in other instances an $AB_2$ group.

Example 3: In an example, inductive heatable materials may be deposited onto, embedded within, or in some instances embedded within and deposited onto a porous battery separator, as shown in FIG. 1B. A porous battery separator may include, for example, a glass mat for a lead acid battery. An alternative example may include, for example, a polypropylene separator for primary lithium batteries. Yet another example may include, for example, polyolefin in secondary lithium ion batteries.

Example 4: In an example, inductive heating materials may be suspended in the matrix of a solid polymer in an ion-based battery, as shown in FIG. 1C. An example of an ion-based battery may include, for example, a lithium polymer battery, wherein the induction heating materials are suspended in a poly(ethylene oxide) (PEO) matrix between a lithium intercalation anode, such as graphite, and a lithium intercalation cathode, such as lithium iron phosphate ($LiFePO_4$).

Example 5: In an example, inductive heating materials may be suspended in a gel polymer electrolyte, wherein the inductive heating materials are suspended in a solid polymer, such as, for example, polyacrylonitrile, and an organic liquid electrolyte, such as, for example, ethylene carbonate with one molar of lithium hexafluorophosphate. An illustration of the example is presented in FIG. 1C. The gel polymer may be used in a lithium-ion battery composed of, for example, an intercalation cathode, such as $LiNi_xCo_yMn_zO_2$, and an intercalation anode, such as graphite composed of 10-15% silicon particles by weight.

Example 6: In an example, inductive heating wires or fibers may be embedded in the ceramic-polymer composite electrolyte of a metal-based secondary battery, as shown in FIG. 1C. A metal-based secondary battery may include, for example, a solid-state lithium metal battery. A ceramic-polymer composite may be composed of garnet-structure lithium lanthanum zirconium oxide and poly(ethylene oxide) (PEO). A solid-state lithium metal battery may further be composed of metallic lithium as the anode and a composite cathode formulated with $LiNi_xCo_yMn_zO_2$ and PEO. In some instances, a lithium metal battery may consist of an organic liquid electrolyte, in addition to the ceramic-polymer composite, such as dimethyl carbonate with one molar of lithium hexafluorophosphate, which may be termed a semi-solid-state or hybrid lithium metal battery.

Example 7: In an example, an inductive heating mesh may be embedded in the ceramic-polymer composite electrolyte of a metal-based secondary battery, as shown in FIG. 1D. A metal-based secondary battery may include, for example, a solid-state lithium metal battery. A ceramic-polymer composite may be composed of NASICON-structured LAGP ($Li_{1-x}Al_xGe_{2-x}(PO_4)_3$) and poly(ethylene oxide) (PEO). A solid-state lithium metal battery may further be composed of metallic lithium as the anode and a composite cathode formulated with lithium nickel cobalt aluminum oxide ($LiNi_xCo_yAl_zO_2$) and PEO. In some instances, a lithium metal battery may consist of an organic liquid electrolyte, in addition to the ceramic-polymer composite, such as propylene carbonate with one molar of lithium hexafluorophosphate, which may be termed a semi-solid-state or hybrid lithium metal battery. The inductive heating mesh may be coated with an electronic insulating layer allowing it to make contact with the lithium anode and composite cathode in the instance the lithium metal battery is under pressure. The inductive heating mesh may be used to increase the ionic conductivity of the ceramic-polymer composite in cold weather. In some instances, the ceramic-polymer composite may be described as being embedded within the inductive heating mesh, wherein all components form the ceramic-polymer composite solid-state electrolyte.

With reference to the drawings, examples of the orientation and positioning of the inductive coil in or around batteries containing inductively heatable materials embedded or suspended in the electrolyte, may include the following.

Example 1: In an example, a small inductive coil with a planar configuration may be placed at the bottom of a coin cell or button cell battery forming a heatable battery as shown in FIG. 2A and FIG. 2D. The bottom of the coin cell may refer to as below the active components; though the planar coil may also be above the active components. The current collector in close proximity to the planar coil may be orientated in such a configuration that it is still in electrical connection with the top or bottom cap of the coin or button cell. The coin or button cell battery may be a primary or secondary battery. The primary application that uses such a battery may be wristwatch, wherein a wristwatch may include, but not limited to, an analog wristwatch or digital wristwatch (powered by quartz movement), or smartwatch. The primary purpose of the heatable battery may be to enable optimal watch performance in cold weather or cold climates.

Example 2: In an example, an inductive coil with a loop or spiral configuration may be placed on the inside or interior surface of the housing or casing of a cylindrical battery forming a heatable battery as shown in FIG. 3A and FIG. 4A. The coil may have leads protruding out of the casing to make contact with either a power source or coils in neighboring batteries. Such batteries may be used in extreme cold climates such as space or other planetary bodies as a power source on a probe or rover. The batteries may be the primary power source for the probe or rover, wherein a portion of their discharge energy is used to power the induction heating system. Alternatively, the batteries may be a secondary power source used to power an instrument or application on a probe or rover, wherein the main power, such as solar or nuclear battery, provides power to the induction heating system to heat the heatable batteries. In such an alternative, it is assumed that a heatable battery is used to provide energy at a higher power rate than the primary power source can deliver in order perform a particular task.

Example 3: In an example, an inductive coil with a loop or spiral configuration may be built into the packaging of a pouch cell type battery forming a heatable battery as shown in FIG. 3B and FIG. 5B. The coil may have leads protruding out of the battery packaging and connected to either a power source or to coils in neighboring cells. The heatable battery may be a secondary battery and used in both civilian and noncivilian areal drones. In such an application, it is assumed that the induction heating system is powered by a portion of the discharge energy from the heatable batteries themselves. It is further assumed that the induction heating system may be used to heat the batteries when the areal drone is either 1) in cold weather or a cold weather climate, or 2) reaches an elevation too high (i.e. too cold) for batteries to operate efficiently.

Example 4: In an example, an inductive coil with a planar configuration may be placed inside a battery module, containing two or more heatable batteries, as shown in FIG. 8C. The battery module may be the main power source for an electric scooter application. In such applications, it is assumed that the coil leads will be connected directly to an inductive heating control system which is powered by the heatable batteries themselves. Furthermore, it is assumed that the heatable batteries will be secondary batteries. Such an application is expected to be used in cold weather or cold climates where poor battery efficiency may disrupt scooter performance. An electric scooter may include, for example, recreational scooters or mobility scooters.

Example 5: In an example, an inductive coil with a loop or spiral configuration may be placed around a battery module, containing two or more heatable batteries, as shown in FIG. 8B. An application of such an example may be battery module for an automobile, wherein the battery module is more accurately defined as a 12V lead acid battery with six 2V lead acid cells. One or more of the cells may contain inductively heatable materials suspended in the sulfuric acid electrolyte. It is assumed that such an application would primarily be used in cold climates in either conventional automobiles or specialized equipment. The coil may be powered by the lead acid battery itself, wherein the induction system only operates briefly in order to start the automobile, or powered by another source, wherein the temperature is too low for the battery to successfully start the automobile. The inductive coil may be a permanent fixture in the automobile or a standalone device that can be placed around the battery temporarily in order to start the automobile in extreme cold environments.

Example 6: In an example, an inductive coil with a planar configuration may be placed inside a battery pack, containing two or more battery modules, as shown in FIG. 9C. An application of such as example may be an electric vehicle battery pack, wherein the planar coil is positioned above two, or more, or all of the battery modules in the pack. It is assumed that the battery modules are composed of two or more secondary battery cells. Furthermore, it is assumed that the two or more battery modules with a planar coil positioned above (or below) contain two or more secondary heatable batteries with inductively heatable materials embedded or suspended within. The induction heating system may be powered by the battery pack itself or by a secondary power source on board the electric vehicle. An electric vehicle may include for example all-electric-vehicles or hybrid electric vehicles. The induction heating system may be used to enable electric vehicle operation in extreme cold and harsh environments. Alternatively, or in combination thereof, the induction heating system may enable fast charging and acceleration of the electric vehicle.

Example 7: In an example, an external inductive coil with a planar configuration may be placed outside the application that uses a heatable battery, as shown in FIG. 10A-C. For example, the planar coil may be embedded in the roadway or parking lot where electric vehicles, park. The planar coil may be used to enable the starting of the electric vehicle in extreme cold and harsh environments. The external inductive coil, powered by the grid or an external power source, may be used to keep electric vehicle batteries at an elevated temperature while parked. Alternatively, the external inductive coil may be a standalone, mobile, home plug-in device that can be placed under an electric vehicle when parked outside in order to keep the heatable batteries warm. In addition, the external inductive coil may be used in conjunction with wireless charging that is described elsewhere in the art.

The above-described systems and methods can be ascribed for different battery configurations, such as coin cells, cylindrical cells, pouch cells, prismatic cells, or any other types of cells to serve different applications.

The above-described systems and methods can be ascribed to the induction heating of all types of electrolytes in battery systems using induction heating materials embedded in the electrolytes.

The above-described system and methods can be ascribed for all solid-state batteries, liquid based batteries, or semi-solid-state batteries.

The above-described system and methods can be ascribed for all liquid, polymer, gel-polymer, molten-salt, solid-state, ceramic-polymer composite, semi-solid-state, or hybrid-based battery systems.

The above-described systems and methods can be ascribed for alternative energy storage technologies such as redox flow batteries, capacitors, supercapacitors and fuel cells.

The above-described systems and methods can be ascribed for electric vehicle batteries. Electric vehicles can be defined as either all electric vehicles or hybrid electric vehicles.

The above-described systems and methods can be ascribed for all types of electric vehicles including, but not limited to, sedan, coupé, convertible, hatchback, support utility, sports, compact, subcompact, minivan, van, luxury, truck, full size truck, pickup truck, economy, crossover, wagon, full-size, mid-size, bus, semi, etc.

The above-described systems and methods can be ascribed to battery cells of various sizes ranging from button cell size to large format, including those used in the grid, wherein the large format is further described in the art.

The above-described systems and methods may include an induction heating system configured to heat the electrolyte by induction. For example, an induction heating system may include an electromagnet and an electronic oscillator that passes a high-frequency alternating current through the electromagnet, which induces eddy currents in the material to be heated.

The above-described systems and methods can be used in applications including automotive, handheld electronics, grid storage backup, load balancing, medical, wearables, etc.

The above-described systems and methods can be used in cold weather climates including those that are not on or in the vicinity of earth including in space, such as space stations, satellites, both natural and unnatural, and other planetary bodies such as mars.

In the drawings, the following reference numbers are noted: 002 Zero or two dimensional inductively heatable material; 004 Electronically insulative coating; 006 Optional surfactant; 008 Battery cathode; 010 Battery anode; 012 Battery electrolyte with inductively heatable materials suspended within; 014 Porous battery separator; 016 Positive current collector; 018 Negative current collector; 020 Porous battery separator with inductively heatable materials deposited on or mixed within; 022 Battery electrolyte; 024 Inductively heatable wire or fiber; 026 Cross section view of an inductively heatable wire or fiber; 028 Solid battery electrolyte; 030 Fabric Support; 032 Planar view of planar inductive coil; 034 Inductive coil leads; 036 Cross-sectional view of planar inductive coil; 038 Battery terminal; 040 Cylindrical battery casing; 042 Active battery components; 044 Pouch cell packaging; 046 Pouch cell tabs; 048 Inside surface of the pouch cell packaging materials; 050 Coin cell casing; 052 Crimped coin cell cap; 054 Inductive coil; 056 Sealed pouch-type cell; 058 Open 3D view of the conductive coil embedded in the pouch cell packaging; 060 Interior inductive coil; 062 Embedded inductive coil; 064 Exterior inductive coil; 066 Battery module casing; 068 Inductive heating series circuit; 070 Inductive heating parallel circuit; 072 Individual battery cells; 074 Inductive coil wrapped around two or more individual batteries within a battery module; 076 Inductive coil wrapped around battery module; 078 Planar inductive coil positioned inside the battery module; 080 Planar inductive coil positioned outside the battery module; 082 Battery pack casing; 084 Inductive coil wrapped around two or more battery modules inside the battery pack; 086 Inductive coil wrapped around the battery pack; 088 Planar inductive coil positioned above two or more battery modules positioned within the battery pack; 090 Planar inductive coil positioned above a battery pack; 092 Extended planar inductive coil; 094 Induced magnetic field Although various embodiments of the disclosed systems and methods for heating of an electrolyte in a battery cell have been shown and described, modifications may occur to those skilled in the art upon reading the specification. The present application includes such modifications and is limited only by the scope of the claims.

What is claimed is:

1. A battery structure, comprising:
an anode;
a cathode;
a solid electrolyte between the anode and the cathode, the solid electrolyte comprising a solid-state ionic conductive material;
a plurality of inductively heatable structures fully embedded in the solid electrolyte, wherein the plurality of inductively heatable structures are discrete from each other, wherein each inductively heatable structure comprises an inductively heatable material individually coated with an insulative layer, the insulative layer having a thickness (t) in a range of 0<t<1000 nm;
a battery packaging structure, wherein the anode, the cathode, and the solid electrolyte having the plurality of inductively heatable structures fully embedded therein are positioned within an interior of the battery packaging structure; and
an induction coil, wherein the induction coil is positioned within the interior of the battery packaging structure or is embedded within the battery packaging structure.

2. The battery structure of claim 1, wherein the solid electrolyte includes a solid polymer electrolyte, a solid-state ceramic electrolyte, a ceramic-polymer composite electrolyte, or a combination thereof.

3. The battery structure of claim 1, wherein the solid electrolyte includes a solid-state ceramic electrolyte, wherein the solid-state ceramic electrolyte includes a garnet-structure oxide material, a NASICON-structured material, a perovskite type oxide material, an anti-perovskite-type oxide material, a thiophosphate material, or an argyrodite structured sulfide.

4. The battery structure of claim 1, wherein the solid electrolyte includes a ceramic-polymer composite electrolyte, wherein the ceramic-polymer composite electrolyte includes a mixture of polymer and an ionic conductive solid-state ceramic material, wherein the ionic conductive solid-state ceramic material includes a garnet-structure oxide material, a NASICON-structured material, a perovskite type oxide material, an anti-perovskite-type oxide material, a thiophosphate material, or an argyrodite structured sulfide, and wherein the polymer includes an ionic conducting polymer or a nonionic conducting polymer with an ionic conducting salt dissolved within.

5. The battery structure of claim 1, wherein the plurality of inductively heatable structures are deposited on and or into a battery separator.

6. The battery structure of claim 1, wherein the battery packaging structure comprises a battery casing, a battery housing, or a battery packaging material, wherein the induction coil is embedded in the battery casing, battery housing, or battery packaging material.

7. The battery structure of claim 1, wherein the battery packaging structure comprises a battery module, wherein the induction coil is positioned inside the battery module.

8. The battery structure of claim 1, wherein the battery packaging structure comprises a battery pack comprising of a plurality of battery modules, wherein the induction coil is positioned inside the battery pack.

9. An electric vehicle comprising the battery structure of claim 1.

10. A method of heating the solid electrolyte of the battery structure of claim 1, the method comprising passing an alternating current generating eddy currents within the plurality of inductively heatable structures fully embedded in the solid electrolyte, to thereby heat the solid electrolyte.

11. The battery structure of claim 1, wherein the plurality of inductively heatable structures are embedded in the solid electrolyte in a random orientation.

12. The battery structure of claim 1, wherein the plurality of inductively heatable structures are fully embedded in a single layer of solid electrolyte.

13. The battery structure of claim 1, wherein each inductively heatable structure comprises at least one of a particle, a fiber, a wire, a flake, and a sheet.

14. The battery structure of claim 1, wherein the inductively heatable material includes at least one of iron, steel, nickel, zinc, cobalt, aluminum, copper, silicon, carbon, neodymium, manganese, ferrite, magnetite ($Fe_3O_4$), brass, silicon carbide, $Co_2Ba_2Fe_{12}O_{22}$, $SrFe_{12}O_{19}$, and alloys and mixtures thereof.

15. A battery structure, comprising:

positive current collector and a negative current collector;

an anode and a cathode between the positive current collector and the negative current collector;

a solid electrolyte between the anode and the cathode, the solid electrolyte comprising a solid-state ionic conductive material;

a plurality of inductively heatable structures fully embedded in the solid electrolyte, wherein the plurality of inductively heatable structures are discrete from each other, wherein the plurality of inductively heatable structures are between the anode and the cathode, wherein each inductively heatable structure comprises an inductively heatable material individually coated with an insulative layer, the insulative layer having a thickness (t) in a range of 0<t<1000 nm, wherein the plurality of inductively heatable structures are fully embedded in a single layer of the solid electrolyte, wherein the inductively heatable material includes at least one of iron, steel, nickel, zinc, cobalt, aluminum, copper, silicon, carbon, neodymium, manganese, ferrite, magnetite ($Fe_3O_4$), brass, silicon carbide, $Co_2Ba_2Fe_{12}O_{22}$, $SrFe_{12}O_{19}$, and alloys and mixtures thereof;

a battery packaging structure, wherein the positive current collector, the negative current collector, the anode, the cathode, and the solid electrolyte having the plurality of inductively heatable structures fully embedded therein are positioned within an interior of the battery packaging structure; and an induction coil, wherein the induction coil is positioned within the interior of the battery packaging structure or is embedded within the battery packaging structure.

16. The battery structure of claim 15, wherein the plurality of inductively heatable structures are deposited on and or into a battery separator.

17. The battery structure of claim 15, wherein the battery packaging structure comprises a battery casing, a battery housing, or a battery packaging material, wherein the induction coil is embedded in the battery casing, battery housing, or battery packaging material.

18. The battery structure of claim 15, wherein the battery packaging structure comprises a battery module, wherein the induction coil is positioned inside the battery module.

19. The battery structure of claim 15, wherein the battery packaging structure comprises a battery pack comprising of a plurality of battery modules, wherein the induction coil is positioned inside the battery pack.

20. A method of heating the solid electrolyte of the battery structure of claim 15, the method comprising passing an alternating current generating eddy currents within the plurality of inductively heatable structures fully embedded in the solid electrolyte, to thereby heat the solid electrolyte.

* * * * *